United States Patent [19]
Baker

[11] Patent Number: 6,002,401
[45] Date of Patent: Dec. 14, 1999

[54] USER DEFINABLE PICTORIAL INTERFACE FOR ACCESSING INFORMATION IN AN ELECTRONIC FILE SYSTEM

[76] Inventor: Michelle Baker, 325 River Dr. #123, New York, N.Y. 10025

[21] Appl. No.: 09/003,553

[22] Filed: Jan. 6, 1998

Related U.S. Application Data

[63] Continuation of application No. 08/316,518, Sep. 30, 1994, Pat. No. 5,715,416.

[51] Int. Cl.⁶ ........................................................ G06F 3/14
[52] U.S. Cl. ............................ 345/349; 345/335; 345/473
[58] Field of Search ...................................... 345/348, 349, 345/350, 351, 346, 356, 357, 335, 977, 968, 302, 113, 115, 121, 435, 473

[56] References Cited

U.S. PATENT DOCUMENTS

| | | | |
|---|---|---|---|
| 4,601,003 | 7/1986 | Yoneyama et al. | 345/351 |
| 5,347,628 | 9/1994 | Brewer et al. | 345/351 |
| 5,349,658 | 9/1994 | O'Rourke et al. | 345/349 |
| 5,479,602 | 12/1995 | Baecker et al. | 345/349 |
| 5,524,195 | 6/1996 | Clanton, III et al. | 345/327 |
| 5,657,462 | 8/1997 | Brouwer et al. | 345/336 |
| 5,682,469 | 10/1997 | Linnett et al. | 345/473 |
| 5,715,416 | 2/1998 | Baker | 345/349 |

*Primary Examiner*—Matthew M. Kim
*Assistant Examiner*—Crescelle N. dela Torre
*Attorney, Agent, or Firm*—David P. Gordon; David S. Jacobson; Thomas A. Gallagher

[57] ABSTRACT

A pictorial user interface for accessing information in an electronic file system provides a pictorial image which is linked to a file directory and which identifies the file directory. Objects in the pictorial image are icons linked to file objects and an animated character is overlaid on the pictorial image. User input causes movement of the animated character relative to the pictorial image. Input from the user is preferably through a limited input device such as a gamepad controller, a mouse, or by using a limited number of keys on a normal keyboard. Input signals are mapped according to keycode identical command sets, context arguments and selection arguments. Commands that can be invoked by the user include operating system commands, pictorial object commands, and interface utility commands. Using the pictorial object commands, the user can configure the interface so that different pictures and icons are associated with different directories and files. Commands are executed with a prologue animation and an epilogue animation. The prologue animation provides feedback as to the nature of the command being executed. The epilogue animation provides feedback as to the results of the command. Animations may include actions of the animated character or the behavior of a selected icon, or both. The interface may be applied as an overlay to virtually any operating system.

15 Claims, 18 Drawing Sheets

USER DEFINABLE PICTORIAL INTERFACE FOR ACCESSING INFORMATION IN AN ELECTRONIC FILE SYSTEM

This is a continuation of application Ser. No. 08/316,518, filed Sep. 30, 1994, now U.S. Pat. No. 5,715,416.

BACKGROUND OF THE INVENTION

1. Field of the Invention

The invention relates to a graphical user interface for accessing information stored in a computer. More particularly, the invention relates to a user definable graphical interface for a computer operating system which utilizes pictorial information and animation as well as sound.

2. State of the Art

Very early computers were provided with a minimal interface which often consisted of little more than switches and lights. Rows of switches were set in positions representing binary numbers to provide input and rows of lights were illuminated representing binary numbers to provide output. Eventually, computer input and output included text and decimal numbers, which were input using punch cards and output using line printers. A major advance in computing was the interactive video display terminal (VDT). Early VDTs displayed several lines of alphanumeric characters and received input from a "QWERTY" keyboard. VDTs were a great improvement over switches and lights and even over punch cards and line printers.

As computers became more complex, it became necessary to systematize the manner in which information was stored and retrieved. The hierarchical file system was developed and is still substantially the only system in use today with a few exceptions. Under the hierarchical file system, information is stored in files and files are stored in directories. Directories may be stored in other directories and called sub-directories. Using this system, any file can be located by using a path name which identifies the path from a root directory through one or more subdirectories to the file; e.g., a typical path name may take the form: "rootdirectory/ directory/subdirectory/filemane".

In addition to the development of the hierarchical file system was the development of various "operating systems". The early computers did not require an "operating system" per se. They were manually programmed to perform a single task and then reprogrammed for a different task. Programs were stored on punch cards or tape and were loaded directly into the computer's random access memory (RAM) individually when needed by a system operator. With the development of various file systems, including the hierarchical file system, various programs and data could be stored on the same medium and selected for loading into the computer's random access memory (RAM). An operating system is a program which is used to access information on a storage medium and load it into RAM. The operating system allows the computer user to display the contents of directories and choose programs to be run and data to be manipulated from the contents of the directories. Every operating system, therefore, has a user interface, i.e. a manner of accepting input from a user and a manner of displaying output to a user. The input typically includes commands to the operating system to find information in directories, to display the contents of directories, to select files in directories for execution by the computer, etc. In addition, operating systems provide means for the user to operate on files by moving them, deleting them, copying them, etc. Output from the operating system typically includes displays of the contents of directories, displays of the contents of files, error messages when a command cannot be completed, confirmation messages when a command has been completed, etc. With many operating systems, when a program is selected for execution through the operating system, the selected program takes over control of the computer and returns control to the operating system when the program is ended. Modern operating systems share control with programs and several programs can run while the operating system is running.

The most primitive operating system interface is known as a "command line interface". While this type of interface is not necessarily indicative of a primitive operating system, it is primitive as an interface. The command line interface is purely text and presents the user with an arbitrary "prompt" such as "C:\" or "%/L". The only information conveyed to the user by the command line prompt is that the operating system is ready to receive a command, and in the case of "C:\", that the operating system will perform commands with reference to the currently selected root directory "C". The commands to which the operating system will respond are most often obscure abbreviations like DIR to display the contents of the currently selected directory and CD to select a different directory. Moreover, the responses provided by the operating system interface to commands such as DIR may be equally obscure such as displaying a rapidly scrolling list of directory contents or the cryptic "Abort, Retry, Fail" message. Thus, in order to explore the contents of a file system using a command line interface, the user must repeatedly type DIR and CD and try to remember how the scrolling lists of filenames relate to each other in the hierarchy of the file system. Most users find this to be a tedious and trying experience.

More recently, the command line interface has been abandoned in favor of a fully graphical user interface ("GUI") such as those provided by the Apple Macintosh operating system and the IBM OS/2 operating system. To date, GUI interfaces to the operating system have been "WIMP" interfaces; that is they use Windows, Icons, Menus, and Pointers. In the development of WIMP interfaces, a central issue has been the organization of information for display on a the limited viewspace provided by a computer monitor. This issue has been addressed by using the metaphor of a messy desktop to guide the design and layout of information on the graphical display. The metaphor of a messy desktop, which arose in the research on Rooms, and more recently 3-D Rooms, has become universal as an organizing paradigm for the display of user interactions with a computer operating system. In addition to the Macintosh and OS/2 operating systems interfaces, Unix systems X-windows, Microsoft Windows, and others are based on this metaphor. In a WIMP interface, windows are used to demarcate regions of the display assigned to individual programs, graphical icons are used to represent objects such as files and directories known to the operating system, menus can be displayed to list text string names of available operations, and a pointing cursor is used to select object icons or menu items that are visible on the display.

Graphical layouts provided by movable windows, icons, and menus of the WIMP interface have been very successful in helping to organize information, particularly data from alternative programs in progress, on a computer display. Nevertheless, they are offer limited functionality for depiction of operating system procedures and for graphical information about the files and directories present in the file system. Most computer users find the graphical interface to be much easier to learn and much easier to use than the command line interface. Many people have described the graphical interface as "intuitive". However, some people do not find it so intuitive and need more time to learn how to use it than do others.

Despite their vastly enhanced use compared to command line interfaces, the graphical interfaces presently used for access to operating system functionality are still somewhat regimented. For example, the icons are typically all rectangular and of the same size, e.g. 32 by 32 pixels. They are also generally generic. That is to say, for example, that a document concerning the subject of elephants would have the same icon as a document concerning the subject of roses. Typically, all of the directory icons are identical graphics of a folder with no graphical indication of what the folders contain either in subject matter or in amount of information. A folder containing one file has the same size and shape icon as a folder containing twenty files. Thus file and folder icons must always be accompanied by a text string for identification. Moreover, all the windows drawn in the GUI are identical except for the text string which typically appears in the window's title bar. Thus there is no graphical information presented to inform the user what directory is being viewed. The user must read the title bar and remember the association between the text string and the directory contents to determine what directory is being viewed.

There have been a number of extensions to the early WIMP interfaces to improve the ability of users to associate icons to meaningful objects or actions. It is possible for the user to customize icons, by cutting and pasting graphics or by drawing an icon with an icon editor. However, the process is often tedious and the result is not always informative. The only icon editing software presently available which automatically enhances the information nature of an icon are the programs which create thumbnail graphic icons for graphic files. With these programs, a file which contains a picture of an elephant, for example, will be provided with an icon which is a miniature version of the elephant picture. Since these programs do not apply to files made up of text or for executable program, they do not provide a general solution to the problem of indistinguishable graphic icons.

Even for software application developers it is becoming increasingly difficult to design meaningful graphical icons that satisfy the constraints imposed by existing WIMP interfaces and that are different from those already in use. One approach to the problem of designing meaningful graphics for icons has been to work with animated and multidimensional icons. It is believed that animations can be used to improve the expressiveness and extend the amount of information that can be conveyed in an icon. Some of this research has been incorporated into existing operating system interfaces, particularly for generic process depiction. For example, when an operation on a file is performed or a program is opened, the mouse pointer may become momentarily animated or may assume a different graphic, e.g. by displaying an hourglass. However, there are serious limitations on the use of animated icons in current operating systems interfaces. First, they are only possible for cursor animations. It is not currently possible, even for application developers, to supply animated icons for file objects because existing operating system interfaces do not provide support for such icons. Second, cursor animations are constructed by operating system developers and fixed in the operating system. Software developers can make use of alternative cursor animations but they must select a cursor animation from the small set of choices that are included with the operating system. The set of animated icons is fixed and finite.

Another regimented aspect of the current graphical interfaces is that they are relatively static. With a few exceptions, such as the animated cursors described above or the zooming open of windows, the graphical display is inanimate. While the operating system interface presents a static graphical representation of objects such as files and directories, there is not much graphical representation of processes performed by the operating system. Thus, as the user initiates a process (such as copying a file or launching a program, etc.) there is no intuitive indication by the operating system to the user as to what is happening. For example, the hourglass animation of the mouse cursor may indicate that the operating system or program is performing some function but there is no indication of what that function is. Moreover, even animations such as the hourglass or zooming of windows that are indicative of processes, cannot be used for graphical display of interactions with the representations of objects such as files and directories known to the operating system. This is another result of the fact that animations displayed by the operating system interface must be constructed in advance by software developers.

Another difficulty with WIMP interfaces for the operating system arises in the use of menus for the selection and execution of most operating system commands. For many users, this is an improvement over the old command line interfaces in which a user had to remember the correct text string identifier and avoid typing or spelling errors in order to locate the correct mouse responsive text string for a command is a nuisance for many computer users. It generally requires that the mouse pointer be moved away from the workspace and that a number of hierarchically organized lists be scanned for the desired command. Although accelerator key sequences are normally available for command selection, most computer users find them difficult to learn and use. This is because they normally require that a control key be used in conjunction with another key. A user is forced to remove the hand from the mouse to press keys, an action that tends to disrupt the orientation of the mouse pointer and require recalibration of hand and eye in order to resume work with the mouse.

Recently, software developers have created application programs that allow a suer to configure an alternative desktop interface to the ones provided by standard operating systems. These programs extend the underlying representation of an icon and allow icon graphics to be different sizes and shapes from the stand 32 by 32 pixel icons available in the usual operating system interface. They do this by requiring that users select icons from a large set provided by the interface developers. Edmark's *KidDesk* is an example of such a program that extends the desktop metaphor for use by young children. The software can be set up to provide young children with access to a small set of programs. Like windows-based software for adults, it is limited to a single graphical view, and a set of predesignated icons.

The handling of user interaction with and display of the files and directories that make up the computer's file system is a central function of any operating system interface. As noted earlier, command line interfaces which required a user to repeatedly invoke a sequence of commands like DIR and CD in order to examine the file system have been particularly difficult for users. Since it is so difficult and time consuming to navigate a file system using a command line interface, file system management programs were developed for hierarchical files systems. Most of these programs include a quasi-graphical representation of the file system "tree" so that the user can see at once (or in a few screens) how directories, subdirectories and files are organized relative to each other. File system management programs improve on the bare command line interface by continuously displaying command menus and/or file lists. The interface provided by these programs, however, is mainly text based. The user is forced to read listed information. With the exception of the actual text, all files and directories look the same, i.e. a line of text. Only the relative location of the lines of text in the hierarchical tree gives a clue as to how the files and directories are related.

WIMP interfaces for the operating system allow for improvements in the earlier file system management programs by enabling the use of separate windows for the display of directory contents and allowing some files to be executable when they are clicked on with a pointing device. In the Apple Macintosh, file system management is included as part of the operating system while Microsoft Windows and IBM's OS/2 include a similar File Manager program along with the basic operating system. In each of these systems, the user can explore and navigate through the file system by pointing and clicking on icons with the aid of a mouse or other pointing device. For example, in order to view the contents of a disk, the user would locate the mouse pointer on the icon of the disk and click the mouse button twice.

In the Macintosh, which offers the greatest functionality in file system management, the interface responds to mouse clicks by opening a window which contains icons representing directories and files contained on the disk. Beneath, or alongside, each icon is the name of the file or directory. When displayed in one mode, each icon resides on a line followed by the name of the file, the size of the file, the date is was modified, etc. By simple pointing and clicking the mouse, the user can rearrange the icon display alphabetically, chronologically, by size, etc. The icons remain visible on the screen until the user closes the window with an appropriate mouse click. If there are more icons than can be displayed on the screen, the window contents can be scrolled horizontally and vertically. This is much more useful than the directory list in a command line interface which scrolls quickly off the screen and cannot be scrolled backwards. Moreover, each of the directory icons will appear to respond to mouse clicks by displaying their contents either in another window, or in a hierarchical tree within the same window. Depending on the size of the display screen, the user may view the contents of several directories side by side. Files and directories can be moved or copied by clicking on their icons and dragging them onto the icon of the directory or disk to which they are to be copied or moved. This is much more convenient than typing "copy directory1\subdirectory1\filename directory2\subdirectory2\filename" to copy a file. Moreover, several icons can be selected by the mouse and dragged as a group to a new location. Files, groups of files, and entire directories are deleted by dragging them to a graphic icon that depicts a trash can. Files and/or groups of files can be opened, or programs executed, by clicking with the mouse. Some program icons may be responsive to "drag and drop" operations so that if a file icon is dropped onto the program icon, the program will perform some operation on the file.

Improvements in usability of WIMP based interfaces to the file system are mainly a result of the fact that better use is made of the computer monitor "real estate" to organize and display information about the relationships among directories and files. With these interfaces, computer users are able to view the file system structure in a few screens or windows. When necessary, the use of a pointing device makes it easy to switch among these windows to refresh one's memory and develop a complete mental picture of the file system structure. Because the capacity of storage devices such as hard disks and CD-ROMs is increasing and networked file systems are becoming prevalent, existing interfaces for file management are not able top effectively aid users attempting to manage or browse the enormous numbers of files now available to them. Very large numbers of windows must be opened to traverse a large file system and displays of directory trees have begun to require many screenfuls of text. When this is the case, graphical displays of the file system begin to resemble the old command line interfaces because it is no longer possible for a user to examine the file system structure in a small number of views.

There has recently been a great deal of research focused on improving the ability of users to organize, browse, and retrieve files from very large file systems. Advances in computer processing power and computer graphics have enabled the development of software tools that attempt to utilize the capacity of the human visual system for rapid processing of large volumes of information. Views, visual abstractions, and other information visualization techniques have been applied to the problem of finding and organizing files in a computer file system. For example, Cone Trees increase the amount of information (e.g. the number of files displayed) by extending diagrams similar to those provided by existing file management programs into three dimensions and adding animation (e.g. rotation of the trees). These techniques are based on the use of overviews and visual abstraction of directory structure. They may be useful for navigating a file system structure in which the files are either already known to the user or are easily describable by text string names. They do not offer much help to a user exploring unknown file systems such as would be found on a network because text string names are generally inadequate as descriptions of file or directory contents.

Abstraction oriented methods work by removing cues that are not directly relevant (e.g. by displaying only the structure of a file system). For these tools, operating system limitations on graphic icons described earlier are not a problem because small generic icons and/or text strings are the preferred representation for file system objects. A different approach to the problem users have locating and identifying files in a computer file system is to support the human proficiency in using unusual features of phenomenon to index and retrieve information. MEMOIRS, a file management tool designed for adults, uses this approach by providing facilities to trigger memory for events as cues in recognizing and indexing files. However, event based retrieval cues are even less useful than text string names when browsing an unfamiliar file system. None of these methods has made use of the known human capacity for making use of detailed visual information and the use of distinguishing visual detail for both recognition and recall. Presently exploration of unfamiliar file systems, learning file system structure, and retrieval of particular information from a file system must take place with few effective mnemonic cues. Moreover, it is not possible to utilize the power of complex, detailed images to convey information in order to orient and acquaint a user with the contents of an unfamiliar file system. While "a picture is worth a thousand words", explorers in cyberspace must contend with a two or three word description and, perhaps, a 32 by 32 pixel icon to indicate the contents of a directory or a file.

Existing interfaces for file management, like that of the Macintosh, have been designed in accordance with the desktop metaphor. The use of windows to demarcate different directory listings, text string descriptions of files and directories, and even the graphic icons of file folders and paper pages that denote directories and files have been constructed to resemble a desktop environment. While the desktop metaphor works well for task switching among applications, and the windows metaphor is suitable for applications in which text or numeric symbols are organized into separate documents, e.g. text processing or spreadsheets, for tasks in which traversal of a space is the predominant characteristic a "worlds" metaphor is more appropriate. Here the space can be organized in a graphical analogue to the physical world in which magical and physical properties can be intermixed to fit the task (Smith, 1987). One can move through the abstract space by physically traversing the graphical world represented on the computer display. In fact, the original research on Rooms was intended to convey the impression of an complete office environment which included a desktop workspace. In its development into the Macintosh operating system interface, it's scope was restricted to the desktop alone.

Recent advancements in computer graphics outside the realm of operating systems have enabled the development of highly intuitive application programs—particularly in the areas of education and entertainment. Mush of this technology has been given the epithet of "multimedia" because it combines high resolution graphics, animation, video, and sound as well as ordinary text. There are now a large number of software application programs that use multimedia to create the impression of a complex "world" that can be traversed. In these applications, the user is presented with screens of graphical information. Each screen can have several hot spots that behave like operating system icons in that they respond to pointing and clicking of the mouse pointer. Typical actions in response to clicking on a hot spot include: displaying another screen of graphics, playing a sound, displaying an animation, displaying text, displaying a video, or a combination of these actions. Navigating a well designed hypertext application can give the impression of walking around in the real world. The user can look at where the user wants to go and to there by clicking the mouse pointer on an icon that points in that direction. The user can examine objects by pointing and clicking on them. The user can pick up objects, put them away, carry them, return to where the user started and go off in another direction. Some of these applications contain virtually no text at all and the user freely "walks" through thousands of graphic screens, views video clips and hears sounds along the way. For example, the user may enter through the door of a building by clicking the mouse pointer on the door and see many bookshelves inside. As the user approaches a bookshelf, by pointing the mouse pointer at the bookshelf and clicking the mouse button, titles of the books come into view. The user may select a book by clicking the mouse pointer on the spine of the book and the book will open showing the contents of the book. Pages are turned forward or back by clicking the pointer on the corner or edge of the page to be turned.

Hypermedia applications that make use of a worlds metaphor appear to be particularly appealing to children. The worlds metaphor has been used widely and very successfully in video games and in educational software such as Broderbund's *Treehouse and Myst*. Recent worlds based programs, such as Knowledge Adventure's 3*D Dinosaur Adventure,* use three dimensional graphics to better convey the impression of movement through a realistic space. In addition to the games programs that are now commonplace, there has been research on applications to display pictures in a museum and other types of information.

In all these cases, the use of a worlds metaphor requires that the graphical world be constructed by an application developer. With the exception of the alternative desktop programs such as *KidDesk,* described earlier, hypermedia software applications are not intended to be used for general access to the file system and computer operating system. Users traverse the multimedia world designed by application developers by following hypermedia links or by moving a mouse pointer through a predefined three dimensional model. A user can not add information or extend the world except in limited predefined ways. A necessary feature for an interface to the computer operating system is to provide a user with the ability to add or remove file objects in the underlying file system and their representations in the interface. Alternative desktop programs solve this problem by using hypermedia technology to allow the user to select from a fixed and finite set of graphic icons to use as representations for their files or programs. As noted earlier, a user of alternative desktop programs can only use graphics that have been predefined by the application developers, graphic icons for files and directories are independent of the context in which they reside, that is, a fixed graphic background (or user selectable set of backgrounds) is provided by the application developer, and operating system actions are not represented at all. Moreover, apart form ordinary operating systems icons, it is not possible for a software applications developer to develop a graphical representation for a program that will be visible to the user of the alternative desktop program. Instead, the user of an alternative desktop must reinstall each new application program into the desktop by linking it to one of the icons included within the desktop software. Because users cannot make use of graphical icons and backdrops designed by the application developers for their programs, icons are likely to be even less representative of file and directory content than are the limited graphic icons and text string names available in an ordinary operating system interface.

User definable hot spots that respond to mouse clicks are provided by hypermedia authoring tools such as Apple's *Hypercard,* IBM's *Linkway and AVC*, Asymetrix' *Toolbook*, Macromedia *Director*, and others. Once defined, these hotspots behave like the icons in an operating system interface in that they respond to mouse clicks by executing an action. Unlike operating system icons, hot spots defined using a hypermedia authoring tool can be represented by any graphic and can be linked to any type of behavior. Authoring tools are intended to be full featured programming languages for development of multimedia applications. In addition to allowing the definition of mouse responsive hot spots, they generally offer features including the display of raster graphic images, animation, video and sound playback, control over synchronization of sound and animation or video, and the ability to link hot spots to actions including execution of programs written in more general programming languages such as C. Many authoring tools also include draw programs for the construction of raster graphic pictures and wave editing programs for sound creation.

These programs are very powerful and give a skilled programmer the ability to create the sophisticated hypermedia applications described above such as *Myst* or *Treehouse.* Learning to use these tools to develop a hypermedia application generally takes many weeks or months and is therefore an activity normally carried out only by professionals or committed hobbyists. Moreover, it is generally necessary to make use of more specialized development tools to produce the graphics, sound, and animations required for a hypermedia application. Most applications created using these tools require programs written in more general programing languages such as C for the execution of hot spot actions or to maintain application data structures. The authoring tool simplifies the job of programming a multimedia hyperlinked application by giving a programmer ready made modules for multimedia such as animation and sound playback, and providing an interface that makes it easier to view, cut, and paste graphics and sound developed elsewhere, and to link the display of graphic scenes or execution of arbitrary actions to hotspots. Nevertheless, using these tools it normally takes many hours or months and programming by skilled artisans to develop a hypermedia application.

SUMMARY OF THE INVENTION

It is therefore an object of the invention to provide a graphical user interface for an operating system in which different directories and associated with different pictorial graphics so that the user is presented with a graphical indication of which directory is the currently selected directory.

It is also an object of the invention to provide a graphical user interface for an operating system in which the user can link or append new pictorial graphics to directories.

It is also an object of the invention to provide a graphical user interface for an operating system in which icons are not limited to a preset size and shape.

It is another object of the invention to provide a graphical user interface in which the contents of a directory are displayed as pictorial elements in a pictorial graphic image which identifies the directory.

It is still another object of the invention to provide a graphical user interface in which a pictorial graphic image which identifies a directory is scrollable in at least two directions.

It is yet another object of the invention to provide a graphical user interface in which the user can create new icons by selecting portions of a pictorial graphic image which identifies a directory.

It is also an object of the invention to provide a graphical user interface in which icons are animated.

It is another an object of the invention to provide a graphical user interface in which icon animations may be unique to an icon and an operating system action.

It is also an object of the invention to provide a graphical user interface for an operating system in which icon animations are generated automatically by the interface.

It is another object of the invention to provide a graphical user interface in which operating system actions are represented by an animated character.

It is still another object of the invention to provide a graphical user interface in which different operating system actions are represented by different animations.

It is yet another object of the invention to provide a graphical user interface in which different operating system actions are represented by different animations which are accompanied by sound output.

It is also an object of the invention to provide a graphical user interface in which different operating system actions are represented by different animations which are accompanied by sound output and the animations and sound are metaphorical of the operating system actions.

It is another object of the invention to provide a graphical user interface in which the user initiates operating system commands and other commands by controlling the actions of an animated character.

It is still another object of the invention to provide a graphical user interface in which the user initiates operating system commands and other commands by controlling the actions of an animated character with a button based input device such as a game pad controller device.

It is also an object of the invention to provide a graphical user interface having all of the above described features and in which the graphics, icons, sounds, animated character, and animations are definable by the user.

It is another object of the invention to provide a graphical user interface in which user input is derived from a minimal button based device such as a gamepad controller.

It is still another object of the invention to provide a graphical user interface in which user input is derived from a minimal button based device and where the mapping of keycodes is augmented with context and argument semantics so that a single button press will have a different effect at different times.

It is also an object of the invention to provide data structures, internal procedures and user level commands which effect a graphical user interface as described above.

In accord with these objects which will be discussed in detail below, the pictorial user interface of the present invention includes a pictorial image which is linked to a file directory and which identifies the file directory. Objects in the pictorial image are icons linked to file objects and an animated character is overlaid on the pictorial image. User input causes movement of the animated character relative to the pictorial image and animates objects in the pictorial image. Input from the user is preferably through a limited input device such as a gamepad controller, a mouse, or by using a limited number of keys on a normal keyboard. Input signals are mapped according to keycode identical command sets, context arguments and selection arguments.

There are preferably three classes of commands: OS Commands, Pictorial Object Commands, Interface Utility Commands. OS Commands correspond to the operating system commands of the underlying operating system and include such commands a copy_file, change_directory, display_directory, etc. Pictorial Object Commands are used to define and modify the pictorial user interface. Such commands include link_directory_image, define_icon, etc. Interface Utility Commands are used to change and maintain the runtime state of various portions of the pictorial interface. Some of these commands allow the user to select and direct input or output for use with OS commands, e.g. collect_file_object, select_collected_object, etc. Other of these commands allow the user to change the settings of the interface, e.g. make_icons_invisible. Context and selection arguments typically relate to files, directories, icons, or pictures which are arguments for certain commands. Some commands may only use one argument. Other commands may use two arguments or no arguments.

Sequences or raw input signals are interpreted as "tokens" and are mapped to keycode-identical command sets. When a meaningful input signal is interpreted, the location of the animated character relative to the pictorial image is used to identify an icon and its associated file object as an argument. The combination of an argument and a key-code identical command set is mapped to a command code that uniquely defines a user-level command. The command code is used to access a basic execution unit which includes an executable command and a set of animations. The basic execution unit preferably includes a prologue animation, a command script, and an epilogue animation. The prologue animation is a way of echoing input to the user. If the prologue animation is not displayed, the user knows that the input signal was not accepted. The epilogue animation gives an indication of the results of the execution of the command script. Preferably, animation sequences which involve icons include a sequence for the animated character and another sequence for the icon which is underlaid with the character animation sequence to generate the animation to be played. According to a preferred embodiment of the invention, audio clips are linked to animation sequences. The animation sequences and the audio clips are preferably metaphorical of the command executed in the command script.

According to a preferred embodiment of the invention, icon animation sequences are created at runtime after the icons have been defined by the user. However, predefined icons may have predefined animation sequences. Character animation sequences are preferably predefined. While animation playback is generally tied to command execution, a calibration animation is used to move the animated character from the location and orientation it is in when a basic execution unit has finished execution to a location and orientation that is consistent with the starting frame of the prologue animation of the subsequent basic execution unit.

The presently preferred embodiment of the invention uses a top level function to control interaction with the user, the playback of animation sequences and the execution of commands. The control structure of the top level function takes a parse graph of valid command sequences, a command buffer, and an input command map as arguments and returns an argument which includes the results of command execution. The results of command execution are mapped to epilogue animations. This structure allows for nested commands and nested animation sequences and also provides one way to limit which commands a user may invoke during recursive iterations of a command execution. In addition, the semantics of input keys can be remapped during nested interaction with the user so that fewer input keys are needed. In this case, one input key can have several functions depending on the context in which it is pressed.

The pictorial user interface of the invention can be used as an overlay with virtually any operation system such as Unix or OS/2. It is preferable that OS support preemptive multitasking, but non-preemptive multitasking is sufficient. The invention supports alternative animations, pictures, and input signal mappings either at installation or during startup. For example, a user may select a character personality and accompanying animations at runtime. The user may also specify what kind of input device is preferred.

The pictorial interface of the invention is useful with virtually any file system but has particular utility with hierarchical file systems which need to be accessed in non-hierarchical ways. While the invention provides many features which allow for its easy definition and configuration by the user, definition and configuration is not necessary for each user. For example, a teacher or a parent may define and configure a particular pictorial environment for use by a child where the pictures and objects have particular relevance to the child. A vendor or advertiser may define and configure a particular pictorial environment for use by a client where the pictures and objects represent the vendor's goods or services. Other possible uses for the pictorial interface include: a virtual library, catalog, atlas, shopping center, mail system, etc. The interface allows a novice user to deal directly with a file system to access information in a pictorially intuitive way. Additional objects and advantages of the invention will become apparent to those skilled in the art upon reference to the detailed description taken in conjunction with the provided figures.

DETAILED DESCRIPTION OF THE PREFERRED EMBODIMENTS

The Pictorial Display

Figure 1:
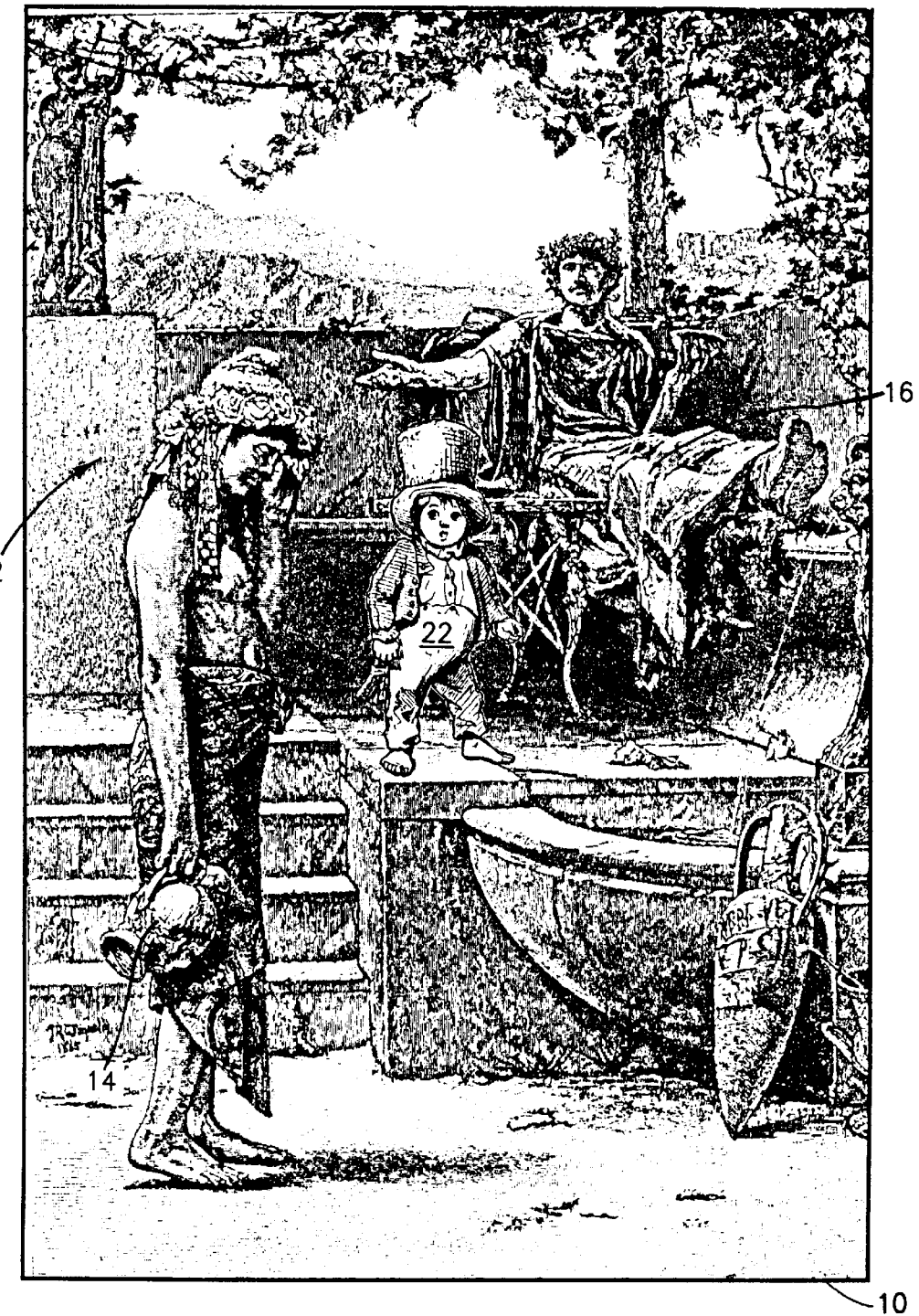
FIG. 1 is an example of screen view of a pictorial user interface according to the invention showing a portion of a scrollable pictorial image and an animated character.
Figure 1A:
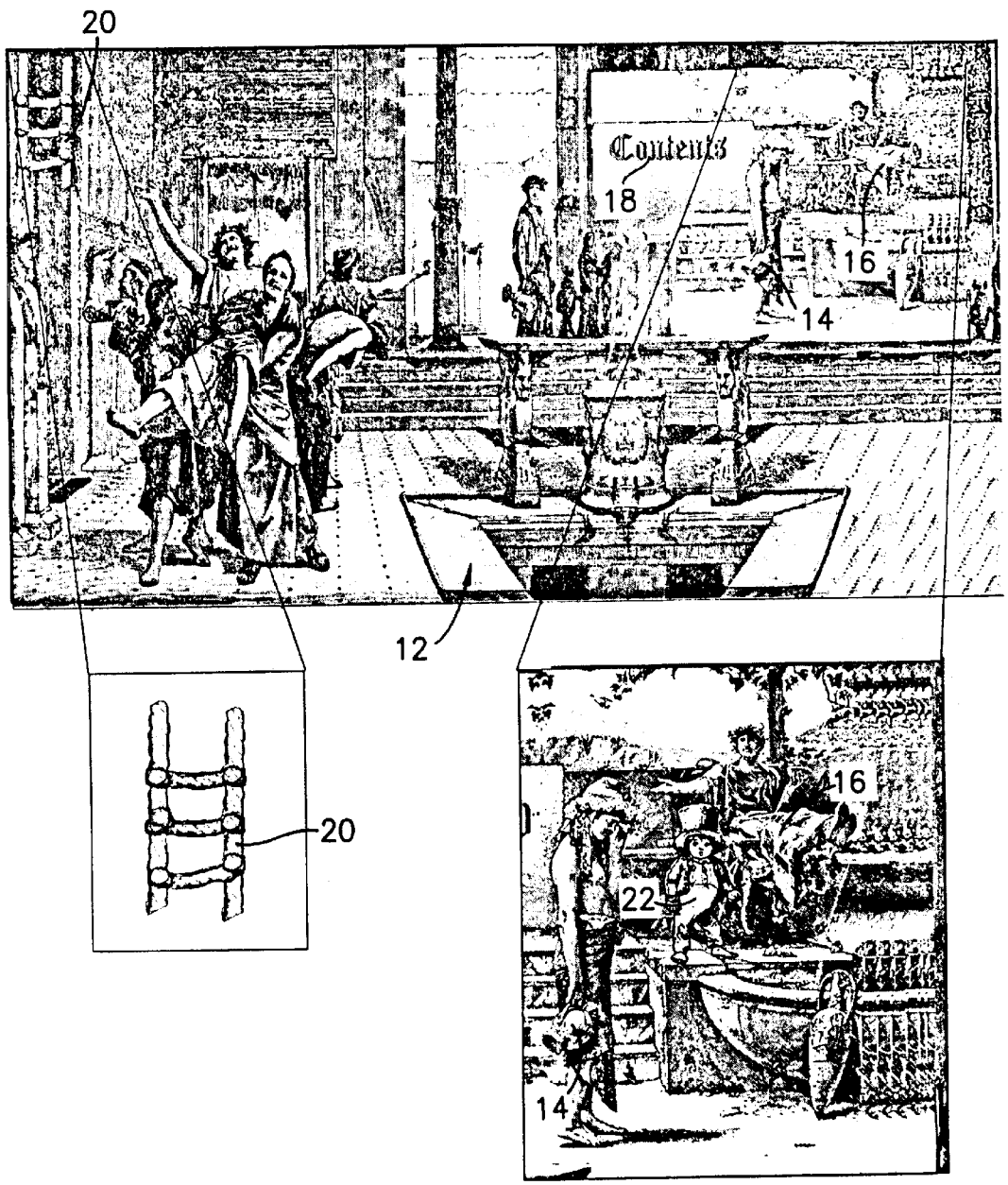
FIG. 1a is a view of the entire pictorial image of FIG. 1 with two portions of the image broken out.

Turning now to FIGS. 1 and 1a, the pictorial user interface according to the invention provides a screen display 10 of a pictorial background image 12 (FIG. 1a) which represents a directory in a computer file system. For example, the picture displayed in FIG. 1 is of a roman nobleman and slave which represents a directory whose contents contains a draft of a book on Ancient Roman History. According to the invention, the pictorial information in the background image 12 is preferably metaphorical of the subject matter content of the directory. Moreover, individual sub-images 14, 16, and 18 (FIG. 1a.) (hereinafter referred to as "icons" for simplicity) in the background image 12 relate to individual files or subdirectories contained in the directory represented by the background image 12. Each of these icons is also preferably metaphorical of the subject matter content of the file or subdirectory to which it relates. For example, the water urn icon 14 relates to a file about Ancient Roman ceramics and the nobleman icon 16 relates to a subdirectory containing information about the politics and government in the Roman Empire. At least one icon in the screen display relates to an ancestor directory unless the background currently displayed is the super root directory. For example, in FIG. 1a. the ladder icon 20 relates to the parent directory of the current directory. As seen in FIG. 1, the icons need not be rectangular and they may vary considerably in size. Although the invention attempts to obviate the need for textural information in the screen display, text may be included, at a user's option, within icons to further define their meaning. For example, in FIG. 1a. the stucco wall icon 18 includes the text string "Contents" to identify it as a file containing a Table of Contents to the book which is contained in the directory represented by the background image 12.

An animated character 22 is overlaid on the background image 12 and is made responsive to an input device (shown and described with reference to FIGS. 2 and 2a) so that a user can control the movements and actions of the animated character 22. According to the invention, the animated character 22 may be moved to different positions on the screen display 10 to interact with any of the icons in the background image 12. The animated character roughly corresponds to the cursor or pointer in a WIMP GUI. While a cursor normally has a single "hot spot", the animated character of the invention is preferably provided with several potential hot spots. Which of the potential hot spots is the current hot spot depends on the command code invoked by the user. The cursor as used herein is defined as a hot spot location in a coordinate system meaningful to the user, e.g. the display screen. The cursor preferably includes a rectangular region and a coordinate that places the region in a coordinate system meaningful to the user. The cursor can either lead or follow an animation. It can appear visually as a part of the animation or it can appear as a standard cursor. According to the presently preferred embodiment, the cursor appears as a component of the animated character (e.g. the foot of the animated character) such that the user controls the animation directly while the cursor hot spot is periodically updated under program control to align it with the animation.

The cursor hot spot is preferably tracked with respect to the background image coordinate system and/or an animation coordinate system. The function of the cursor is primarily to select icons or regions from the background image or from animation frames that have been overlaid on the background image. When the cursor hot spot is a component of an animation, the cursor hot spot may shift from one component of the animation to another. For example, the hot spot may be the character's foot for one command and the character's left hand for another. When the cursor hot spot is a component of the animation, the cursor location is preferably updated each time an animation has been played.

If the background image 12 is too large for the display screen 10, the image 12 is scrollable so that if the character 22 is moved far to the left, right, top, or bottom of the display screen 10, the background image 12 scrolls. Scrolling is preferably toroidal. According to the invention, when the character 22 is moved from one screen location to another, it exhibits an animation such as walking. When the animated character 22 interacts with an icon, both the character 22 and the icon exhibit an animation. The animation exhibited is preferably metaphorical of some operating system action.

As will be described in detail below, the background images and sub-images are selectable and definable by the user to relate to user specified files and directories. In addition, the animated character and its animations are selectable and at least partially definable by the user to relate to specific operating system actions.

The Input Device

Figure 2A:
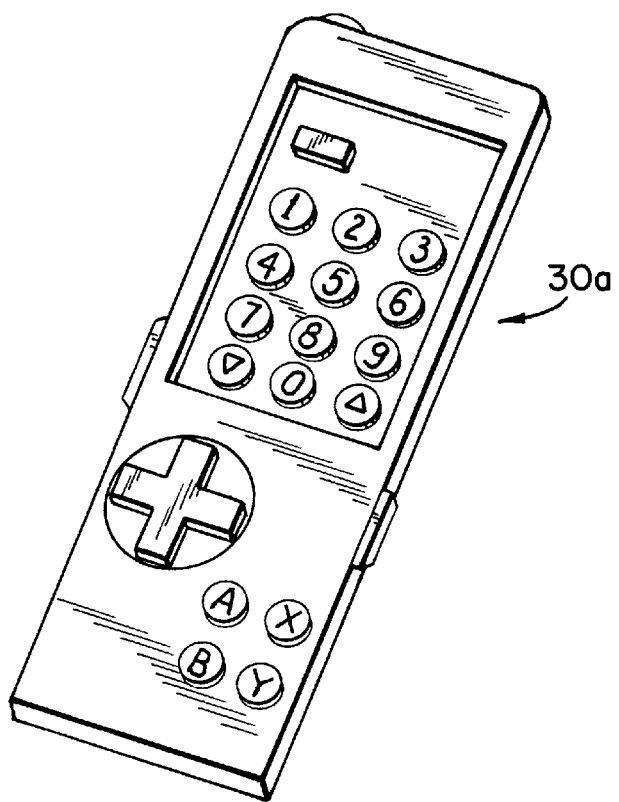
FIG. 2a is a perspective view of a wireless button based input device.
Figure 2:
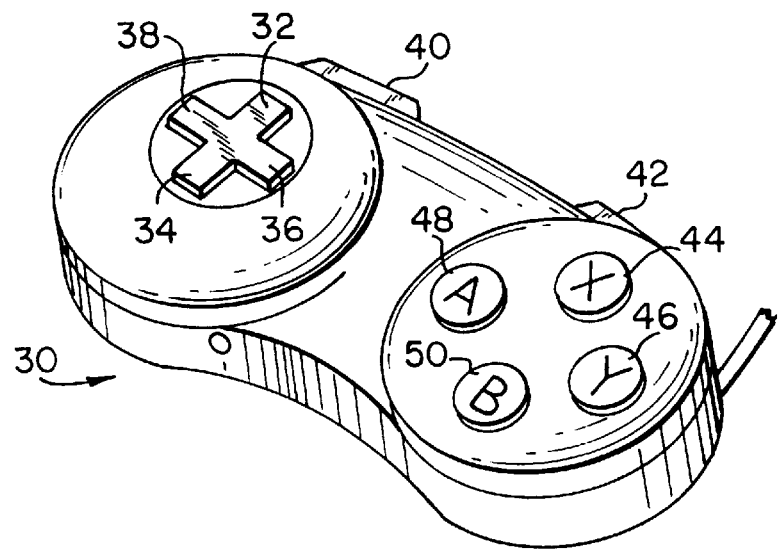
FIG. 2 is a perspective view of a suitable game pad controller for use with the interface according to the invention.

FIG. 2 shows a known game pad controller 30 which is suitable for use as an input device with the pictorial interface according to the invention. The controller 30 is a limited input device having ten buttons. Four of the buttons are arranged as a direction pad having a north button 32, a south button 34, an east button 36 and a west button 38. Two, buttons located on the front edge of the controller are designated the left button 40 and the right button 42. The other four buttons are labelled the X button 44, the Y button 46, the A button 48, and the B button 50. While the controller 30 is typically hard wired to the input port of a computer, it will be appreciated that a wireless infrared controller 30a, such as shown in FIG. 2a, could be used. It will also be appreciated that such a limited input device is not necessarily limited to ten input keycodes. Two or more buttons may be pressed in combination to effect many more than ten input keycodes. As a practical matter, it is undesirable to require that any more than three buttons be pressed in combination. According to the present invention, the button positions are mapped with context and selection arguments so that the same button combinations can have different results in different situations. Appendix A lists how the presently preferred user-level commands are mapped to the buttons of the game pad controller shown in FIG. 2. The button assignment is specified to comply approximately with the following logic:

LEFT Button commands for creation

RIGHT Button commands for deletion

B Button commands for "teletransport" to other "worlds"

A Button commands pertaining to icons

X Button commands pertaining to linking or moving objects

Y Button commands pertaining to file objects

NORTH, SOUTH, EAST WEST character motion

SOUTH (as modifier) commands pertaining to collected objects

The Basic Processes

The basic processes of the interface according to the invention are conveniently grouped according to three functional tasks: input interpretation, basic unit execution, and system control. Input interpretation includes parsing, mapping, and cursor control. The basic execution unit includes a prologue animation, a command execution, and an epilogue animation. System control controls execution of the basic execution units and input interpretation.

Input Interpretation

In low level parsing, signals (e.g. keystrokes) from the input device are parsed to identify meaningful sequences (e.g. A-button pressed, B-button pressed, A-Button released, B-Button released). A meaningful sequence of input signals will define a single keycode-identical command set. There are four basic mappings that are used for the interpretation of input. First, input signals are mapped to keycode-identical command sets as described above. Second, when a meaningful input sequence is received, the location of the cursor with respect to the active background image is used to identify an icon and its associated file object. Third, the combination of icon and command class is mapped to a command code that uniquely identifies a user-level command. Finally, the command code is used to access a basic execution unit that consists of an executable command and a set of animations. As mentioned above, some command classes do not take arguments. When the input sequence is determined to refer to one of these command classes, the identification of an icon (or argument) is not necessary.

In cursor control, the component of the animation that the cursor hot spot follows will generally have changed location when an animation has played. For example, if the hot spot is represented by the character's hand and the character has moved forward, the location of the hand will have changed. In addition, the cursor hot spot may have jumped to another component of the character. For example, when a certain command is invoked the cursor hot spot may jump to the character's head.

In the presently preferred embodiment, tracking of the cursor is accomplished by storing information about the cursor location with each character animation. As long as user input is not allowed to preempt animation playback, information about cursor location in the final frame of the animation is sufficient for cursor tracking. (If the user is allowed to preempt animation playback, cursor information should be stored with each frame of the character animations.) For example, the suggested animation for the change_directory command is for the character to jump onto an icon that references a directory file object. In this case, the cursor can be defined to be the rectangle that bounds the character's feet at the end of the jump, or as the character lands. When animation playback is terminated, the cursor location stored with the final frame of the animation is used to update the system global cursor, i.e. the cursor variable with global scope that is maintained in the top level function. To update the system global cursor the coordinates of the cursor in the final frame of the animation that just played must be translated to the coordinate system of the video viewport using the location of the final frame of the animation in the video viewport coordinate system.

In a WIMP GUI it is important that the cursor does not jump around the screen and that observable cursor motion is continuous. This is not the case in the pictorial user interface of the invention. Here the animated character is the entity that should demonstrate consistency in observable motion and location because the character is the focus of the user's attention. In fact, an advantage of the pictorial interface of the invention is that the cursor location can jump around to various parts of the animated character depending on what makes sense for the interaction of character and icon animations. Since the cursor location stored with each animation is set relative to the animation frame origin, registration of the cursor across animations is accomplished when animations are registered with one another via the character's center of gravity. The character's center of gravity is a point selected by the animation designer to be the relevant registration point. Preferably, the center of gravity os a registration point that makes sense anatomically, e.g. the center of the pelvis for a human character.

The Basic Execution Unit

The basic execution unit includes a prologue animation, a command script invoked by the user or through system control, and an epilogue animation which may be conditional upon the results of command execution. Basic execution units are the core processes of the pictorial user interface. Each command that can be invoked by a user is represented by data structures for basic units, e.g. a prologue animation, epilogue animations, and a command script. Basic execution units can be sequenced in any way or restrictions on allowable sequences of basic execution units can be defined. In the preferred embodiment, restrictions on allowable sequences of basic units are defined and enforce by designating a parse graph as one of the inputs to the top_level function which is described in detail below.

There are three classes of commands associated with basic execution units. One class of command is roughly equivalent to the commands available in the operating system. The exact commands of this class vary according to the operating system being used. A second class of command is used to create and maintain the pictorial representation of file objects. These are the commands that allow a user to define icons and link file objects to icons, and to perform other tasks in defining their instantiation of the pictorial interface data structures. Finally, there are utility commands that are used to change and maintain the state of various runtime data structures defined by the invention, such as the list that records objects collected by the animated character. In order for a character to collect objects and carry them along, utility commands are used to add objects to the collection, view collected objects, and discard objects from a collection.

Normally, arguments to commands are file objects or icons. In the preferred embodiment, a user can manipulate the animation to identify up to two arguments for a given command. These arguments have been labeled the context argument and the selection argument. Some commands will use only a context argument or a selection argument, some will use both a selection and a context argument, and others will not require an argument.

The context argument is defined as the file object associated with the icon within the scope of the cursor hot spot at the time the command is issued or after the last frame of the prologue animation has been played. The selection argument is identified by the user by issuing a set_selection_arg command prior to use of the argument by another command. In the preferred embodiment, the animation for set_selection_arg depicts the character picking up an icon. After a set_selection_arg command has been issued, the image of the icon selected will be merged with subsequent animations of the character so that the character appears to hold the icon until a reset_selection_arg command is issued.

Each prologue and epilogue animation is preferably made up of two separate animation sequences, one for the character's behavior and one for the icon's behavior in those commands which take arguments. In the presently preferred embodiment, frame animation is used. Using frame animation, the character and icon animation frames are merged by cel overlay prior to playback. Depending on the command being executed, other modifications to the stored animation frames may be required prior to playback. For example, in the preferred embodiment, if the selection argument has been set, the image of the selection argument is overlaid on each frame of the character animation to indicate which icon(s) has been selected.

The prologue animation is a way of echoing input to the user. For example, if the user presses the B-Button the character jumps into an icon. If the character fails to jump, the user will know that the input signal failed in some way. Similarly, the epilogue animation can be used to communicate the results of command execution to the user by associating a unique animation with each of the execution results that may be returned by the command.

Audio clips are optionally stored with each animation. They may provide sound effects or musical accompaniment to the animation action. In addition, audio segments may be associated with directories in the same way that images are associated with directories. The sound effects and/or musical accompaniment are preferably chosen to be metaphorical of the command associated with the animation or the content of the directory. In the preferred embodiment of the invention, audio segments associated with a directory override audio segments associated with character motion animations, but are preempted by audio segments which are associated with other character animations.

Figure 3:
FIGS. 3 and 3a through 3c are views similar to FIG. 1 showing how an object icon is defined by a user moving the animated character.
Figure 6:
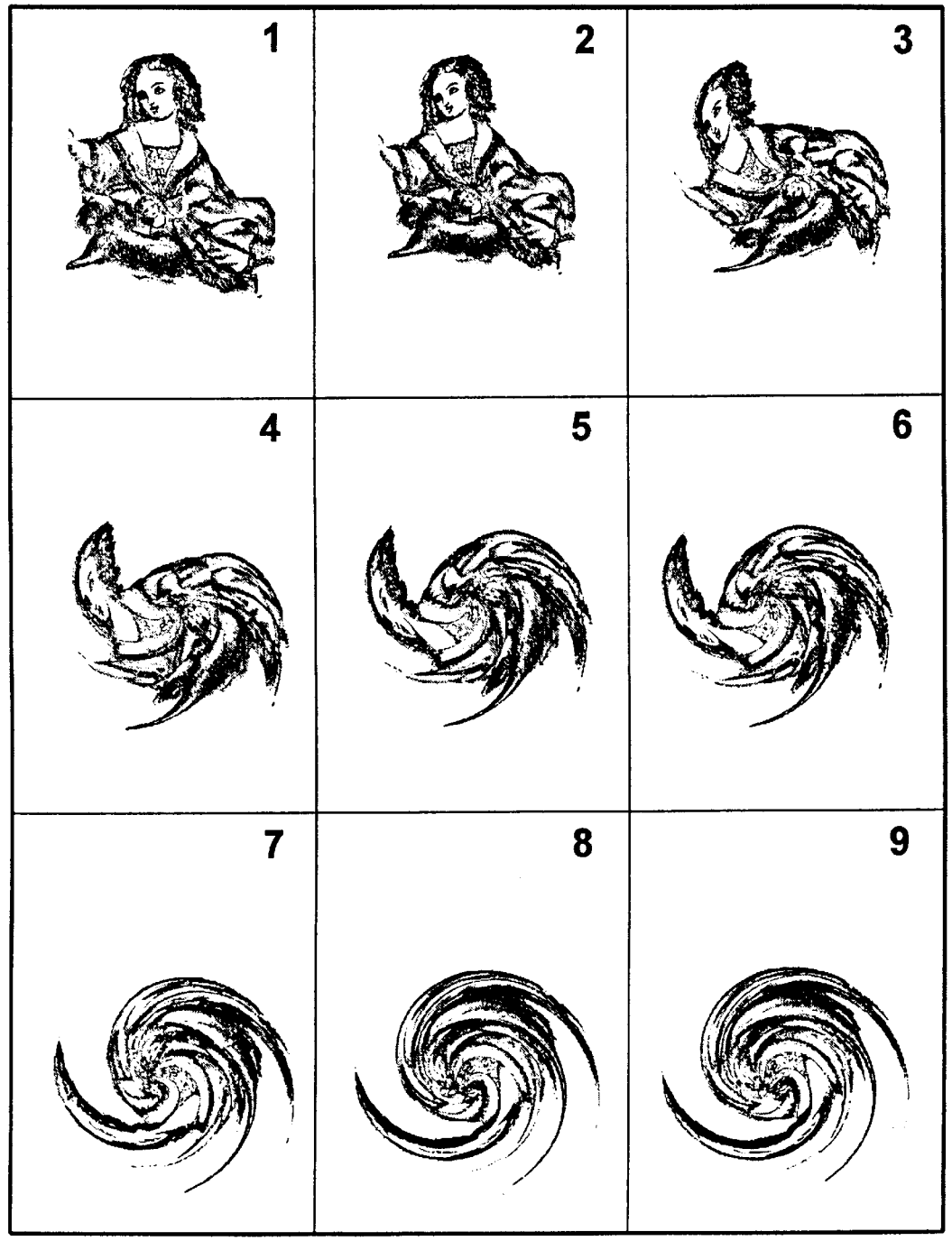
FIG. 6 shows an exemplary sequence of an icon animation.

Animations for icons are preferably not created until the icons have been defined by the user. This means icon animations will be generated at runtime. Depending on performance and storage capacity, icon animations can be generated at the time icons are defined or at the time the animations are invoked. Animation frames for icon animations are generated by image transformations using techniques for image distortion (e.g. warps, morphing, etc.) or particle systems. An icon animation generation function takes the icon image (after the mask is applied to the icon region) as input. It returns an animation sequence that shows the transformation of the base image. There are many well known functions for image warping and distortion that can be used to generate animations. Warping functions remap image pixels along specified trajectories in space and may include transformations in color or intensity as the pixels proceed along the trajectories. For most warping functions, pixel trajectories for an arbitrary image are computed automatically. In the case of morphing, trajectories are computed with reference to user specified pairs of points or lines. An animation is generated from a warp function by rendering each frame of the animation by computing the new location of each pixel in the image at discrete times as they proceed along the trajectory. FIG. 6. shows successive frames of an icon animation generated by applying a well known distortion function to the icon image of the girl defined in FIGS. 3–3c.

Particle systems are an alternative method of specifying the evolution over time of different components of an image. Hand placed transpositions of particles have been frequently used to generate animations of explosions or fire. In a particle system, the evolving location, color, and/or intensity of each particle (set of pixels) can be generated automatically using probabilistic rules. The selection of particles from an image region can also be done according to probabilistic rules. A number of well-known techniques such as particle systems or morphing can be used to write animation generating functions. In the presently preferred embodiment, it is assumed that an animation generating function accepts two arguments: the base bit map and a string variable that is parsed to obtain additional parameters, if needed. It is also assumed that each user-level command may use a different animation generating function for its icon animation. In the presently preferred embodiment, it is assumed that an animation generating function accepts two arguments: the base bitmap and a string variable that is parsed to obtain additional runtime parameters, if needed. It is also assumed that each user-level command may use a different animation generating function for it's icon animation.

Figure 4:
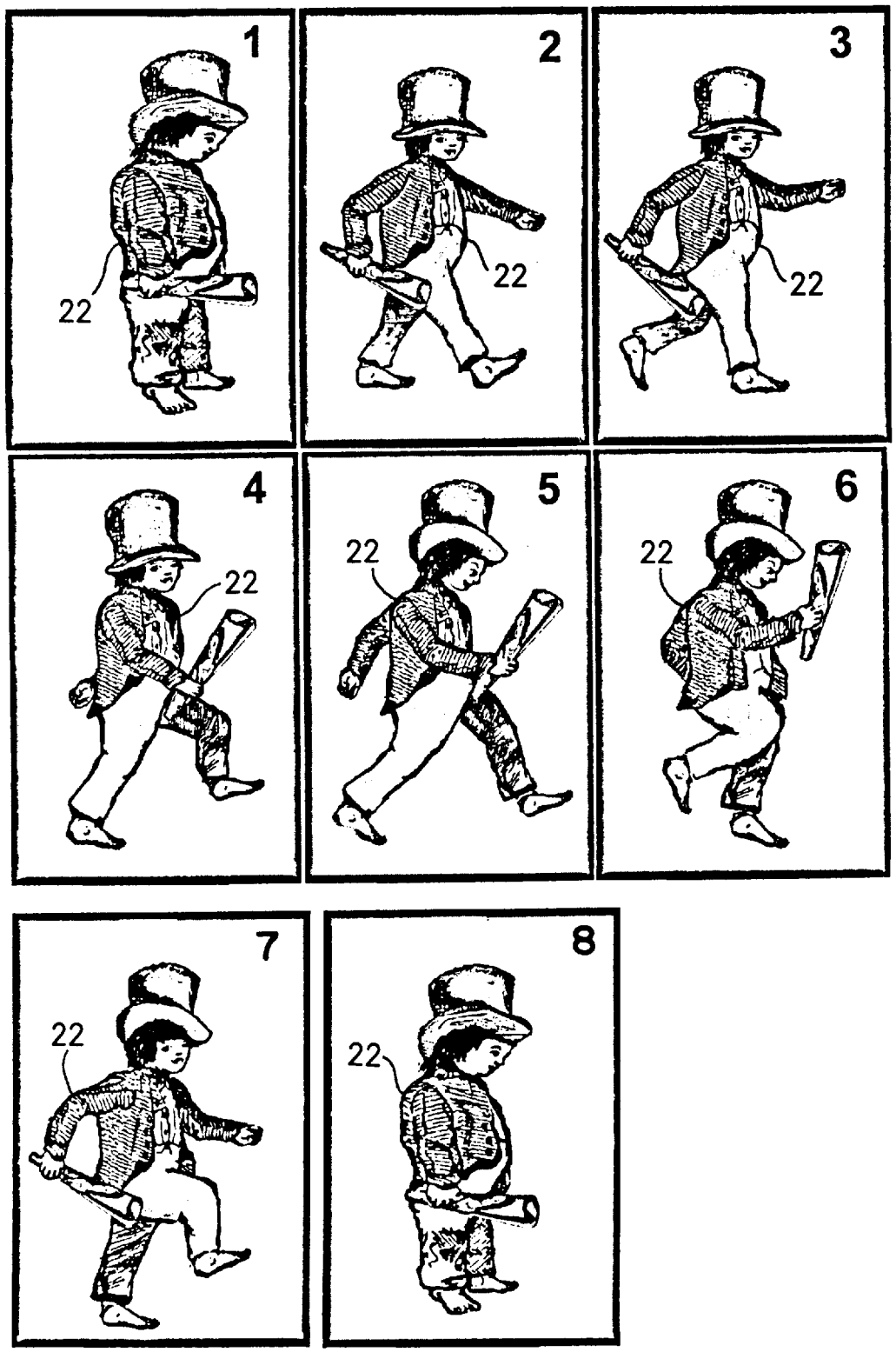
FIG. 4 shows an exemplary sequence of character prologue animation for the command display_directory_right.
Figure 4A:
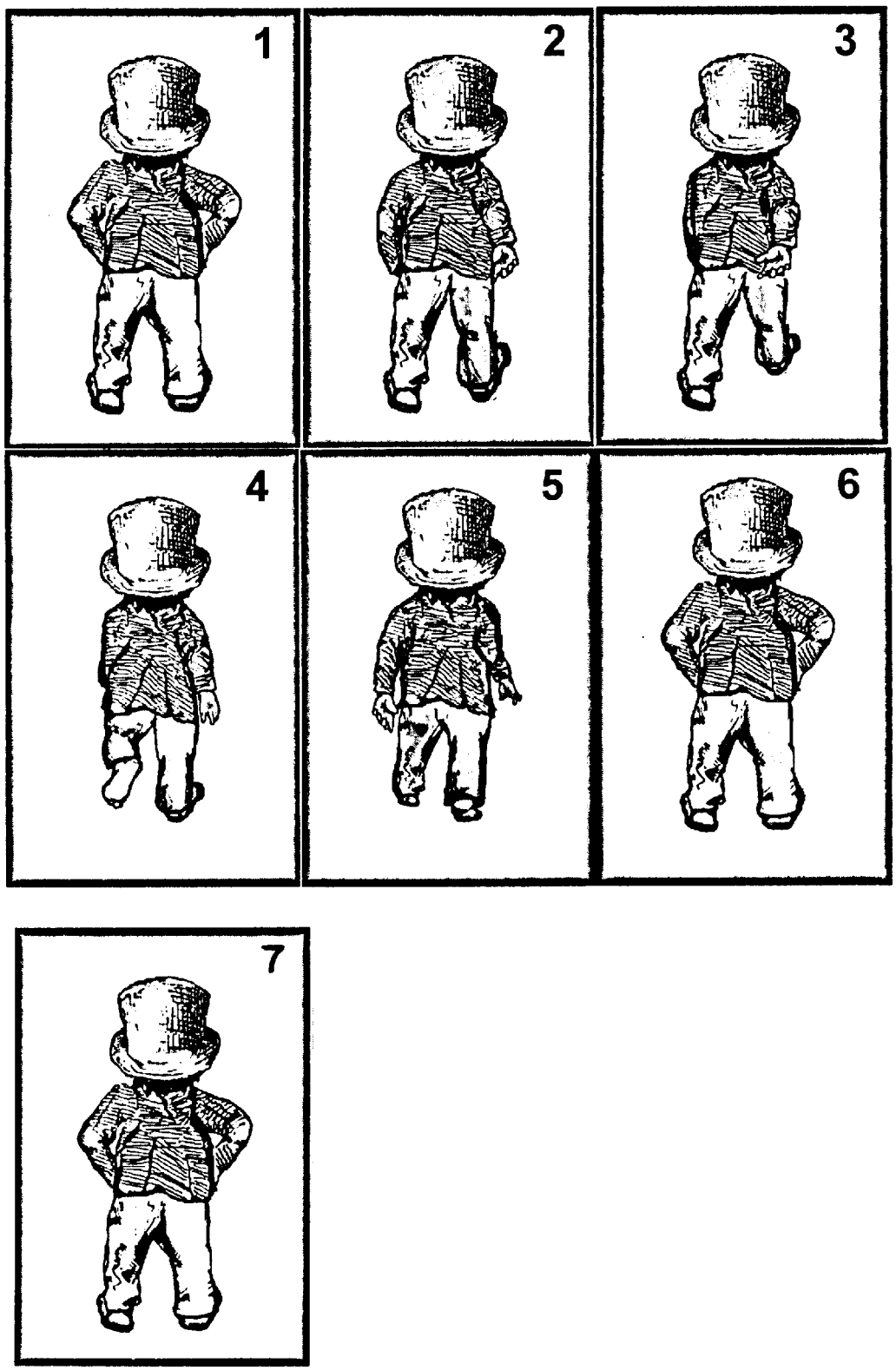
FIG. 4a shows an exemplary sequence of character prologue animation and epilogue animation for the command display_directory_up.
Figure 4B:
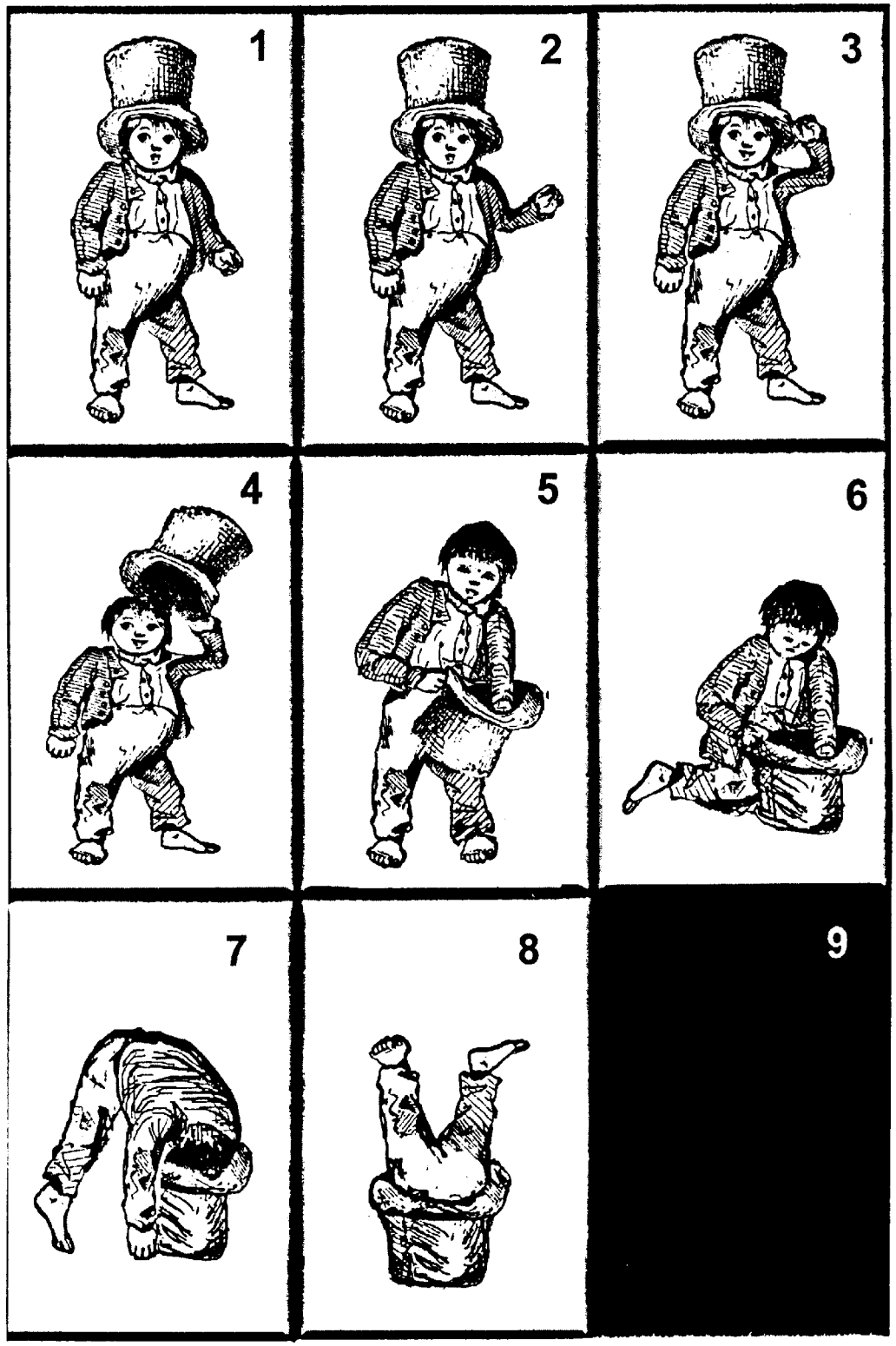
FIG. 4b shows an exemplary sequence of character prologue animation for the command collect_selection_arg.
Figure 4C:
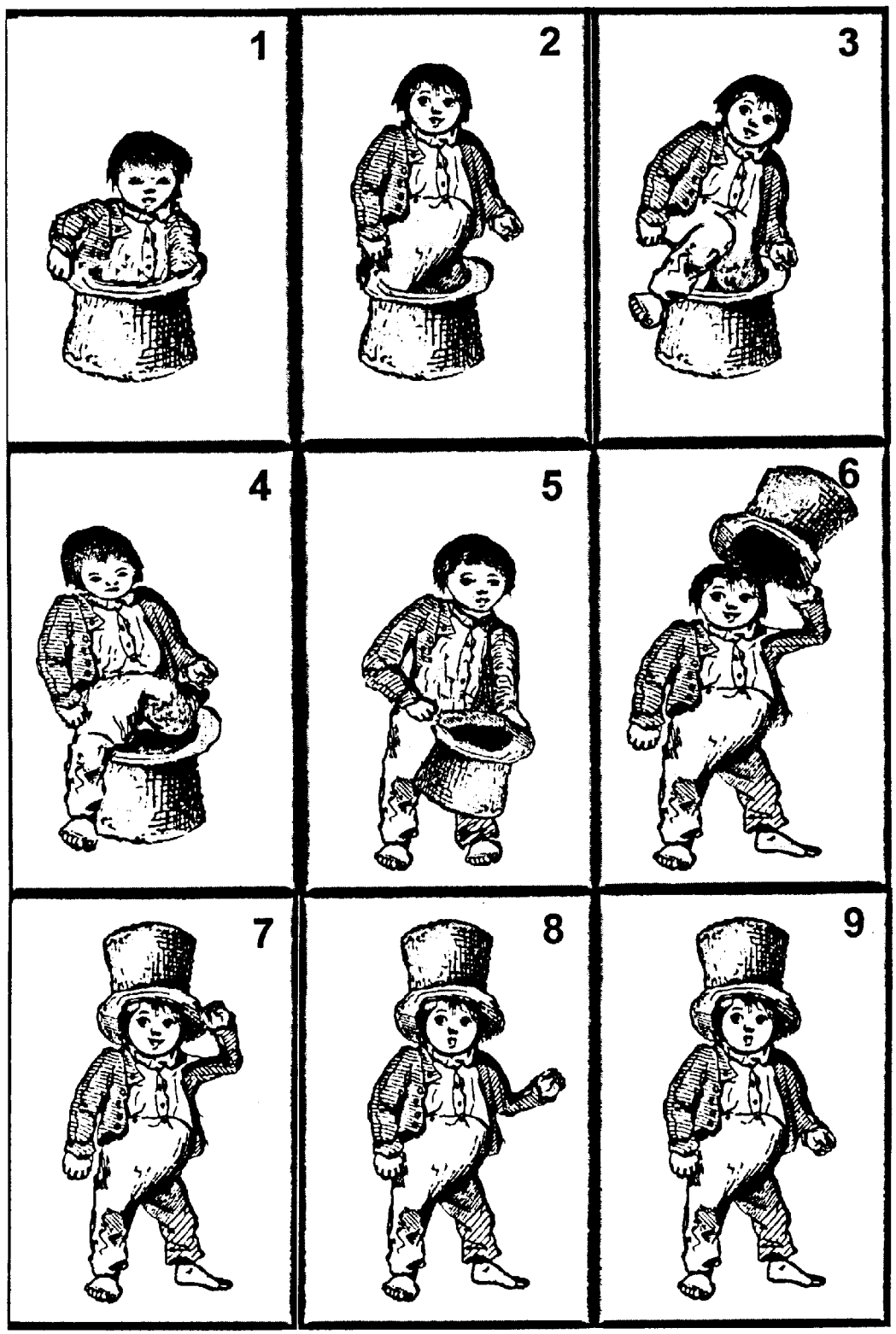
FIG. 4c shows an exemplary sequence of character epilogue animation for the command collect_selection_arg.

Icon animations are merged at runtime with character animations by the method of cel overlay. In addition, many animations are modified before they are played in order to depict special conditions of the interface state. For example, when the selection argument has been set, the character will appear to hold the selection icon in one hand. Modifications such as these can be accomplished using cel overlays on animation frames that have been annotated to identify appropriate regions, e.g., the hand. Information needed for the modification of animations by cel overlays can be stored with the header information for each animation. For example, the center of a selection argument will be registered with a point stored for each frame in an animation. Other information is optional. For example a bit mask can be stored with the animation and used to mask out portions of the selected icon so that it can be better integrated with the animation images, as when the character holds a rolled up poster in his hand and the hand appears to obscure part of the poster as seen in FIG. 4, for example.

Generally a stored animation sequence will need to be transitioned or "calibrated" to the current character and icon positions before being played. "Calibration" is used to ensure that the following constraints are satisfied:

(1) The current character position matches the character's position in the starting frame of the animation to be played. The match need not be exact but it must be within a well defined threshold.

(2) The current character location, direction and distance of motion in the animation will propel the character to the correct location for interaction with the icon.

Calibration can be accomplished by using known methods of inverse kinematics or dynamics or by using a technique that combines archetypal positions and location prediction. Using inverse kinematics, motion trajectories can be computed in reverse. That is, given a location and position for the character to be in at some point in the future, e.g. the position of the starting frame of the prologue animation to be played, the motion required to place the character at that position and location can be computed. The data structures that define the character model must be sufficiently detailed to support the calibration technique selected. For example, the use of kinematics to generate character animations at run-time would require that the character model minimally include joint locations and constraints on velocities for motion. Moreover, even with very simple, highly constrained kinematic models, rendering of the animation frames could be very computation intensive.

In the presently preferred embodiment of the invention, calibration of character movement to achieve smooth motion uses a simple model that includes a single registration point, such as the center of gravity defined earlier, and, for commands which accept a context argument, the location of the cursor in the final frame of the prologue animation. Location calibration is accomplished by determining cursor position by computing it at the final frame of all prologue character animations that are eligible to be played given the current input from the user. If more than one prologue animation is eligible, i.e. the keycode-identical command set has more than one member, the cursor location of the first prologue animation with an associated command that is consistent with the icon type determined by the predicted deposition of the cursor is used. This is a method that exploits a user's ability to estimate trajectories and predict the location of the cursor in controlling the animated character. It is assumed that a user will easily compensate for the predicted motion in controlling the animated character since this a constantly used natural action. For example, in reaching for a glass, a person first computes the inverse dynamics to determine how to control the arm and hand motion to land at the precise location of the glass.

Figure 5:
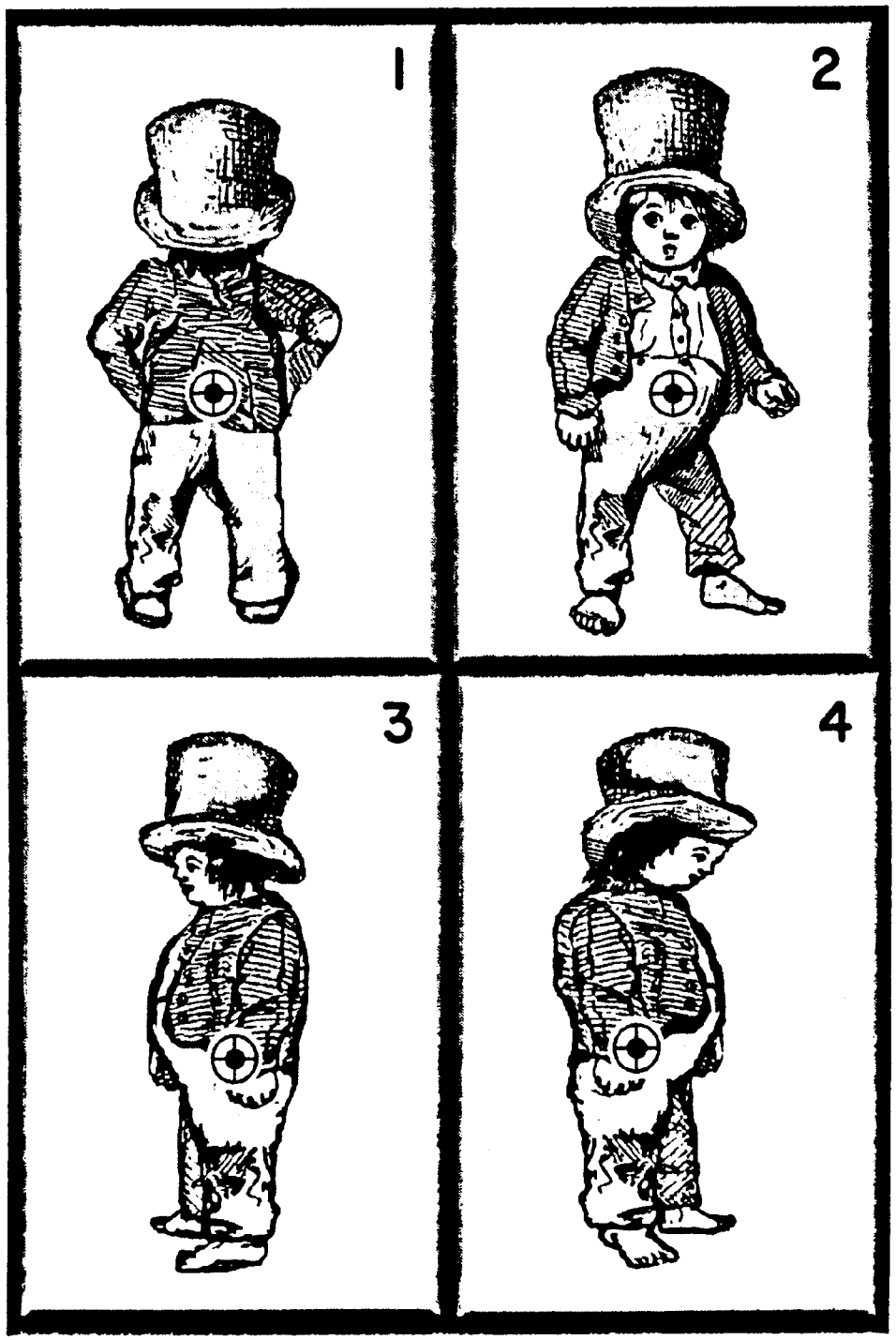
FIGS. 5 and 5a show exemplary sequences of character calibration transition animation with the registration point.

In the presently preferred embodiment, position calibration is accomplished using a set of archetypal positions and transition animations that are defined to moved the character from one archetypal position to another. FIG. 5 shows a set of archetypal positions. With the exception of a few special cases described below, all prologue animation sequence should begin and all epilogue animation sequences should end with a frame from the set of archetypal positions.

Figure 5A:
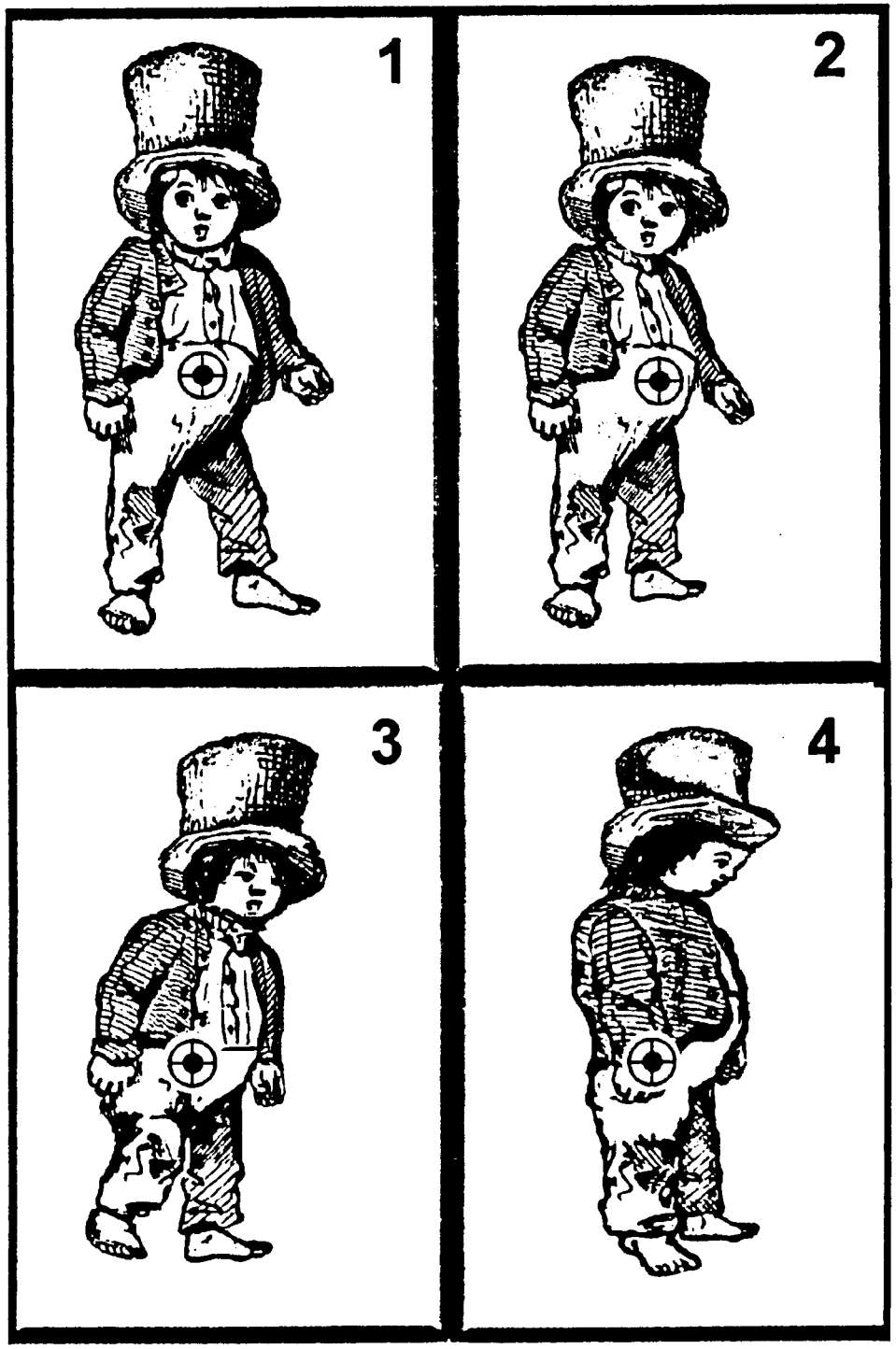

A transition animation sequence is provided for each pair of positions in the set of archetypal positions. FIG. 5a illustrates a transition animation that moves the character from the position in frame 2 of FIG. 5 to the position in frame 4 of FIG. 5. By appending the correct transistion animation sequence to the front of each prologue animation to be played, the character will appear to move smoothly from its current position, through the transition animation, and into the prologue animation. A registration point is defined for each archetypal position frame so that frames in transition animations can be appended at the correct location on the background image. In some cases, particularly for commands that are guarenteed to begin or end a recursive call to the toplevel function, the animation designer will wish to show a cut from one scene to a different scene. In such a case, the animation need not begin or end with a frame from the set of archetypal positions.

System Control

According to the invention, a "toplevel" function controls interaction with the user, the playback of animation, and command execution. The toplevel takes a parse_graph (e.g. a declarative representation of a finite state machine) that defines valid command sequences as an argument. A basic execution unit is executed only if it the command associated with it is defined as a next state in the parse graph. (Parse graphs are discussed below in the section entitled "User-Level Commands"). The toplevel also takes keycode_grammar as an argument. This allows key sequences to have different semantics within the scope of a recursive call. It also allows a command to mask user input prior to making a recursive call to toplevel. This is a second method (in addition to the parse_graph) by which the set of commands that the user may invoke can be restricted within recursive calls to toplevel. Commands are allowed to make recursive calls to toplevel in order to provide for nesting of basic execution units. When called, the toplevel returns an argument, e.g. a pointer to a character string.

According to the presently preferred embodiment, the toplevel also takes a command_buffer as an argument. By inserting commands into the command_buffer, commands can invoke other commands under program control. This does not add functionality (commands could insert input signals into the input buffer in the simplest control structure) but it does simplify the implementation.

The results of command execution are mapped to epilogue animations and the map is used to select which epilogue animation to play. A procedure is invoked to calibrate the animation sequence just completed to the one about to execute in order to ensure smooth motion during transitions. The calibration animation procedure is described below in the section entitled "Internal Procedures". In general, however, it is an executable function that accepts a starting position and an ending position as an argument and returns an animation sequence that moves the character from the starting position to the ending position. The control structure for the presently preferred embodiment of toplevel is:

```
toplevel (parse_graph, keycode_grammer, command_buffer)
  do until current_state is a terminate command or a leaf in parse_graph
    if command_buffer is empty
      get use_input from input_buffer
      map use_input to keycode-identical_command_set
      map context argument and basic unit
        from cursor location, background_image,
          and prologue_animations associated with
          keycode-identical_command_set
    else get basic unit and arguments from command_buffer
    if command follows current_state in parse_graph
```
-continued
```
      get calibration animation
      play calibration animation
      do /* execute basic unit */
        play prologue animation
        execute command
        map results of command execution to find epilogue animation
        play epilogue animation
      end do
      update current_state in parse_graph
    end if
  end do
  return result
end toplevel
```

This control structure makes it possible to nest animation sequences. With nesting, error handling and command specific dialogues with the user, toplevel can utilize the structure of a basic execution unit in a disciplined manner. During user interaction subtasks, "child" animation sequences can be invoked using this control structure. This has the benefit of preserving a single structure of interaction with the user, a uniform set of data structures, and it simplifies code development. Subtasks such as error handling routines or requests for confirmation can implement prologue and epilogue animation sequences with the same type of data structures, e.g. input_animation_map, as are used for commands that are directly invoked by a user.

For example, the quit command, according to the presently preferred embodiment, illustrates the use of nested basic execution units. The prologue animation depicts the character looking disappointed and asking, "Are you sure?". A nested animation sequence reveals two signs on the background, one saying "quit" and the other "quit" with a crossbar drawn through the word. The used moves the character to the desired sign and pushes the B button. The epilogue animation of the nested sequence shows the signs explode and the nested sequence returns to the toplevel sequence. The epilogue animation of the toplevel sequence shows the character wave goodbye or, alternatively, wipe his brow in relief. The result is a sequence of animations in which the character looks towards the user and asks, "Are you sure?", responds to input from the user by selecting a sign, and finally, depending upon the input from the user, either waves goodbye or wipes his brow in relief.

The input_buffer will normally be flushed prior to a recursive call to toplevel. Recursion should be carefully controlled to avoid transitive chains in command calling sequences in which a sequence of commands can loop indefinitely. This can be done by defining parse graphs to restrict command execution within any recursive call to toplevel. Restrictions on allowable sequences of basic units can be used to prevent transitive chains. In addition, parse graphs can be defined to require particular interaction scenarios with the user. In the presently preferred embodiment an empty parse graph is equivalent to a completely connected parse graph, i.e. there are no restrictions on command sequences. This simplifies the implementation so it is not necessary to define every state and transition in the parse graph unless it is to be restricted.

The semantics of input keys can also be redefined for the duration of a nested interaction with the user because toplevel accepts the input_command_map and the parse_graph as inputs. This feature allows a designer to reduce the number of input buttons which must be manipulated and learned by the user. For example, in the preferred embodiment, the B-Button is normally used for default activation of an icon but within the dialog nested in the define_icon command, the B-button is used to define the corners of a rectangle.

Recursive calls to toplevel normally conforms to the following script:

1. flush input buffer;
2. insert commands into command_buffer, if necessary;
3. call toplevel with an appropriate input_command_map and parse_graph as input.

Execution is terminated when a terminate command is invoked or if a terminal state in the parse graph is reached.

Figure 3A:
Figure 3B:
Figure 3C:
Figure 3D:
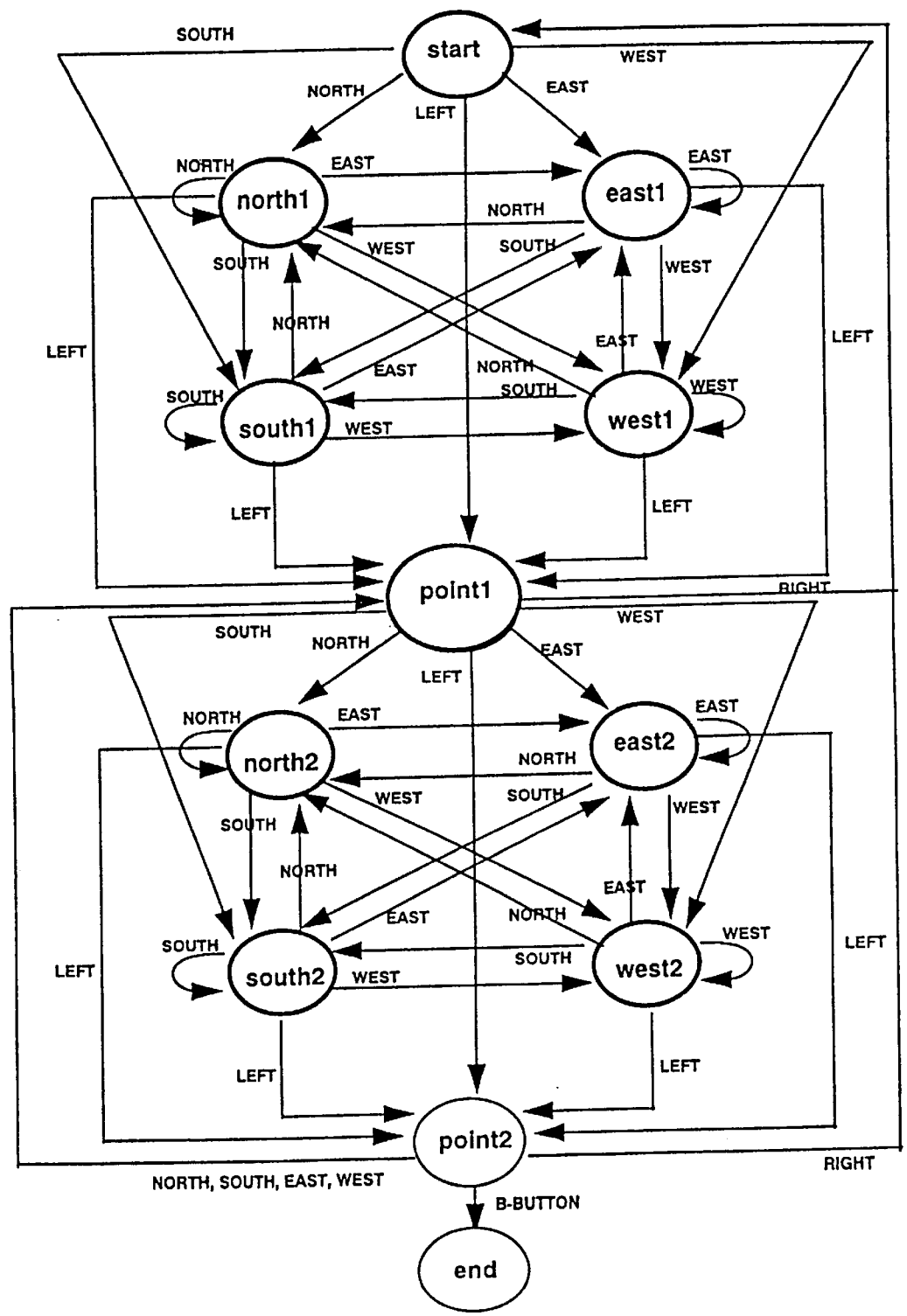
FIG. 3d is a flow chart illustrating the use of an alternative parse graph within a recursive call to the toplevel function to enforce a specific interaction sequence with a user.
Figure 3E:
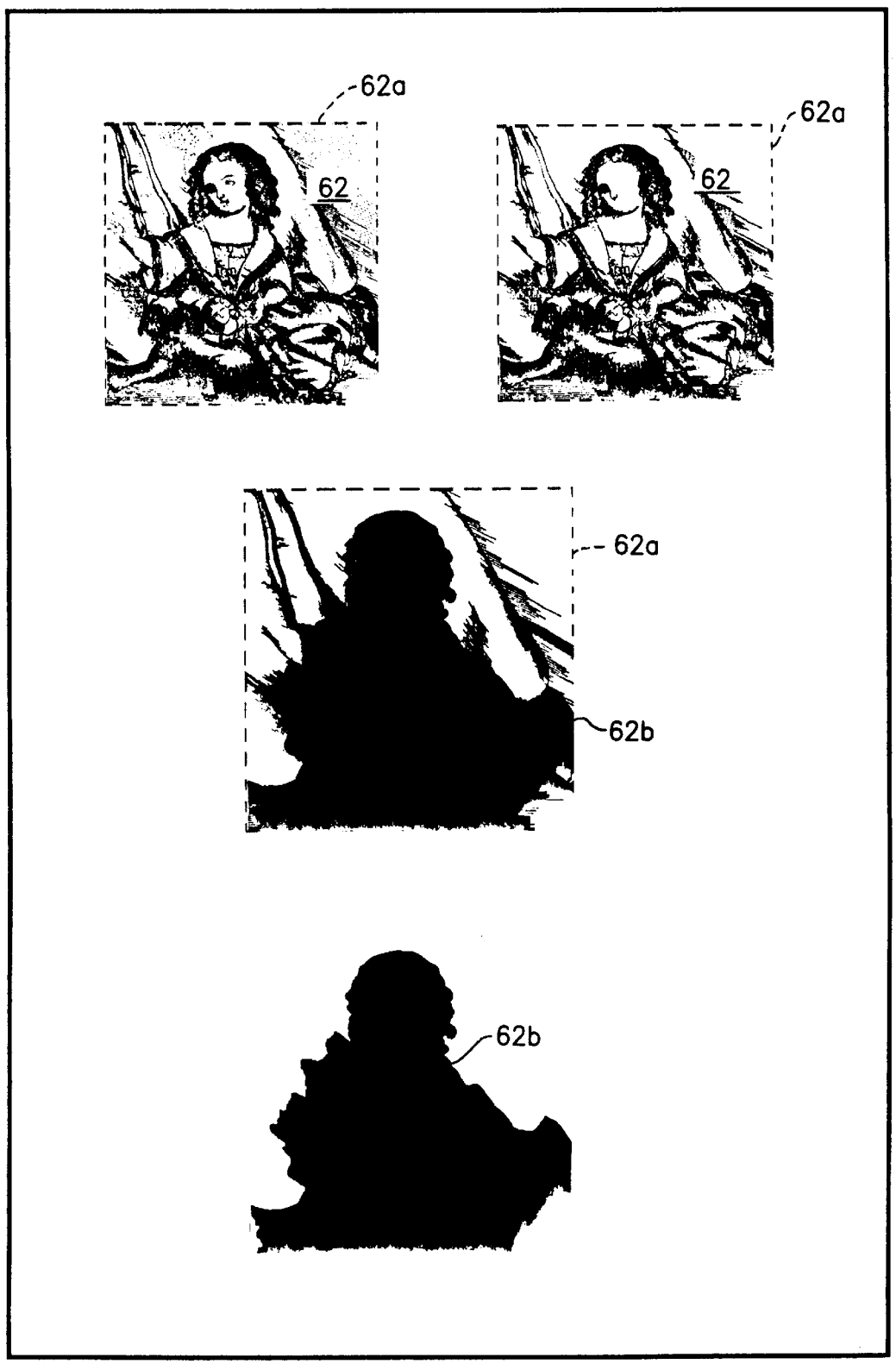
FIGS. 3e and 3f show how a mask is used to define a non-rectangular object icon.
Figure 3F:
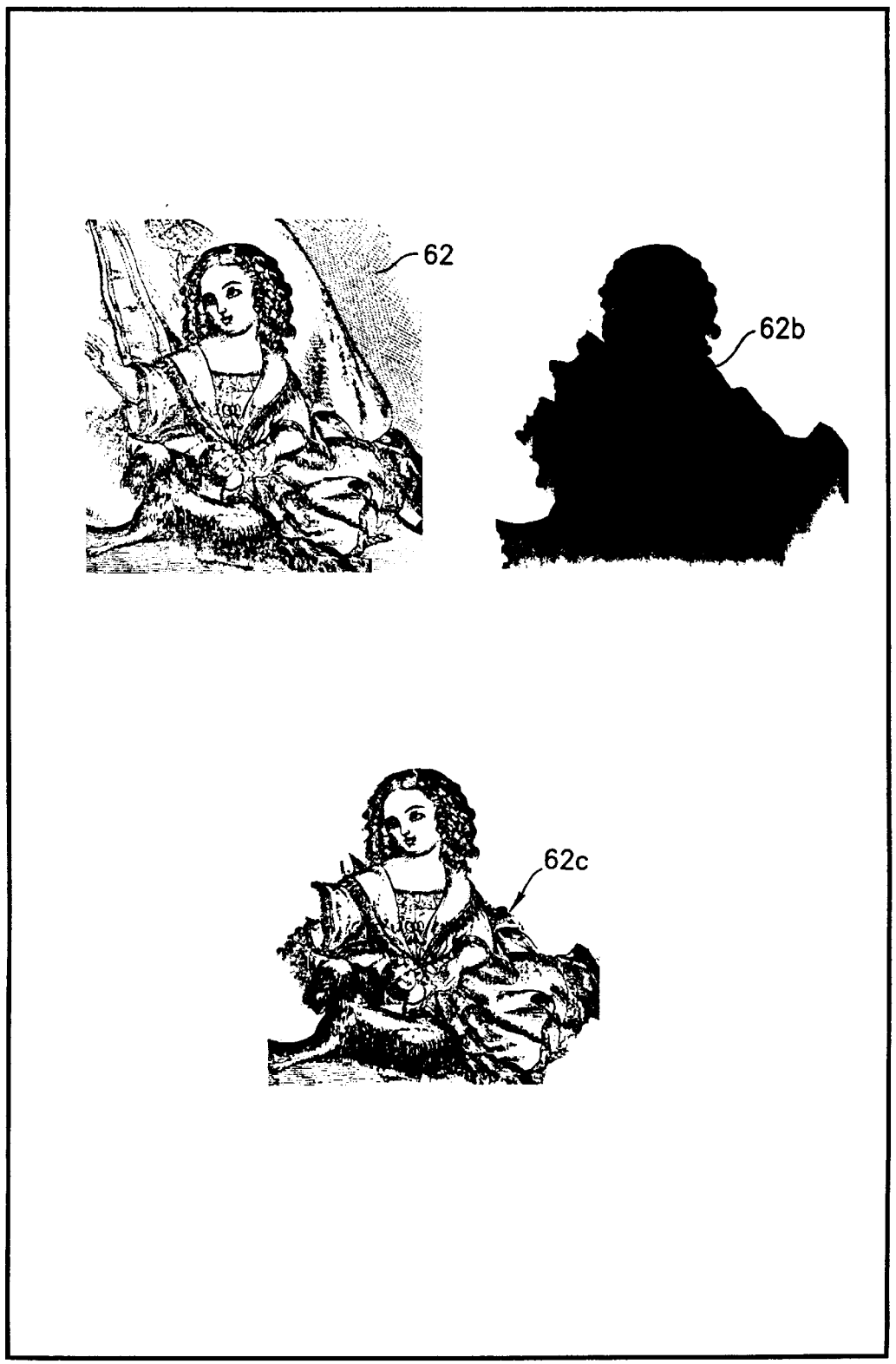

The define_icon command, as described here, is a example of the use of an alternative parse_graph within a recursive call to the toplevel to enforce a particular interaction sequence with a user. Referring now to FIGS. 3 and 3a—3d, an icon is defined by pressing the key combination which invokes the define_icon command (Left button+A button). This results in an animation of the character 22 raising his hand and holding a pin 60. At this point, only five commands from the user will be accepted, i.e. moving the character 22 left, right, up, or down to a location on the image 12 to position him at the corners of a sub-image 62 and pinning the pin 60 to the background image 12. Moving the character 22 invokes animation of walking in the direction selected as shown in FIG. 3a. Pinning the pin results in animation of the character's hand pushing the pin into the background to define a first corner of a rectangle as shown in FIG. 3b. A second pin 60a appears in the character's hand and is "attached" to the first pin by a resizable blinking rectangle 62a. The user moves the character to a second location and pins the second pin. The sub-image 62 contained within the rectangle 62a is thereby selected as an icon region. The flow of user interaction during the define_icon command is shown in FIG. 3d. As described below in the section entitled "Internal Procedures", the rectangular selection is masked to produce what appears to be a non-rectangular icon. FIGS. 3e and 3f show the steps in creating a mask for a non-rectangular icon. Connected regions of the image region 62 are identified radially outward from the center. Then the image is thresholded to remove noise. A mask 62b is formed around the included region. The mask 62b is smoothed and overlaid with the image region 62 to form an icon 62c which is non-rectangular.

Data Structures

Information about directories, icons, the animated character, user-level commands, basic execution units, and animations are stored in a number of structures, lists and/or arrays as described below. Each data structure is described using C language style notation.

The Dictionary Images

According to the presently preferred embodiment, pictorial information associated with directories is stored in a list or an array referred to generally as the "directory_image_map" which includes the following information:

pathname of the directory, a list of the icons (sub-images) in the directory image and a list of overlay icons (icons which are cross linked to other directories). The directory_image_map may also contain audio clips associated with the directory. Individual files stored in each directory on a storage device may be used to encode the directory_image_map information for that directory.

The Background Images

Each background image used to pictorially identify a directory is preferably stored in a data structure referred to generally as "background_image" which preferably includes the following information:

```
background_image.bitmap
background_image.size      /* For 2D implementation this can be an
                              (x,y) coord. */
background_image.palette   /* optional */
```

The Icon Images

According to the presently preferred embodiment, information about icons and the file objects they are associated with is stored in a structure generally referred to an "icon". It records information that associates file objects in the operating system's file system with their pictorial representation in the interface. There are two basic types of information that are stored for each icon: pictorial information that is used to manage the pictorial representation of the file object and file object information such as the file handle and the handle to the default program for the associated file object. Miscellaneous information is also available for specific operations such as the creation of temporary icons and the management of non-hierarchical crosslinks that are available in the interface but may not be available in the

```
directory_image_map(directory).icon_list      /* pointer to an icon_list that contains all icons */
directory_image_map(directory).overlay_icons  /* pointer to an icon_list that contains overlay
                                                 icons only */
directory_image_map(directory).image          /* full pathname of an image file */
directory_image_map(directory).fileobject     /* full pathname of directory */
directory_image_map(directory).audio
```

A directory_image_map for a particular directory preferably includes a pathname to the background image, the underlying file system. The following information is preferably included in "icon":

```
icon.locotion          /* point in background image coordinate system */
icon.size              /* point in scale defined at the overall system level */
icon.bitmask           /* binary image same size as icon */
icon.center            /* point in background image coordinate system */
icon.background_image  /* pointer to image that icon is contained in - this should be updated to
                          refer to memory location when used */
```

```
icon.image            /* pointer to image that is icon image - used for overlay icons, e.g. generic
                         icons. If null, then background image.size and location are used to
                         derive icon image. */
icon.deleted?         /* TRUE if the icon and associated fileobject, if any, have been marked for
                         deletion */
icon.temp?            /* If TRUE, this is a temporary icon. Temporary icons are overlay icons
                         that exist as long as the directory is the current directory. They are
                         deleted from the icon__list when a change__directory command executes.
                         Alternatively the policy could be to delete these icons at startup time - i.e.
                         to clear the field from the previous session. */
icon.overlay?         /* TRUE if this is an overlay icon */
icon.fileobject       /* full pathname for file object */
icon.fileobject__type /* file object type - one of DIR or FILE */
icon.crosslink?       /* if TRUE, this is a non-hierarchical link in the interface and does not
                         reflect the structure of the underlying file system. */
icon.default__program /* full pathname for the default program */
icon.animation        /* optional: stored animation, which may include audio, for icon */
icon.icon__list       /* back pointer to the icon__list icon lives in */
```

The icon__list is a list or array used to record pointers to icon datastructures. Its most important use is to record the icons associated with each particular file system directory in the directory__image__map. The actual implementation of this list is important for fast identification of an icon from screen location. In the preferred embodiment, a separate global variable icon list should be maintained that includes only those icons that are currently visible on the screen display, indexed by their location in the screen display coordinate system.

The Animated Character Model

Information about the animated character is stored as a list or an array referred to generally as character__model and preferably includes the following information:

```
character__model             /* all coordinates in terms of background image coordinate system */
character__model.size        /* bounding rectangle for character image in all animation frames */
character__model.cursor.hotspot
character__model.cursor.size
character__model.center
character__model.position    /* one of a set of values that describe character position */
                             /* for simplicity we restrict the set to the four values {LEFT, RIGHT,
                                                       UP, DOWN} */
character__model.collected__objects   /* list of icons */
```

The character__model is used to maintain information about the location and position of the character and cursor throughout the system during a session. It is updated by play__animation (described below) to match the last frame of each animation played. The character model is used to calibrate animations and register images of the character across animations. It is also used to track the cursor. It also is used to maintain the list of references to file objects which the user wishes to collect and have immediate access to during a session.

The User-Level Command Scripts

Information about the user-level command is stored in a list or an array referred to generally as command__script and preferably includes the following information:

```
command__script.function    /* pointer to executable code */
command__script.options__arg /* optional - parameters for execution */
```

The command__script is used to maintain a pointer to the executable code for user-level commands and the system-wide parameters for each command.

The User-Level Command Map

Command scripts are stored in an array or list data structure. The data structure is used to index and retrieve command scripts by making reference to the command code of that command.

```
command__scripts(command__code).    /* pointer to command script */
command__script
```

The Basic Execution Units

Runtime parameters of the basic execution units are stored in lists or arrays referred to generally as beu which preferably includes the following information:

```
beu.command__code  /* identifies user-level command and animation */
beu.icon           /* context argument for instantiated basic execution
                      unit */
beu.duration       /* for repeated execution of a single user-level
                      command */
```

The Animation Scripts

According to the invention, information about animations is stored in arrays or lists referred to generally as script which preferably include the following information:

```
script.ID                          /* identifier for this animation */
script.command_class               /* backlink to command_class */
script.command_code                /* backlink to command_code */
script.animation_selector          /* backlink to animation_selector - used for epilogue animations */
script.n_of_frames
script.desired_frame_rate          /* frames per second */
script.palette
script.merge_frame                 /* only in char animations - frame # to begin merge of icon animation */
script.merge_distance              /* only in char - this + char_center should = icon center in merge frame */
script.loop_startframe             /* start of loop if this frame is the start of an animation playback loop */
script.loop_endframe               /* used only if loop_start is not NULL */
script.loop_#iterations            /* used only if loop_start is not NULL */
script.cursor_in_last_frame.location  /* only in char animations - coord relative to origin at
                                         frame center */
script.cursor_in_last_frame.size   /* only in char animations - point */
script.char_initial_position       /* one of a set of values that describe character position */
script.char_final_position         /* for simplicity we restrict the set to four values that
                                      describe the quadrants of a circle. e.g. {LEFT, RIGHT, UP,
                                      DOWN} */
script.frame(i).bitmap
script.frame(i).size               /* point - system standard resolution */
script.frame(i).anchor             /* point in animation coordinate system . . . starts at frame 1 (0,0) */
script.frame(i).to_next            /* vector increment to next frame's anchor coord - used mainly for loops */
script.frame(i).audio              /* pointer to audio segment synced to this frame */
script.frame(i).center             /* point that is normally the character center in a char animation or
                                      icon center in an icon ani - coord relative to origin at frame anchor
                                      used to register animations with previous scenarios */
script.frame(i).selection_org.center   / coord relative to origin at frame anchor, may include
                                         orientation info */
script.frame(i).selection_org.bitmask  /* used for fancy masking of selection arg image */
```

Each animation script requires a header which, in addition to providing information about standard animation parameter values, associates the animation to a user-level command, enables cursor tracking, and enables calibration with other animation sequences so that animation sequences can be appended to one another while maintaining smooth motion. Information about how an icon animation should be merged into a character animation are maintained for the character animations. Header variables that describe animation looping behavior are available for runtime iterations according to user determined criteria.

In addition to the header information, each frame of the animation includes information about the location of the frame relative to other frames in the same animation, audio synchronization information, summary information about the primary actor's (character or icon) center of gravity (registration point), and information for merging of independent bit maps (normally for visualization of selection arguments in character animations).

Setting and tracking of cursor will depend on the user command. For example, if the character is kicking an icon, the foot will be the cursor. If the character is pointing to an icon, the hand will be the cursor. Since the cursor is a component of the animation it can be changed and tracked by evaluating the animation. In the preferred embodiment, the function find_icon (described below) uses the animation script to identify the location of the cursor at the end the prologue animation. This also helps avoid problems in calibrating the animations.

Figure 4D:
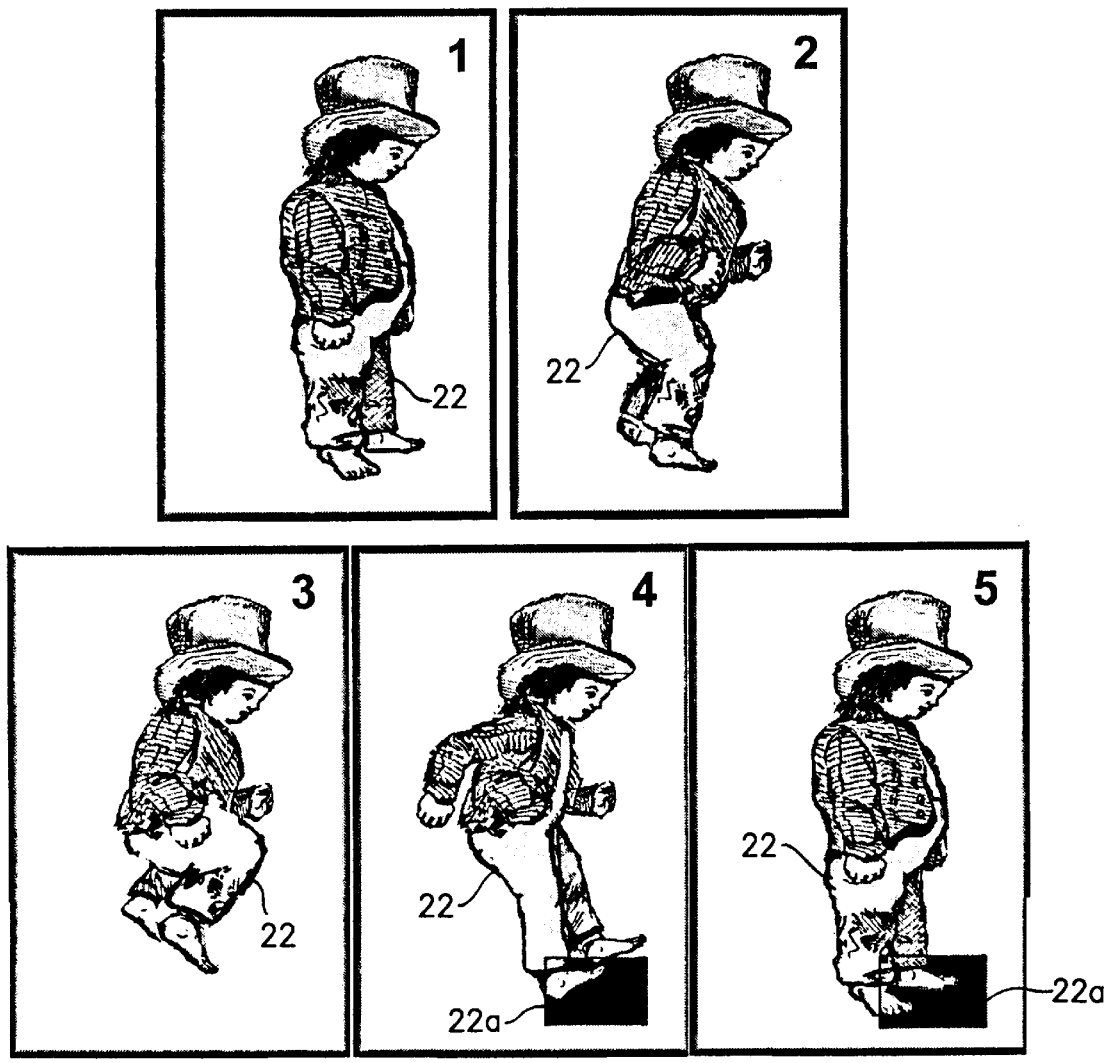
FIG. 4d shows an exemplary sequence of character prologue animation for the command change_directory.

FIGS. 4, and 4a–4d show examples of prologue and epilogue animations. FIG. 4d shows cursor placement in the prologue animation for the change_directory command. The rectangular mask 22a is used to indicate the region of the cursor hot spot. The cursor is defined only in the last frame of the prologue animation. For example, in FIG. 4d, the cursor location is determined by the rectangle 22a bounding the soles of the character's feet at the pointing of landing from a jump. Since the cursor location is recorded in the header information of each prologue animation, animations for different commands can define the cursor to be at different locations. Commands that do not accept a context argument will have an undefined or NULL cursor_in_last_frame.location and cursor_in_last_frame.size. For example, the animations for the commands illustrated in FIGS. 4 and 4a through 4c, do not accept a context argument and there is no need to define a cursor region. Similarly, epilogue animations and transition animations, e.g. the one shown in FIG. 5a., need not have cursor regions defined.

The Selection Argument

When an object is selected, information about the selected object is stored in a list or an array referred to generally as selection_arg which preferably includes the following information:

```
selection_arg.locotion    /* may be different from the original icon. */
selection_arg.bitmap      /* may be different from the original icon. */
selection_arg.center
selection_arg.icon
selection_arg.size
```

The selection argument is required for user-level commands which take two arguments. In addition to a pointer to the original icon which was selected, the selection argument has its own pictorial representation and location. FIG. 4 shows the selection argument overlaid on a character animation.

The Command Animation Mapping

The command animation maps are lists or arrays which maintain the association between user-level commands and animations which play before and after the execution of the commands. Animations are recorded either as pointers to files that contain animation scripts or as pointers to executable code and parameters that can be used to generate an animation at runtime. The command animation maps generally include prologue_animations and epilogue_animations and preferably include the information listed below:

```
prologue_animations(command_code,selector)      /* for prologue animations selector = NULL */
prologue_animations(command_code,selector).icon
prologue_animations(command_code,selector).icon.animation_scriptfile
prologue_animations(command_code,selector).icon.generating_function
prologue_animations(command_code,selector).icon.gf_parameters
prologue_animations(command_code,selector).icon.next_animation_list
prologue_animations(command_code,selector).icon.previous_animation_list
prologue_animations(command_code,selector).char
prologue_animations(command_code,selector).char.generating_function
prologue_animations(command_code,selector).char.gf_parameters
prologue_animations(command_code,selector).char.animation_scriptfile
prologue_animations(command_code,selector).char.next_animation_list
prologue_animations(command_code,selector).char.previous_animation_list
epilogue_animations(command_code,execution_result)
epilogue_animations(command_code,execution_result).icon
epilogue_animations(command_code,execution_result).icon.animation_scriptfile
epilogue_animations(command_code,execution_result).icon.generating_function
epilogue_animations(command_code,execution_result).icon.gf_parameters
epilogue_animations(command_code,execution_result).icon.next_animation_list
epilogue_animations(command_code,execution_result).icon.previous_animation_list
epilogue_animations(command_code,execution_result).char
epilogue_animations(command_code,execution_result).char.generating_function
epilogue_animations(command_code,execution_result).char.gf_parameters
epilogue_animations(command_code,execution_result).char.animation_scriptfile
epilogue_animations(command_code,execution_result).char.next_animation_list
epilogue_animations(command_code,execution_result).char.previous_animation_list
```

The next_animation_list and previous_animation_list are optional information. If used, they allow animations to be linked in a graph of animations. The variables next_animation_list and previous_animation_list are the forward and back links in the graph of animations. The graph of animations can be used to implement a specialized technique for animation calibration which is discussed below in the section entitled "Internal Procedures".

System Control Data Structures

The following data structures are used for system control and sequencing of basic execution units.

Input signal mapping is stored in a data structure referred to generally as keycode_grammer. This is a finite grammar that associates each valid input sequence with a keycode-identical set. In the preferred embodiment, this declarative representation is used by a standard type of lexical parser to return the appropriate command_class given any valid input sequence. The following information is contained in keycode_grammer:

```
keycode_grammer.input_sequence      /* string with coding dependant on input device */
keycode_grammer.keycode_identical_command_set      /* lost of command codes */
```

A grammar that contains user-level commands in stored in a data structure referred to generally as a parse_graph. In the presently preferred embodiment, the parse_graph is a finite state machine that records valid sequences of user-level commands. This is used to place restrictions on certain combinations of commands, particularly in nested animation sequences that are used to obtain specific kinds of information from a user (see the parse graph for define_icon for an example in FIG. 3d). The parse_graph includes the following information:

```
parse_graph   /* Each state has a single command code associated with it. A command code
                 may be associated with many states. */
parse_graph.state                  /* identifier or handle of state */
parse_graph.state.next_states      /* list of pointers to next states */
parse_graph.state.command_code     /* command_code that is associated with state */
```

The Command Buffer

An array of pointers to basic execution units can be used to implement the command buffer.

```
command_buffer(index).beu      /* pointer to a basic execution unit */
```

User-Level Commands

User-level commands are directly invoked by the user of the system. In the presently preferred embodiment, command invocation is button-based using the game pad controller described above. Each command is associated with a small number of input keys which are either pressed together or in sequence. Each command is made up of a single basic execution unit which includes a prologue animation, the command script, and one or more epilogue animations. When the user invokes a command by pushing the correct buttons, the prologue animation will play, the command script is executed, and one of the epilogue animation plays.

According to the presently preferred embodiment, a command may have up to two arguments. The arguments to a command must be icons, as defined in this invention. Arguments for a command are either preselected by a previous command or are determined by the location of the cursor hotspot on the display screen. Although the implementation is simpler if the cursor hotspot is observed prior to the start of a basic execution unit, in the preferred embodiment, the location of the cursor hotspot is observed after the prologue animation has played. By using the prologue animation to determine the cursor location, better coordination between the character and icons can be achieved. This is especially true when the cursor hotspot can be associated with various parts of the character's body depending upon the command invoked.

In the presently preferred embodiment, a number of commands can be associated with identical signals (or signal sequences) from an input device such as a keyboard and mouse, a gamepad controller, or an infrared remote controller. When more than one command is assigned to a single user input (or sequence of inputs), the commands are uniquely distinguishable by the existence of arguments, the type of the arguments, or by information encapsulated in the arguments. Overloading of button-based input signals is useful because it helps to limit the number of button signals which must be learned by a user. For example, in the presently preferred embodiment, change_directory, change_directory_to_ancestor, run_program, and run_default_program share the same input signal but are distinguishable as follows:

| | |
|---|---|
| change_directory_to_ancestor | icon is on overlay icon that references a directory |
| change_directory | icon references a directory |
| run_default_program | one icon argument & icon has default program defined |
| run_program | two icon arguments & one is an executable file |

Overloading of button-based input signals is preferably implemented by grouping user level commands into keycode-identical sets, many of which have a single member. All the commands in a keycode-identical set are assigned to the same input signal or sequence of input signals. Input signals from the input device are parsed to return the keycode-identical set associated with that signal. The keycode_identical_command_set variable is used to reference the set of user-level commands assigned to that set.

Each user level command has a unique prologue animation and a unique command_code. In some cases more than one user level command may share the same executable command_script but still exhibit a unique animation. For example, change_directory and change_directory_to_ancestor have different command codes and prologue animations but share the same execution command_script.

The keycode_identical_command_set and the arguments to the command are passed to a dispatcher process which determines which of the commands in the class have been invoked by the user. The command_code returned by the dispatcher is used to retrieve the animations associated with the command from the prologue_animations and epilogue_animations maps. In addition the command_code is used to retrieve a pointer to the function used to execute the command from the user_level_commands_map.

Three types of user-level commands are provided in the presently preferred embodiment of the invention. The first type are commands which are roughly equivalent to the commands available in the operating system (OS) in use. The second type are commands used to create and maintain the pictorial representation of file objects. The third type are utility commands which are used to change and maintain the state of various data structures used in the interface.

The following detailed descriptions of commands are illustrative of the type of commands and style of animation sequences that are provided by the invention. Other commands and/or animations can be substituted for or added to those included here. There are a number of general principles, however, which should be used when defining commands and associated animations.

1. A small number of keystrokes or button presses (e.g. one or two) should be required for each command invocation.
2. The same invocation keystrokes should be shared among as many commands as is possible by using arguments to distinguish among commands.
3. Animations should be defined to reflect differences in commands and convey this information to a user. Normally each command will have a unique prologue animation that serves as a form of echo input to the user. Several epilogue animations can be defined for each user-level command. Epilogue animations are normally used to indicate the result of a command execution to the user. The specific epilogue animation that is played when a command has been executed is generally dependant upon the value returned by the command. Epilogue animations can also be used to indicate errors to the user. Therefore, each possible result of a command should have its own epilogue animation.

Operating System Equivalent Commands

These commands are used to interface with functions provided by the underlying operating system. They provide the user with an alternative interface to the existing operating system functionality. For example, operating systems such as DOS, OS/2, and Unix all provide a command such as DIR which displays a listing of the text string names of the file objects in a file system directory. The user of this invention will get similar functionality using the display_directory commands which controls the motion of an animated character to scroll images which display the pictorial representation of file objects in a directory. Each of the commands listed below provide an alternative interface to common functions that are available in most operating systems today. Other operating system equivalent commands may be defined as needed to match the functionality provided by the underlying operating system.

change_directory(icon refers to directory) \* Changes the current directory. *\ change_directory_to_ancestor (icon refers to a directory and icon is of type overlay_icon) \* changes the current directory to a direct ancestor of the current directory *\ copy_file(icon refers to a file) \* Copies the file associated with the icon into the current directory *\ create_directory(no icon or icon is not linked) \* Creates a subdirectory or the current directory *\ delete_file_object(icon refers to a file object) \* Deletes the file object associated with the icon. *\ display_directory() \* Displays the icons associated with file objects in the current directory by scrolling the directory's image while showing the movement of an animated character. *\ expunge_deleted() \* Expunges the file objects that have been deleted with the delete command. *\ move_file(icon refers to a file) \* Moves the file associated with the icon into the current directory and removes it from it's previous directory. *\ run_default_program(icon has default_program defined) \* Executes the default program associated with the icon, using the file object associated with the icon as input. *\ run_program(icon & selection arg, selection arg is executable) \* Executes the program identified by the selection argument file object, using the icon's file object as input. *\

Appendix B shows pseudocode and describes sample prologue and epilogue animations for each of the above commands.

Pictorial Object Commands

These commands are used to create and maintain pictorial representations of file objects in the underlying operating system's file system. They act like extensions to the operating system in that they provide an alternative method to identify and represent operating system entities. They allow a user to dynamically modify the interface by adding and linking images and icons at runtime and as part of normal interaction with the computing system.

copy_icon(icon) \* Makes a copy of an icon and installs the copy in the interface in the current directory. *\ define_default_program(icon) \* Define a default program for a file that is executed when run_default_program is invoked with the file as input *\ define_icon () \* Creates an icon from the current directory's background image and installs the icon in the interface. *\ delete_icon (icon) \* Undefines and removes the icon from the interface *\ link_directory_image(icon) \* Links an image file to the directory. *\ link_icon(icon, fileobject) \* Links an icon to a fileobject in the underlying operating system. *\ unlink_directory_image (icon has default_program defined) \* Unlinks an image file from a directory in the directory_image_map. *\ unlink_icon(icon) \* Unlinks an icon from a fileobject. Icons definition remains part of interface. *\

Appendix C shows pseudocode and described sample prologue and epilogue animations for each of the above commands.

Interface Utility Commands

These commands are used to change and maintain the runtime state of various interface data structures. Some of the commands allow a user to collect references to file objects and use these references as input to later commands. Others provide control over the setting and resetting of the selection argument that is used as input to many other commands. Some of the commands change system settings that affect the way icons appear. The interface utility commands listed here provide examples of various classes of functionality that can be implemented with this type of command. Additional commands of this type can be defined to set defaults for system behavior or variables, to alter the look-and-feel of the interface, or to access data structures defined in the underlying operating system that are not otherwise accessible through the interface.

collect_file_object (icon)
/* Allows the user to collect references to file objects for later use. */ collect_selection_argument ( ) /* Allows the user to collect a references to the selection argument's file object for later use. */ make_icons_invisible( ) /* Undoes a previous make_icons_visible command so that icons are restored to their original appearance as portions of the unaltered background image. */ make_icons_visible( ) /* Causes those portions of the background image that have been defined as icons to become emphasized so that they are clearly visible and identifiable as icons. */ quit ( ) /* Causes the interface program to terminate normally. */ reset_selection_argument ( ) /* Sets the selection argument to NULL. */ select_collected_object ( ) /* Allows the user to set the selection argument to a collected object. */ select_files_as_objects ( ) /* Allows a user to access files that have not been installed in the interface. Generic icons for files selected by a user are created and added to the set of collected objects. */ set_selection_argument (icon) /* Sets the selection argument to the icon. */ unload_collected_object ( ) /* Allows the user to select a collected object and place it on the background in the current directory */

Appendix D shows pseudocode and describes sample prologue and epilogue animations for each of the above commands.

Internal Procedures

The "internal procedures" are used to implement the system functions. They are not available to a user of the interface nor are they available at an API (Application Programming Interface) level. A list of internal procedures is provided in Appendix E. For each internal procedure, the procedure prototype is given along with a description of the procedure's actions. In some cases, detailed pseudocode is provided. For example, the process_input procedure processes input signals and cursor location to determine the command code, the icon, the animation_selector, and the duration, if applicable, for the next command. The primary task of this procedure is to identify repetitions of command invocations and to manage the mapping of inputs to command codes. It calls the procedure parse_input to handle low level parsing of input signals and the procedure commands_dispatcher to handle the identification of commands that share an input signal but are distinguishable by the type of argument. For many commands, performance can be improved by processing a repeated sequence of invocations as a single unit. For example, a single invocation of a character motion command causes the animated character to move a tiny distance in the specified direction. Generally many repetitions of a motion command are issued in sequence. In addition, animation for motion is amenable to playback in a loop. For these reasons, a duration argument is provided for many of the commands. Keycodes are collected until the direction of motion changes, a maximum acceptable pause threshold is reached, or motion stops. The duration of the sequence can then be used to construct the animation for character motion which can then be played in its entirety prior to collecting the next input.

The process_input procedure takes input from keycode_grammar, character_model, and selection_arg and returns the command_code, icon, duration, and move_vector. In addition, the process_input procedure uses the following data stores:
keycode_grammar.command_set, input_buffer, repeat_threshold, and sequenced_set (set of commands for which repeated invocation is handled as a single invocation of extended duration). Sample pseudocode for the process_input procedure is listed below.

```
begin procedure process_input:
   duration = 0
   do
      keycode_grammar_command_set = lexical_parse(keycode_grammar)
      (command_code,icon) = find_icon(keycode_grammar_command_set,
                                 character_model,selection_arg)
      /* find_icon may return NULL */
      duration = duration + 1
   until command_code not in sequenced set or durotion = repeat_threshold
                         or command_code changes
      return (command_code,duration,icon)
end procedure process_input:
```

Installation and System Infrastructure

As mentioned above, the pictorial interface according to the invention is designed to support easy installation of alternative animations and input signal mappings for commands. This allows the system to be used with alternative characters, character behaviors, and input devices by reading different data into the system data structures. For example, by loading the command_animation_maps with alternative animations, different characters with different behaviors for each command can be depicted without altering the underlying system code. In addition, the icon animation generation functions may vary in different system versions. Moreover, the startup function can be written to allow user selection of a character personality and accompanying animations at runtime, if a variety of command_animation_maps are present on a single system. When a new character, input device or command set is installed, a pointer to the files that are read to define the directory_image_map, keycode_grammar, prologue_animations, epilogue_animations, or command_scripts are written to a known file which is read at startup time.

According to the presently preferred embodiment, a "super-root" directory image and icons are created during installation. Installation software determines which devices (particularly storage devices) are present and generates an image plus icons to represent a view of all the devices in the system. This is called the super-root directory. Normally the start-up directory is set to be the root directory of the boot device. However the user has access to the device level view that is created by the interface software as the super-root directory by changing directory to ancestor from the root directory. One of the benefits of the creation of a super-root is that it enables the user to install an image for the root directory in the usual way by invoking a link_dir_image command.

During installation, default images and icons are linked to file objects that are defined in the file system. For example, solid color background images can be linked to each directory defined in the file system and generic icons (e.g. golden bricks and diamond crystals) can be linked to each file object. In the preferred embodiment, this installation task should be a user option. Moreover, the user will be given an opportunity to select the directories and files that are to be linked to the interface. This option will enable the user to protect or hide files and directories that they do not wish to be available through the interface.

At startup time, a known startup file is read to determine the pathnames of the files in which the information for the directory_image_map, keycode_grammar, prologue_animations, epilogue_animations, and command_scripts is stored. These files are then read to load the mapping data structures into memory so that pointers to the associated animations script files and command scripts are available. Upon completion of the startup procedure, the toplevel is called. Pseudocode for the startup procedure and the toplevel is listed below:

```
begin procedure startup:
/* find pathnames for files with mapping data structures */
     (directory_image_map, keycode_grammar, prologue_animations,
  epilogue_animations, command_scripts, startup_directory, startup_animation)
           = read_resource_file()
  /* set global variables */
       load directory_image_map   /* load means read from disk */
       load keycode_grammar       /* assume load resets variable */
       load prologue_animations   /* It is now pointer to the as in memory */
       load epilogue_animations
       load command_scripts
       load startup_directory
       load startup_animation
       character_model = initialize_character_model()
       video_viewport = initialize_video_viewport()
       current_directory = startup_directory
       background_image = directory_image_map(current_directory).image
       icon_list = directory_image_map(current directory).icon_list
       selection_arg = NULL
  /* set data structures for initial call to toplevel */
       load parse_graph
       load keycode_grammar
       command_buffer = initialize_command_buffer()
       significant_commands = NULL
       (character_model, video_viewport.anchor, selection_arg) =
                                 play_animation(startup_animation)
  /* call toplevel */
```

```
            toplevel(parse_graph, keycode_grammar, command_buffer,
significant_commands)
end procedure startup:
begin procedure toplevel:
    current_state = START        /* initialize to start state in parse_graph */
    do until current_state is a terminal state in parse_graph
        if command_buffer is empty
            (command_code, icon, duration)
                = process_input(keycode_grammar, character_model,
                            selection_arg)
        else get (command_code, icon, duration)
            from command_buffer
        if is_next_state?(current_state, command_code, parse_graph)
/* prologue animation */
            animation_selector = NULL
            char_animscript = get_animation( command_code,
                        prologue_animations,
                        type = CHAR,
                        animation_selector,
                        icon = NULL)
            icon_animscript = get_animation( command_code,
                        prologue_animations,
                        type = ICON,
                        animation_selector,
                        icon)
            calibrator = generate_calibration_animation(move_vector,
                    character_model.position,
                    char_animscript.char_initial_position)
/* by convention use duration to set up a loop in the prologue animation only */
            char_animscript = make_anim_ijoop(char animscript,
                    duration)
        /* calibrate animation with current position and merge the char and icon animations */
            prologue_animation = make_animation( char_animscript,
                        icon_animscript,
                        calibrator,
                        character_model,
                        icon,
                        selection_arg)
            (character_model, video_viewport, selection_arg) =
                    play_animation(prologue_animation)
        /* command execution - side effects may cause change in background image, character model,
etc */
            comscript = command_scripts(command_code)
            execution_result = execute_command (comscript, icon,
selection_arg)
        /* epilogue animation */
            char_animscript = get_animation( command_code,
                        epilogue_animations,
                        type = CHAR
                        execution_result,
                        icon = NULL)
            icon_animscript = get_animation( command_code,
                        epilogue_animations,
                        type = ICON,
                        execution_result,
                        icon)
            epilogue_animation = make_animation( char_animscript,
                        icon_animscript,
                        calibrator = NULL,
                        character_model,
                        icon,
                        selection_arg)
            (character_model, video_viewport, selection_org) =
                    play_animation(epilogue_animation)
            if command_code is on list of significant commands
                append execution_result to significant_results
            update current_state in parse_graph
        end if
    end do
    return significant_results
end procedure toplevel:
```

There have been described and illustrated herein a user definable pictorial interface for accessing information in an electronic file system. While particular embodiments of the invention have been described, it is not intended that the invention be limited thereto, as it is intended that the invention be as broad in scope as the art will allow and that the specification be read likewise. Thus, while particular commands have been disclosed, it will be appreciated that other commands could be utilized. Also, while particular data structures have been shown, it will be recognized that other types of data structures could be used with similar results obtained. Moreover, while particular configurations have been disclosed in reference to processes and procedures, it will be appreciated that other configurations could be used as well. Furthermore, while the invention has been disclosed with reference to specific pseudocode, it will be understood that different code can achieve the same or similar function as disclosed herein. It will therefore be appreciated by those skilled in the art that yet other modifications could be made to the provided invention without deviating from its spirit and scope as so claimed.

APPENDIX A

Sample Mapping of Keycode Grammer for a Gamepad Controller Input Device

| | LEFT | RIGHT | BButton | AButton | XButton | YButton | NORTH | SOUTH | EAST | WEST | argument context | argument selectn |
|---|---|---|---|---|---|---|---|---|---|---|---|---|
| Operating System Equivalents | | | | | | | | | | | | |
| change_directory | | | | x | | | | | | | DIR | |
| change_directory_to_ancestor | | | | x | | | | | | | DIR ovrlay | |
| copy_file | x | | | | | x | | | | | FILE | |
| create_directory | x | | | | | | | | | | | |
| delete_file_object | | x | | | | | | | | | FILE or DIR | |
| display_directory_right | | | | | | | | | x | | | |
| display_directory_left | | | | | | | | | | x | | |
| display_directory_up | | | | | | | x | | | | | |
| display_directory_down | | | | | | | | x | | | | |
| expunge_deleted | x | x | | | | | | | | | | |
| move_file | | | | | x | x | | | | | FILE | |
| run_default_program | | | x | | | | | | | | FILE | |
| run_program | | | x | | | | | | | | FILE | EXE FILE |
| Pictorial Object Commands | | | | | | | | | | | | |
| copy_icon | x | | x | x | | | | | | | | |
| define_default_program | | | x | | x | | | | | | | EXE FILE |
| define_icon | x | | | x | | | | | | | | |
| delete_icon | | x | | x | | | | | | | icon | |
| link_directory_image | x | | | | x | | | | | | | IMG FILE |
| link_icon | | | x | x | | | | | | | FLE or DIR | |
| unlink_directory_image | | x | | x | | | | | | | | FILE or DIR |
| unlink_icon | | x | x | x | | | | | | | icon | |
| Interface Utility Commands | | | | | | | | | | | | |
| collect_file_object | | | | x | | | | | | x | FILE or DIR | |
| collect_selection_argument | | | | | x | | | | | x | | FILE or DIR |
| make_icons_invisible | | | | | x | | | x | | | | |
| make_icons_visible | | | | | x | | | | | | | |
| quit | x | x | x | | | | | | | | | |
| reset_selection_argument | | x | | | | | | x | | | | |
| select_collected_object | x | | | | | | | x | x | | | |
| select_files_as_collected_objects | x | | | | | x | | | x | | | |
| set_selection_argument | | | | | | | | x | | | | FILE or DIR |
| unload_collected_object | | x | | | | | | | x | | | |

APPENDIX B display_directory
/* A directory is displayed as an animated character appears to move relative to
the background image that represents the directory to be displayed. This is done
by scrolling the background image so that the character remains visible in the
video viewport.
It is done by animation so that the code for the command doesn't need to do
anything. The video display variables are updated by the play_animation function.
This command script is used for each of the user-level commands,
display_directory_up, display_directory_down, display_directory_left, and
display_directory_right. Directory display is invoked using keys that indicate the
direction of movement (e.g. NORTH, EAST, SOUTH, WEST or combinations thereof).
The user controls the distance moved by the number of successive keystrokes of
a single type. The direction of movement is controlled by the specific keys or

APPENDIX B-continued combination of keys that are pressed. The make_animation function handles the
direction and duration arguments to create appropriate sequences of frames for
the animation.
*/
```
input:              none
output:             none
side effects:       none         /* play_animation will change character_model
etc.*/
data store:         none
begin procedure display_directory:
        /* noop*/
end procedure display_directory:
change_directory
```
/*The change_directory command causes the operating system to change the
current directory to the directory specific by the context argument icon. The
command also deletes any temporary icons that may have been created in the
directory that is being changed. The character model is updated to position the
character in the center of the background image associated with the new
directory.
The prologue animation could show the character jumping onto the icon and the
icon transformed into a hole that the character slides through.
After the usual video transition (e.g. screen fadeout, redraw background image,
redraw character), the epilogue animation could show the character wiping it's
brow.
*/
```
input:              icon         /* context_arg icon */
output:             none
side_effects:       default directory known to OS is changed
                    change background image
                    change icon_list
                    update character_model
data stores:        directory_image_map
begin procedure change_directory:   /* assume that context_arg refers to a directory
fileobject*/
/* delete any temporary icons that may have been created in the current directory */
    for icon in icon_list
        if icon.temp? = TRUE
            delete_icon(icon,icon_list)
    result = system_call (change default directory to icon.fileobject)
/* update interface global system variables */
    current_directory = icon.fileobject
    background_image = directory_image_map(icon.fileobject).image
    if directory_image_map(icon.fileobject) = null then read
        directory_image_map.file from current_directory and insert in
        directory_image_map
    icon_list = directory_image_map(icon.fileobject).icon_list
    character_model.center = image_center(background_image)
    character_model.position = FACE_FORWARD
    /* cursor size and position will be updated by play_animation */
/* alter background_image in memory by pasting in overlay icons */
    for icon in directory_image_map(icon.fileobject).overlay_icons
        background_image = overlay_bitmap(background_image,
                            icon.image,
                            icon.location
                            icon.size)
    end for
    return result
end procedure change_directory:
change_directory_to_ancestor
```
/* This command uses the same exectable command script that is used by the
change_directory command. It differs conceptually from the change_directory
command because the directory that becomes the new current directory is an
ancestor of the current directory in the hierarchical file system maintained by the
underlying operating system. By creating separate user level commands for
change_directory and change_directory_to_ancestor the distinction between hierarchical
ancestors in the file system and crosslinks available only in the interface can be
illustrated to the user.
To do this, the animations for change_directory and change_directory_to_ancestor differ. In
addition, an icon for the direct ancestor of a directory is automatically generated
by the interface and overlaid on the background image associated with the
directory.
In the preferred implementation the automatically generated icon for a direct
ancestor is a portal that is normally associated with upward movement, e.g. a
ladder. The ladder icon is overlaid on the background image in a location
established by convention, e.g. the upper left hand corner of the image. The
prologue animation could show the character jump onto the ladder and begin
climbing. The epilogue animation would be identical to that associated with the
change_directory command.
*/

APPENDIX B-continued

```
input:              icon         /* context_arg icon must be an overlay */
output:             none
side_effects:                default directory known to OS is changed
                    change background image
                    change icon_list
                    update character_model
data stores:        directory_image_map
begin procedure change_directory: /* uses command script for change_directory */
........................................................................................................................
end procedure change_directory:
create_directory
/* Used to create a new directory file object in the underlying operating system's
file system. To ensure compatability with existing operating systems, in the
preferred implementation the system will either generate a name (e.g. character
string identifier) for the newly created directory file object or it will use a nested
interaction to prompt the user to enter the name.
There are two variants of the command. If an icon has been defined, i.e. an
unlinked icon is the context argument, the new directory is linked to the icon. If an
icon has not been defined a generic icon is created and the new directory is
linked to the generic icon. When a directory is created it is provided with a
default_background_image. In addition, the icon_list is initialized with the ladder
overlay icon which represents the parent directory.
For the animation, the preferred implementation has a single prologue animation
which displays an appropriate character behavior, e.g. the character sprinkles
fairy dust. The epilogue animation has two variants. When the context argument
is an icon that has not been linked to a file object a momentary transformation
occurs to the icon, e.g. a diamond crystal sparkles inside. When the context icon
is NULL or already linked, a diamond crytal appears on the background image.
*/
input:              icon         /* context_argument */
output:
side effects:       create new directory file object as a subdirectory
                            of the current default directory
                    maybe create new icon and add to icon_list
data store:         background_image
                    icon_list
                    character_model
                    default_background_image
                    default_audio
begin procedure create_directory:
        directory_ID = get_textstringID()     /* generate or get from dialog with user */
        dir_handle = system_call (create new directory object as subdirectory of
                        default directory with identifier = directory_ID)
        /* create and initialize new directory_object in directory_image_map */
        directory = make_directory_object(dir_handle)
        directory_image_map(directory).image = default_background_image
        directory_image_map(directory).fileobject = directory
        directory_image_map(directory).icon_list =make_icon_list()
        directory_image_map(directory).overlay_icons = make_icon_list()
        directory_image_map(directory).audio = default_audio
        /* make overlay icon to ancestor */
        location = find_empty_location(directory_image_map(directory).icon_list,
                        TOPLEFT, directory_image_map(directory).image.size)
        ladder_icon = make_generic_icon(LADDER, location)
        ladder_icon.icon_list = directory_image_map(directory).icon_list
        ladder_icon.fileobject = current_directory
        ladder_icon.fileobject_type = DIR
        ladder_icon.overlay? = TRUE
        ladder_icon.temp? = FALSE
        ladder_icon.crosslink? = FALSE
        ladder_icon.background_image = default_image
        /* insert icon to ancestor into new directory's icon lists */
        insert_icon(ladder_icon,directory_image_map(directory).icon_list)
        insert_icon(ladder_icon,directory_image_map(directory).overlay_icons)
        /* link to icon in ancestor directory */
        if icon is not NULL and icon.fileobject = NULL
                nicon = icon
                nicon.overlay? = FALSE
                result = HAD_ICON
        else {
                location = find_empty_location(icon_list,character_model.
                                cursor.hotspot,background_image.size)
                nicon = make_generic_icon(CRYSTAL,location)
                nicon.overlay? = TRUE     /* could paste into background image instead */
                result = CREATED_ICON }
        /* complete info for new directory's icon in current_directory*/
        nicon.fileobject = directory_image_map(directory).fileobject
        nicon.fo_type = DIR
        nicon.background_image = background_image
```

APPENDIX B-continued

```
      nicon.icon_list = icon_list
      nicon.crosslink? = FALSE
      nicon.temp? = FALSE
      /* insert new icon into current directory's icon list */
      insert_icon(nicon,current_directory.icon_list)
      if nicon.overlay? = TRUE
            insert_icon(nicon,current_directory.overlay_icons)
      return result              /* will be used to identify epilogue anim */
end procedure create_directory
delete_file_object
/* In a delete+expunge implementation, as described here, this command is
used to mark a file object and it's icon for deletion from the underlying operating
system's file system. Although not included here, if the file object is a directory,
confirmation should be required. Subdirectories in the underlying operating
system's hierarchical file system are recursively marked for deletion. Directories or
file objects encountered as nonhierarchical links to other subtrees of the
underlying file system are not marked for deletion. However, the icons for those
file objects found during traversal of the deleted subtree are marked.
For the prologue animation a character behavior, e.g. the character kisses the
icon representing the file object to be deleted, is displayed. There are two
variants of the epilogue animation which depict icon behaviors. If the deleted
object is an ordinary file the icon image is transformed into the image of a frog
which hops off screen. The portion of the image that had been the icon can
either be maintained as is or transformed such that the icon object has been
deleted from the image. If the deleted object is a directory the epilogue
animation would depict the icon transforming to a different creature, e.g. a
butterfly.
*/
input:            icon
output:           result
side effects:     recursively mark file_objects and icons for deletion
data store:
begin procedure delete_file_object:   /* variant requires separate expunge*/
      if icon.fileobject_type = DIR
            recursive_delete_fo(directory_image_map(icon.fileobject).icon_list)
      end if
      icon.deleted? = TRUE
      return icon.fileobject_type
end procedure delete_file_object:
expunge_deleted
/* Deletes all file objects that have previously been marked for deletion from the
underlying operating system's file system. It also deletes all references to the file
object in the interface.
The prologue animation could show the character opening a cage. The
epilogue animation would show frogs and butterflies escaping from the cage
and flying or hopping offscreen while the character waves goodbye.
*/
input:            none
output:           none
side effects:     all file objects and icons that have been marked for
                  deletion are deleted from the file system
                  the current_drectory is changed to the root directory
data stores:      current_directory
                  root_directory
begin procedure expunge_deleted:
/* for simplicity set the current directory to the root */
      current_directory = root_directory/
/* begin at the root directory to traverse the file system deleting everything that has been
marked */
      recursive_expunge(directory_image_map(root_directory).icon_list)
end procedure expunge_deleted:
run_default_program
/* Creates a new process and executes the default program associated with the
context argument's file object using the file object as input to the program. The
implementation of this command and the outcome of it's execution depends on
the operating system environment. It requires an operating system that provides
some form the multitasking (MS Windows nonpremptive multitasking is sufficient).
Under an operating system such as Unix, the program to be executed would
become the active process and the pictorial user interface would be
suspended. Under most popular operating system environments, e.g. Windows,
OS\2, or X-windows, a program will run in a window and an additional outcome of
command execution will be to open a window for the newly created process. In
the preferred implementation, provision will be made to ensure that, upon
termination, the newly created process returns control to the pictorial user
interface. For example, this can be accomplished under OS\2 or Unix by
creating the new process as a child of the pictorial user interface process.
The prologue animation could show the character leap onto the context
argument's icon and rather than falling into a hole (as in change_directory), the
icon would explode outward to transform into the program's window. The
```

APPENDIX B-continued epilogue animation would execute after termination (or suspension) of the newly created process. It might display the character rising from the ground with a look of confusion or surprise.
Note - display of the icon explosion as part of the prologue animation, although not normally recommended, is necessary here. As long as the icon center is maintained at a single location throughout the explosion, no problems will arise in the icon identification procedure of the find_icon function. */
```
input:              icon
output:             none
side effects:       default program associated with file object is executed
data stores:        none
begin procedure run_default_program:
    child_process = system_call(create a child process for execution of
                        icon.default_program with
                        icon.file_object as input)
    call child_process
    /* In a true multitasking operating system, e.g. OS/2, the pictorial user interface can
execute the child in parallel with itself and suspend itself to wait on input. This way the pictorial
user interface can regain control regardless of whether the user terminates the child process or
uses the operating system to suspend the child and switch back to the pictorial user interface.
*/
end procedure run_default_program:
run_program
/* This command is identical to the run_default_program defined above with the
exception that the program to be run is defined by the selection argument
instead of a predefined association.
The prologue animation could show the character throw the
selection_argument's icon onto the context argument's icon and then leap onto
the pile of icons. Both icons would explode outward while transforming into the
program's window. The epilogue animation would execute after termination (or
suspension) of the newly created process. It could be identical to the epilogue
animation of run_default_program, i.e. the character rises from the ground with a
look of confusion or surprise.
*/
input:              icon
                    selection_arg
output:             none
side effects:       program defined by selection_arg is executed with the
                    file object defined by context_arg as input
data stores:
begin procedure run_program:
    child_process = system_call(create a child process for execution of
                        selection_arg.icon.file_object with
                        icon.file_object as input)
    call child_process
end procedure run_program:
move_file_object
/* This command causes the underlying operating system to move a file to the
current directory in the file system structure.
It is assumed that a file has already been selected (i.e. selection argument is
defined) at the time the command is invoked. There are two variants of this
command. When the context argument is an icon that has not yet been linked to
a file object this becomes the icon for the moved file object. If the context
argument icon is NULL, a generic icon is created for the moved file object.
The prologue animation might show the character bend down to unroll the icon
(selection argument) that it is holding onto the background or onto a newly
defined icon (context argument).
The epilogue animation could show the new icon swallow the selection
argument.
*/
input:              selection_arg
                    icon (optional)
output:             new_icon
side effects:       The file object is moved. It's previous icon definition is deleted,
                    and all GUI references to it are updated. A new icon definition
                    created and installed in the current directory.
data store:         current_directory
                    background_image
                    icon_list
                    character_model
begin procedure move_file_object:   /* assume selection_arg is a file not a directory */
    if icon = NULL or icon.fileobject is not NULL    /* make generic icon */
        location = find_empty_location(icon_list,character_model.
                        cursor.hotspot,background_image.size)
        icon1 = make_generic_icon(selection_arg.icon.fileobject_type,
                        location)
        icon1.overlay? = TRUE
        insert_icon(icon1,icon_list)        /* link icon to current_directory */
        insert_icon(icon1,
```

APPENDIX B-continued

```
        directory_image_map(current_directory).overlay_icons)
    end if
    else icon1 = icon
    new_file = system_call(move selection_arg.icon.fileobject to current
                          directory)
        icon1.fileobject = new_file
        icon1.fileobject_type = FILE
        icon1.temp? = FALSE
        icon1.crosslink? = FALSE
        icon1.background_image =
directory_image_map(current_directory).image
        icon1.deleted? = FALSE
        icon1.temp? = FALSE
        icon1.icon_list = icon_list
        /* copy info from previous icon */
        icon1.default_program = selection_arg.icon.default_program
        icon1.animation = selection_arg.icon.animation
        /* remove old icon from previous location */
        free_icon(selection_arg.icon)
        /* reset selection_arg --- it should be no longer displayed in character's possession */
        selection_arg = NULL
        return icon1
end procedure move_file_object:
copy_file
/* The file associated with the selection argument is copied to the current
directory. If the context argument is an unlinked icon the copied file object is
linked to it. If the context argument is not an unlinked icon, a generic icon is
generated for the copied file object. An alternative implementation could have
the file object's current icon installed in the current directory's icon list and
overlaid on the background image. The code described here is nearly identical
to that for move_file.
The prologue animation might show the character bend down to unroll the icon
(selection argument) that it is holding onto the background or onto a newly
defined icon (context argument). Once unrolled, the character could perform a
magic rite whereby a second copy of the selection argument magically appears
in its hand (while the other remains unrolled on the background).
The epilogue animation could show the new icon swallow the selection
argument.
*/
input:          selection_arg    /*should reference a file, not a directory */
                icon (optional)
output:         new_icon
side effects:   selection_arg fileobject is copied to current directory
                and installed in the interface with a graphical icon
data store:     current_directory
                background_image
                icon_list
                character_model
begin procedure copy_file:
    new_file = system_call (copy selection_arg.fileobject to current_directory)
    if icon = NULL or icon.fileobject is not NULL    /* make generic icon */
        location = find_empty_location(icon_list,character_model.
                           cursor.hotspot,background_image.size)
        icon1 = make_generic_icon(selection_arg.icon.fileobject_type,
                           location)
        icon1.overlay? = TRUE
        insert_icon(icon1,icon_list)      /* link icon to current_directory */
        insert_icon(icon1,
directory_image_map(current_directory).overlay_icons)
    end if
    else icon1 = icon
    icon1.fileobject = new_file
    icon1.fileobject_type = FILE
    icon1.temp? = FALSE
    icon1.crosslink? = FALSE
    icon1.background_image =
directory_image_map(current_directory).image
    icon1.deleted? = FALSE
    icon1.temp? = FALSE
    icon1.icon_list = icon_list
    /* copy info from previous icon */
    icon1.default_program = selection_arg.icon.default_program
    icon1.animation = selection_arg.icon.animation
    return icon1
end procedure copy_file_object:
```

APPENDIX C copy_icon
/* Makes a copy of the icon, including the reference to a linked file object if it is
defined. The linked fileobject is not copied. The copied icon is installed in the
current directory's icon_list and an overlay icon bitmap is created to draw the
copied icon on the current directory's background image.
A prologue animation could show the character bend down with a pencil as if to
begin drawing. The epilogue animation would show the character drawing a
copy of the icon.
*/
input:              selection_arg or icon     /*selection_arg is first choice */
output:             none
side effects:       a copy of icon is installed in the current directory's icon_list
data stores:        icon_list
                    background_image
                    character_model
begin procedure copy_icon:
    iconc= copy_icon(selection_arg.icon)      /* ds created-many fields copied */
    iconc.location = find_empty_location(icon_list,character_model,
                            cursor.hotspot,background_image.size)
    iconc.center = iconc.location + (selection_arg.icon.location –
                            selection_arg.icon.center)
    iconc.background_image = background_image /* current_directory */
    if iconc.fileobject and iconc.fileobject not in current directory
        iconc.crosslink? = TRUE
    else if iconc.fileobject
        iconc.crosslink? = FALSE
    else iconc. crosslink? = NULL
    iconc.temp? = FALSE
    iconc.icon_list = icon_list
    insert_icon(iconc,icon_list)      /*insert in current_directory icon_list */
end procedure copy_icon:
define_default_program
/* Defines a default program for a file. This is similar to the Windows File Manager
Associate function except that Associate defines a default program for all files
with a given file extension whereas this command defines a default program on a
file by file basis. When the run_default_program command is invoked for the file, the
program defined by this command is executed with the file as input.
The prologue animation might show the character nail the selection argument
that references an executable program to the icon.
The epilogue animation could show the selection_arg turn into a stream of tiny
zeros and ones that do a dance and dissolve into the icon.
input:              icon
                    selection_arg
output:             none
side effects:       selection_arg fileobject becomes the default program for
                            the icon fileobject
data stores:        none
begin procedure define_default_program:
/* assume selection arg is an executable file that accepts files as input.*/
    icon.default_program = selection_arg.icon.fileobject
/* reset the selection_arg */
    free_selection_arg(selection_arg)
end procedure define_default_program:
define_icon
/* Creates an icon from the current directory's background image and adds the
icon definition to the current directory's icon list. The icon could be a rectangular
region of the background image however, in the preferred implementation, an
edge processing algorithm is run to identify an object contained within a
rectangular region defined by the user and create a bitmap mask for that object.
Input from the user is required to define a rectangle that will be the outermost
boundary of the icon in the background image.
The prologue animation might show the character pull out a tack and bend down
as if ready to pin the tack to the background image. In addition, a rectangular
shadow that defines a region should appear to emanate from the tack. In a
nested interaction, the user can move the character with the usual movement
keys (e.g. NORTH, etc) to place the rectangle. A click of a button (e.g. LEFT) will
cause the corner associated with the tack to be defined. The user again moves
the character, which appears to be holding the opposite corner of the
rectangle, to define the extent of the rectangle in the fashion commonly used in
mouse-based interfaces. Another click of the button (e.g. LEFT) causes the
epilogue animation to play and the character tacks down the corner now being
held.
This command illustrates the use of recursion to allow nested animated interaction
with
the user.
*/
input:              none
output:             none
side effects:       creates icon definition in current directory's icon list

APPENDIX C-continued

```
data store:          background_image
begin procedure define_icon:
    result = call top_level with    parse_graph = define_icon_graph
                                    keycode_grammar = define_icon_grammer
                                    command_buffer = empty_buffer
                                    significant_commands = {define_point}
    /* result should contain two coordinates in BK coord system in a string var */
    point1,point2 = convert result string to points
    icon = make_icon()
    icon.location    = rectangle_origin(point1,point2)
    icon.size        = rectangle_size(point1,point2)
    icon.bitmask     = make_icon_bitmask(icon.location,icon.size,
background_image)
    icon.center = find_region_center(icon.bitmask)
    icon.background_image = background_image
    icon.image = NULL
    icon.fileobject = NULL
    icon.crosslink? = NULL
    icon.fileobject_type = NULL
    icon.animation = NULL
    icon.default_program = NULL
    icon.deleted? = FALSE
    icon.overlay? = FALSE
    icon.temp? = FALSE
    insert_icon(icon,icon_list)
end procedure define_icon:
define_icon data structures for recursive call to toplevel
/* Maps from input (i.e. keycodes) to command codes. It is assumed that either the
commands_dispatcher has knowledge of these commands or that the command classes for
lower level commands are in one-to-one correspondence to command codes. */
define_icon_grammer:
    input            command code
    LEFT             define_point
    RIGHT            undefine_points
    NORTH            bent_move_up
    SOUTH            bent_move_down
    EAST             bent_move_right
    WEST             bent_move_left
    B-BUTTON         end
/* The define_icon_graph is the parse_graph for the recursive call. It defines legal
sequences of command_codes in a nested interaction that is initiated from the define_icon
commands. */
define_icon_graph:
command code         state        next states
                     START:       NORTH1, SOUTH1, EAST1, WEST1, POINT1
bent_move_up         NORTH1:      NORTH1, SOUTH1, EAST1, WEST1, POINT1
bent_move_down       SOUTH1:      NORTH1, SOUTH1, EAST1, WEST1, POINT1
bent_move_right      EAST1:       NORTH1, SOUTH1, EAST1, WEST1, POINT1
bent_move_left       WEST1:       NORTH1, SOUTH1, EAST1, WEST1, POINT1
define_point         POINT1:      NORTH2, SOUTH2, EAST2, WEST2, POINT2
undefine_points      POINT1:      START
undefine_points      POINT2:      START
{any motion code}    POINT2:      POINT1
bent_move_up         NORTH2:      NORTH2, SOUTH2, EAST2, WEST2, POINT2
bent_move_down       SOUTH2:      NORTH2, SOUTH2, EAST2, WEST2, POINT2
bent_move_right      EAST2:       NORTH2, SOUTH2, EAST2, WEST2, POINT2
bent_move_left       WEST2:       NORTH2, SOUTH2, EAST2, WEST2, POINT2
B_button             POINT2:      end
delete_icon
/* Removes the icon definition from the icon_list. Normally this command is used
in combination with an unlink_icon command so that access to the file object can
be preserved in the form of a generic icon. If the icon has a file_object
attached, e.g. the file_object has not been explicitly unlinked prior to invoking this
command, the file object disppears into the ether. It can be retrieved with the
list_files command.
The prologue animation might show the character take out a large eraser and
rub it over the icon as the icon emphasis fades, blending into the background.
The epilogue animation could show the character turn away from the icon and
put the pencil away. The preferred implementation uses this scenario to depict
the image's return to a undefined state in a system where images are stable.
Alternatively, the background image can be altered so that the icon image is
removed by blending the adjacent pixels.
*/
input:           icon
output:          none
side effects:    icon definition is deleted from the icon_list
data stores:     none
begin procedure delete_icon:
    free_icon(icon)
```

APPENDIX C-continued

```
end procedure delete_icon:
link_directory_image
/* Creates a background image for a directory by linking an image file to the
directory's entry in the directory_image_map. If the directory already has a
background image defined, that image is extended by appending the new
image to it. The image file is specified in the selection argument and the target
directory is specified by the icon argument. If the icon argument is not a
directory, the target directory is the current directory. The join is done with the
new image left edge aligned to the existing image right edge. In the preferred
implementation, when images are joined both edges are extended and
gradually faded to gray at their meeting point. In addition, when aspect ratios
differ the images are joined at the centers and edges of the smaller image plane
are extended (by fading to gray) to the same size as the larger image.
In the implementation, the original image is modified at the time the command is
invoked and written to secondary storage. An alternative implementation would
insert a pointer to the newly appended image in the list of images in the
directory_image_map and all operations to merge the images would be done at
the time images are displayed.
In the prologue animation, the character tosses the selection argument onto the
target directory icon. The epilogue animation in this scenario shows the target
directory icon suck up the selection arg which has become an image. */
input:              selection arg
                    icon
output:             none
side effects:       the selection arg (assumed to be an image file) is associated
                    with the icon directory in the directory_image_map. If there is
                    already an image defined this image is modified by extending
                    it with the new image.
data stores:        directory_image_map
                    current_directory
                    background_image
begin procedure link_directory_image:
    if icon = NULL or icon.fileobject_type != DIR
        directory = current_directory
    else directory = icon.fileobject
/* assume selection_arg refers to an image file */
    if directory_image_map(directory).image = NULL or =
                                default_background_image
/* if overlay icons are defined on a default_background_image they will still be defined on the
new image */
        directory_image_map(directory).image =
                                selection_arg.icon.fileobject
    end if
    else    /* a background image is already defined */
        new_image = extend_image (directory_image_map
                                (directory).image,selection_arg.fileobject)
        directory_image_map(directory).image = new_image
        /* icon locations will still be correct as long as origin has not been changed */
    end else
    /* reset the selection_arg to null */
    free_selection_arg(selection_arg)
end procedure link_directory_image:
link_icon
/* Links an icon which has been defined with the define_icon command to the
file_object argument. In the preferred implementation, a user will have previously
selected a file object that this command will operate on, e.g. with list_files. An
alternative implementation may offer a nested interaction, e.g. a dialog box,
from which a user can select a file.
The prologue animation shows the character tossing the selection argument icon
on to the target icon. The epilogue animation shows the target icon transforming
into an ooze that swallows up the selection argument icon. The ooze settles back
to the original target icon form and the selection argument icon sparkles inside
momentarily.
*/
input:              icon
                    selection_arg       /* for file_object argument */
output:             none
side effects:       file_object is added to the icon's definition
                    selection_arg is undefined
data stores:        current_directory,
                    icon_list,
                    background_image
begin procedure link_icon:
/* assume that file object is not already defined and that selection_arg is defined */
    icon.fileobject = selection_arg.icon.fileobject
    free_selection_arg(selection_arg)
end procedure link_icon:
unlink_directory_image
/* Unlinks an image file from a directory in the directory_image_map. This
```

APPENDIX C-continued command removes the background image associated with the directory file
object specified by the icon argument by removing the reference to it in the
directory_image_map.
The default background image is substituted for the original image and all icons
that have been defined are replaced with generic overlay icons.
The prologue animation shows the directory icon argument eject a space ship
with the image "painted" on it's side. The epilogue animation in this scenario shows
the character wave goodbye. */
```
input:              icon
output:             none
side effects:       background image associated with the icon directory is
                    replaced by default_background
                    all icons are replaced with generic icons.
data stores:        directory_image_map
begin procedure unlink_directory_image:
/* assume that icon is associated with a directory file object */
    directory = icon.fileobject
    overlay_icons = directory_image_map(directory).overlay_icons
/* replace defined icon images with generic icons */
    for item in directory_image_map(directory).icon_list
        location = find_empty_location(overlay_icons,item.location,
                                default_background_image.size)
        new_icon = make_generic_icon(item.fileobject_type,location)
        new_icon.background_image = default_background_image
        new_icon.fileobject = item.fileobject
        new_icon.fileobject_type = item.fileobject_type
        new_icon.default_program = item.default_program
        new_icon.animation = item.animation
        new_icon.deleted? = item.deleted
        new_icon.temp? = item.temp
        new_icon.crosslink? =item.crosslink?
        new_icon.icon_list = overlay_icons
        insert_icon(new_icon,overlay_icons)
        free_icon(item)
    end for
/* change the directory associations to the default background image and icon list */
    directory_image_map(directory).image = default_background_image
    directory_image_map(directory).overlay_icons = overlay_icons
    free_icon_list(directory_image_map(directory).icon_list)
    directory_image_map(directory).icon_list = overlay_icons
end procedure unlink_directory_image:
unlink_icon
/* Removes the file_object from the icon's definition. Icon remains defined.
A prologue animation could show the character bend down with a chisel and
hammer and tap the icon a number of times until the icon shatters. The epilogue
animation in this scenario would show a butterfly or a toad emerge and the icon
reassembled. */
input:              icon
output:             none
side effects:       file_object is removed from the icon's definition
data stores:        none
begin procedure unlink_icon:
    icon.fileobject = NULL
    icon.fileobject_type = NULL
    icon.crosslink? = NULL
end procedure unlink_icon:
```

APPENDIX D collect_file_object
/* Allows user to collect references to file objects for future use. This procedure is
used to transport file icons to other places where they can be used. For
example, a file can be moved or copied to another directory once it has been
collected. This command is intended to be used with a context argument only. A
similar command, collect_selection_arg, adds the current selection argument icon to
the collected objects. In the preferred implementation, these two commands
would share the same input signal.
The prologue animation for this command might have the character pick up the
icon and place it into a container, e.g. a backpack, that he is carrying. The
epilogue animation could have the character close the backpack and put it
back on.
*/
```
input:              icon
output:             none
side effects:       icon is added to the set of collected objects
data stores:        character_model.collected_objects
```

APPENDIX D-continued

```
begin procedure collect_file_object:
/* assume icon is not NULL */
     insert_icon(icon,character_model.collected_objects)
end procedure collect_file_object:
collect_selection_argument
/* Allows user to collect a reference to the file object associated with the current
selection_argument for future use. This procedure allows a user to keep a
reference to a previously selected file object even after the selection argument
has been reset, e.g. by using it in a previous command. In the preferred
implementation, this command would share an input signal with the collect_file_object
command.
The prologue animation for this command might have the character place the
selection_arg icon (which is currently being held) into a container, e.g. a
backpack. The epilogue animation could have the character close the
backpack and put it back on.
*/
input:              none
output:             none
side effects:       selection_arg is added to the set of collected objects
                    selection_arg variable is reset to NULL
data stores:        collected_objects
begin procedure collect_selection_arg:
/* assume selection_arg is not NULL */
     insert_icon(selection_arg.icon,character_model.collected_objects)
     free_selection_arg(selection_arg)
end procedure collect_selection_arg:
select_files_as_collected_objects
/* Allows a user access to files that have not been installed into the interface.
Files that have not been installed in the interface have neither a picture object
icon nor a generic icon defined for them. Without this command, these files do
not exist from the point of view of a user accessing the file system through the
interface. This command displays a listing of all the files in the current directory.
Ideally, files that have been installed in the interface are listed with their interface
icons displayed. A user can select files from this list. If a selected file has not been
installed in the interface, a generic icon is created for that file and it is installed in
the current directory's background image. Each file selected is also added to the
collected objects list.
The prologue animation shows the character take out a pointing device and
open the backpack.
The epilogue animation shows the character dump things into the backpack and
close it.
input:              none
output:             none
side effects:       generic icons may be created for selected files in the current
                    directory
                    selected files are added to collected_objects
data stores:        character_model
                    current_directory
begin procedure select_files_as_collected_objects:
/*alternatively, a nested animation sequence can be constructed for the selection procedure
*/
     open dialog_box style window with all files in current directory listed.
     for fileobjects returned from dialog box    /* selected by user */
          if fileobject is not inclued in icon_list    /*no match for icon_fileobject */
               location = find_empty_location(icon_list,
                                   character_model.cursor.hotspot,
                                   default_background_image.size)
               icon = make_generic_icon(fileobject,location)
               icon.background_image =
                                   directory_image_map(current_directory).image
               icon.fileobject = fileobject
               icon.fileobject_type =get_fileobject_type(fileobject)
               icon.default_program = NULL
               icon.animation = NULL
               icon.deleted? = FALSE
               icon.temp? = TRUE
               icon.crosslink? =FALSE
               insert_icon(icon,
                       directory_image_map(current_directory).overlay_icons)
               insert_icon(icon,directory_image_map
                                   (current_directory).icon_list
          end if
          insert_icon(icon,character_model.collected_objects)
     end for
end procedure select_files_as_collected_objects:
make_icons_invisible
/* Causes icons which have become emphasized by a make_icons_visible
command to revert to normal. It does this by rereading the unchanged
background image file into memory.
```

APPENDIX D-continued

Same animation for the make_icons_visible command. The prologue animation shows the character clap hands. In the epilogue animation, the character could smile mischievously. */

```
input:              none
output:             none
side effects:       copy of background_image is reread from a file into memory
data stores:        current_directory
                    directory_image_map
begin procedure make_icons_invisible:
    background_image = read_image_file (directory_image_map
                                (current_directory).image)
/* The screen is updated with the new image when the epilogue animation plays. */
end procedure make_icons_invisible:
make_icons_visible
```

/* Causes those portions of the background image that have been defined as icons to become emphasized so that they are clearly identifiable. In the preferred implementation the icon image intensity is increased relative to the background image so that the icons appear to glow. In the preferred implementation this command is effective until the character changes directory and a new background image is displayed.
A prologue animation might show the character clap hands. The epilogue animation in this scenario would have the character look around at the now visible icons.
*/

```
input:              none
output:             none
side effects:       copy of current background image in memory is altered
data stores:        background_image
                    icon_list
begin procedure make_icons_visible:
    for icon in icon_list
        for each pixel in icon region of background image /* use icon.size &
icon.location */
            and each corresponding pixel in icon.bitmask
                if pixel in icon.bitmask is TRUE
                shift intensity of pixel in background image
                end if
        end for
    end for
end procedure make_icons_visible:
quit
```

/* This command gets confirmation from the user and inserts a terminal state of the parse_graph into the command_buffer.
The prologue animation could have the character look disappointed and say "are you sure?"
There would be two variants of the epilogue animation. If the user confirmed the quit command, the epilogue animation could show the character look towards the user and wave bye bye. If the quit command was not confirmed the epilogue could show the character wipe it's brow in relief and say "you had me worried."
The nested interaction could have a prologue animation in which a stop sign appears on the character's right and a stop sign with a crossbar appears on the character's left. The character holds up its hands in a questioning motion and says "which one?". The user guides the character to one of the signs and gives the usual selecet input signal, e.g. B-button.
*/

```
input:              none
output:             none
side effects:       maybe terminal_state inserted into command buffer
data stores:        none
begin procedure quit:
    create two temporary overlay icons - one for each sign
    result = call top_level with   parse_graph = quit_graph
                                   keycode_grammar = quit_grammer
                                   command_buffer = empty_buffer
                                   significant_commands = {select}
    delete the two temporary overlay icons
    insert (terminal_state, NULL, NULL, NULL) into command_buffer
    return result
end procedure quit:
quit data structures for recursive call to toplevel
```

/* Maps from input (i.e. keycodes) to command codes. It is assumed that either the commands_dispatcher has knowledge of these commands or that the command classes for lower level commands are in one-to-one correspondence to command codes. */

```
quit_grammer:
    input           command code
    B-BUTTON        select
    NORTH           move_up
    SOUTH           move_down
```

APPENDIX D-continued

```
        EAST          move_right
        WEST          move_left
/* The quit_graph is the parse_graph for the recursive call. It defines legal sequences of
command_codes in a nested interaction that is initiated from the define_icon command. */
quit_graph:
command code      state          next states
                  START:         NORTH, SOUTH, EAST, WEST, SELECT
bent_move_up      NORTH:         NORTH, SOUTH, EAST, WEST, SELECT
bent_move_down    SOUTH:         NORTH, SOUTH, EAST, WEST, SELECT
bent_move_right   EAST:          NORTH, SOUTH, EAST, WEST, SELECT
bent_move_left    WEST:          NORTH, SOUTH, EAST, WEST, SELECT
select            SELECT:        end
reset_selection_argument
/* Allow user to set selection argument to NULL.
The prologue animation could portray the character dropping the
selection_argument icon. The epilogue animation could be null, i.e. the
background is refreshed and the selection arg would disappear.
*/
input:            selection_arg
output:           none
side effects:     selection_arg is set to NULL
data stores:      none
begin procedure reset_selection_argument:
    free_selection_arg(selection_arg)
end procedure reset_selection_argument:
select_collected_object
/* Sets the selection_argument with the collected object identified by the user
and removes the collected object from the collected_objects list. If the
selection argument is already set, the former selection_argument will become a
temporary icon on the current background.
The prologue animation could show the character open a pack or bag. The
epilogue animation would have two variants. If the character is already carrying
a selection argument, it would show the character drop the selection argument.
Then both variants would show the character remove the selected collected
object from the bag and close the bag. At the end, the character would shown
holding the collected object in the hand and the old selection argument, if
defined, will be visible on the background.
*/
input:            none
output:           none
side effects:
data stores:      collected_objects
                  character_model
                  icon_list
begin procedure select_collected_object:
    if selection_argument is not NULL      /* make it into temp icon in current dir */
        ticon = make_icon_copy(selection_arg.icon)
        make_temp_icon_in_current_dir(ticon,approximate_location)
        free_selection_arg(selection_arg)
    end if
    open dialog_box style window with all collected objects listed.
/* rest assumes that user selected an object */
    ptr = ptr to the entry in collected_objects returned by the dialog box
    selection_arg = make_selection_arg(ptr.icon,character_model)
    remove ptr.icon from collected_objects
end procedure select_collected_object:
set_selection_argument
/* Sets the selection argument with the values from the icon argument. If the
selection argument is already set, a temporary icon will be created so that the
icon associated with the earlier selection argument remains on the background
of the current directory until the next change_directory command. */
The prologue animation might show the character bend over towards the icon.
The epilogue animation would have two variants. If DROP_OLD_SCROLL? is set to
TRUE the character would drop the scroll it is already carrying and then roll up the
icon into a scroll, pick it up and rise. If DROP_OLD_SCROLL? is set to FALSE, the
character would roll the icon into a scroll, pick it up, and rise with the scroll in
hands.
*/
input:            icon
                  selection_arg
output:           DROP_OLD_SCROLL?
side effects:     selection_arg fields are set with values from the icon
data stores:      character_model
                  background_image
                  current_directory
                  directory_image_map
begin procedure set_selection_argument:
    if selection_arg is NULL
        DROP_OLD_SCROLL? = FALSE
```

APPENDIX D-continued

```
        else
            DROP_OLD_SCROLL? = TRUE
        /* make temporary icon of current selecting arg */
            ticon = make_icon_copy(icon)
            make_temp_icon_in_current_dir(ticon,
                                    character_model.cursor.hotspot)
        /* remove old selection_arg */
            free_selection_arg(selection_arg)
        end else
        /* make new selection_arg */
        selection_arg = make_selection_arg(icon,character_model)
        return DROP_OLD_SCROLL?
end procedure set_selection_argument:
unload_collected_object
/* This command takes an object from the set of collected objects and places it
on the background. The object does not persist on the background because the
icon is defined as a temporary icon in the current directory's icon_list. (When the
directory is changed by a change_directory command, temporary icons are deleted
from the icon_list.)
The command is used to remove objects from the set of collected objects and to
provide temporary access to these objects. For example, if the user wishes to run
a program on a file and both the program and the file are in the set of collected
objects, the user can use the unload_collected_object command to place one of the
file's icons on the background and then select_collected_object to grab hold of the
other. Both file's icons are now accessible for any subsequent commands, e.g.
run_program.
The prologue animation could show the character open a pack or bag. The
epilogue animation would show the character close the bag and would reveal
the icon for the selected collected_object on the background. (This is done
when background image is refreshed since the selected object's icon has been
added to the icon_list and to the background image.)
*/
input:          none
output:         none
side effects:   object removed from collected objects and made temporary
                icon on current directory background
data stores:    collected_objects
                character_model
                icon_list
                background_image
begin procedure unload_collected_object:
    open dialog_box style window with all collected objects listed.
/* rest assumes that user selected an object */
    icon = item from collected_objects returned by the dialog box
/* make temporary icon copy of the icon selected from collected_objects */
    ticon = make_icon_copy(icon)
    make_temp_icon_in_current_dir(ticon,character_model.cursor.hotspot)
    remove_icon(icon,character_model.collected_objects)
end procedure unload_collected_object:
```

APPENDIX E

```
append_animations
/* Appends on animation to another animation and returns the result.
*/
input:          base_animation,
                animation
output:         animation
side effects:   none
data stores:    none
bitblit
/* Writes a bitmap to the video display or a location in memory. This function is
now common in most operating system API's. Both the source and the
destination arguments are bitmaps. The bitmaps are combined using standard
raster operations (ROP). Common raster operations include source copy in which
the source bitmap is copied to the destination and source pattern copy in which
the source bitmap is first combined with the pattern bitmap, e.g. using OR, and
then copied to the destination.
*/
input:          destination_bitmap,
                location,
                source_bitmap_size,
                source_bitmap,
                ROP
output:         none
side effects:   destination bitmap altered according to ROP
```

APPENDIX E-continued

```
data stores:    none
commands_dispatcher
/* Uses the command_class and arguments to determine which user level
command has been referenced. That is, it disambiguates overloaded input
signals according to properties of the icon and selection arguments. It returns the
command_code.
Commands are partitioned into classes according to the input signal that is used
to invoke them. The command code is unique for each user level command
and, in addition to the command class, it depends on the arguments to the
command. A command class and arguments uniquely identify a command
code.
Each command code corresponds to a unique prologue animation.
Occasionally different user level commands will share the same executable
command script. For example, the change_directory and change_directory_to_ancestor
commands have different command codes and prologue animations but they
make use of the same command script. When two different commands share
the same command script their entries in the command_scripts() map will point to
the same function code.
*/
input:          keycode_identical_command_set
                icon
                selection_arg
output:         command_code
data stores:
begin procedure commands_dispatcher:
    switch on keycode_identical_command_set
    { for each keycode_identical_command_set use arguments, if necessary,
to determine
        command_code }
    end switch
    return command_code
end procedure commands_dispatcher:
process_input
/* Processes input signals and cursor location to determine the command code,
the icon, the animation_selector, and the duration, if applicable, for the next
command. The primary task of this function is to identify repetitions of command
invocations and to manage the mapping of inputs to command codes. It calls
the function parse_input to handle low level parsing of input signals and the function
commands_dispatcher to handle the identification of commands that share an input
signal but are distinguishable by the type of argument.
For many commands, performance can be improved by processing a repeated
sequence of invocations as a single unit. For example, a single invocation of a
character motion command causes the character to move a tiny distance in the
specified direction. Generally many repetitions of a motion command are issued
in sequence. In addition, animation for motion is amenable to playback in a loop.
For these reasons, we provide a duration argument that can be used with many
commands processing of repetitions. Keycodes are collected until the direction
of motion changes, a maximum acceptable pause threshold is reached, or
motion stops. The duration of the sequence can then be used to construct the
animation for character motion which can then be played in entirety prior to
collecting the next input.
*/
input:          keycode_grammar
                character_model
                selection_arg
output:         command_code, icon, duration, move_vector
data stores:    command_class_map
                input_buffer
                repeat_threshold
                sequenced_set   /* set of commands for which repeated invocation is
                                   handled as a single invocation of extended duration */
begin procedure process_input:
    duration = 0
    do
        keycode_identical_command_set =
                                    lexical_parse(keycode_grammar)
        (command_code, icon) = find_icon
                                    (keycode_identical_command_set,
                                     character_model, selection_arg)
        /* find_icon may return NULL */
        duration = duration + 1
    until command_code not in sequenced set or duration = repeat_threshold
                    or command_code changes
    return (command_code, duration, icon)
end procedure process_input:
lexical_parse
/* Parse_input does low level parsing to get the next meaningful input, i.e. tokens,
from the input buffer. Input signals, e.g. keystrokes, are gathered until a
meaningful sequence or signals have been collected. A meaningful sequence
```

APPENDIX E-continued of low level input signals will identify a command class. Many command classes cannot be identified by a single input signal. This is particularly true for preferred input devices that offer a small number of low level signals, e.g. a game pad controller or infrared remote control device. For devices such as these, multiple buttons/signals, either simultaneous or in sequence, are combined to identify a command class. For example, the expunge_deleted command may be invoked by pressing the LEFT and RIGHT buttons of a game pad device simultaneously. Parse input would examine the stream of low-level signals and upon finding a sequence such as, LEFT down, RIGHT down, LEFT up, RIGHT up
or   RIGHT down, LEFT down, LEFT up, RIGHT up
return the command_class for the expunge_deleted command.
\*/
```
input:        keycode_grammar
output:       command_class
data stores:  input_buffer
begin procedure lexical_parse:
    use standard parser to return tokens/command_classes
    based on correspondence of keycodes from input_buffer to
keycode_grammar
    return command_class
end procedure lexical_parse:
find_icon
```
/\* Uses the location of the cursor hotspot to identify an icon on the background image. The simplest implementation considers the cursor active prior to playback of the prologue animation. In this case, the icon under the cursor hotspot at the end of the previous command, i.e. the current global system variable character_model.cursor, is used to identify the selected icon. In the preferred implementation, the cursor is considered active at the end of the prologue animation. This ensures better calibration between icon and character animations but it creates additional complexity in icon identification. In addition, when there is input overloading, there is a potential for non-determinism in icon identification. In the preferred implementation, find_icon examines each prologue animation associated with the keycode_identical_command_set and checks whether the cursor hotspot at the end of the animation is situated on an icon. The first consistent animation/icon pair that is found is assumed to be the user's choice. A consistent animation/icon pair is one in which the icon type is consistent with the command associated with the animation that resulted in that icon being selected. For example, the execution_command_class consists of the four commands, change_directory_to_ancestor, change_directory, run_program, and run_default_program. For each animation in turn, the location of the cursor at the end of the animation is computed and the icon_list is checked to see whether an icon has been defined at this location. The first animation that leads to a consistent icon is used to determine the command_code and the animation_selector. Find_icon returns the icon, command_code, and animation_selector.
\*/
```
input:        command_class
              character_model
              selection_arg
output:       icon
              command_code
              animation_selector
data stores:  keycode_grammar
              icon_list
begin procedure find_icon:
    for each animation in
         keycode_grammar.keycode_identical_command_set
         cursor_loc = compute_last_frame_anchor(animation,
                                                character_model)
                              + animation.cursor_in_last_frame.location
         icon = icon_in_rectangle(cursor_loc,
                          animation.cursor_in_last_frame.size, icon_list)
         command_code = commands_dispatcher(command_class, icon,
                                            selection_arg)
         if command_code
              return (command_code, icon)
    end for
    return()   /* nothing found - handle error*/
end procedure find_icon:
get_animation
```
/\* Retrieves an animation from the appropriate command_animation_graph. The command_animation_graph should be connected in a similar manner to the parse graph so that for every pair of commands, if the second command in the pair is reachable from the first command in pair on a path of length one in the parse graph, there is a path from the first command to the second command in the command_animation_graph. The animation graphs are used to ensure smooth motion among large numbers of user controlled transitions.
In this implementation the animation file is completely loaded into memory when it is retrieved. This may not be feasible in practice. Alternatively, it can be loaded

APPENDIX E-continued

```
in parts by the play_animation function as is standard practice for playback of
digital animation. */
input:         command_code
               animation_map
               selector
               type              /* = ICON or CHAR */
               icon
output:        pointer to an animation script
data stores:   command_animation_map == prologue_animations,
epilogue_animations
begin procedure get_animation:
    if type = CHAR
        file = *(animation_map)(command_code,
                                      selector).char.animation_scriptfile
        if file = NULL
            function = *(animation_map)(command_code,
                                      selector).char.generating_function
            parms = *(animation_map)(command_code,
                                      selector).char.generation_parameters
            file = generate_animation(character_model, function, parms)
        end if
    end if
    else /* type = ICON */
        file = *(animation_map)(command_code,
                                      selector).icon.animation_scriptfile
        if file = NULL
            function = *(animation_map)(command_code,
                                      selector).icon.generating_function
            parms = *(animation_map)(command_code,
                                      selector).icon.generation_parameters
            file = generate_animation(icon, function, parms)
        end if
    end else
    script = read_animation_file(file)
    return script
end procedure get_animation:
generate_animation
/* Takes an image and a generating function as input and uses the image as the
start frame of an animation. The generating function input should be able to
generate subsequent frames of an animation given a starting image. For
example, it could be either a morphing function with morph lines provided or an
animation generator based on a particle system. Each generation function is
used to implement a different type of animation. Animation types may include
transformations such as, icon_to_frog, icon_to_cauldron, icon_shatter, etc.
*/
input:         argument /* character model or icon */
               generating_function
               generation_parameters
output:        pointer to an animation script
data stores:   command_animation_map == prologue_animations,
                                                      epilogue_animations
begin procedure generate_animation:
    script = apply generating_function to argument and
                                                  generation_parameters
    return script
end procedure generate_animation:
make_animation
```

/* Creates a playable animation by merging the character and icon animations,
calibrating the animation with the previously played animation to create smooth
motion, overlaying the selection argument image, and determining the location
at which each frame should be overlaid on the background image.
Each frame in an animation script includes a vector that is it's anchor coordinate.
An anchor point (e.g. top left corner) is used to pin the frame at the location
specified by the anchor coordinate in a device independent coordinate system.
In this way, animation frames can be moved relative to a background and to one
another as they are overlaid on the background. In a two dimensional
implementation, the anchor coordinate for each frame may have 3 attributes,
horizontal position, vertical position, and rotation. (An implementation in three
dimensions may have the full 9 attributes, which include z-axis position, yaw, pitch,
etc) The anchor coordinate for the start frame of an animation, becomes the
"origin" and subsequent frames are anchored relative to the start frame.
Make_animation is responsible for registering the start frame of each of it's argument
animations (e.g. char and icon) to their locations in the background image
coordinate system and adjusting the anchor coordinates of each subsequent
frame appropriately to translate from the animation centered coordinate system
to the background image coordinate system.
Clipping of the animation frames is done with respect to the background image.
When the animation is played, the play_animation function will scroll the
background image in the video viewpoint as necessary. In this document we

APPENDIX E-continued assume that make_animation constructs an animation in a coordinate system of
infinite extent and clipping is handled by play_animation.
Smooth motion from one animation sequence to another is accomplished by the
calibrator argument. There are many methods that could be employed to
construct a transitional sequence of animation frames to be inserted between
the animations associated with two consecutive commands. Ideally realtime
animation generation methods would be used to construct the transition
sequence "on the fly". Another alternative is to store a fixed set of transitional
animations, each of which matches with at least one pair of commands. We
assume that the calibrator argument is a animation script that will be used to
preface the merged character/icon animation.
If a selection argument has been defined, the image for the selection argument
is overlaid on each frame of the merged, prefaced animation to construct the
finished animation.
*/
```
input:          char_animscript
                icon_animscript
                calibrator       /* pointer to an animation already registered to BK*/
                character_model  /* maybe needed for registration of animation
frames to BK */
                icon
                selection_argument
output:         pointer to animation
side effects:
data stores:
begin procedure make_animation:
/* First convert to the background image coordinate system. */
/* use fact that char & icon centers are registered across the animation and background
image coordinate systems to find the translation from animation coordinates to BK coordinates
*/
/* assume calibrator is already registered and translated to background coordinate system.
Therefore the character animation needs to be registered to the last frame of the calibrator*/
        ANchar_to_BK = compute_translation(calibrator.frame(last_frame).center,
                                                char_animscript.frame(1).center)
        ANicon_to_BK = compute_translation(icon.center,
                                                icon_animscript.frame(1).center)
/* translate anchor coordinates to background image coordinate system */
        for frame in char_animscript.frames()
            translate_coordinate(frame.anchor, ANchar_to_BK)
            translate_coordinate(frame.center, ANchar_to_BK)
            translate_coordinate(frame.selection_arg_center, ANchar_to_BK)
        end for
        translate_coordinate(char_animscript.cursor_in_last_frame.location,
                                                ANchar_to_BK)
        for frame in icon_animscript.anchors()
            translate_coordinate(frame.anchor, ANicon_to_BK)
            translate_coordinate(frame.center, ANicon_to_BK)
        end for
/* merge the icon and character animations and append to the calibrator animation */
        animation = merge_animations( char_animscript, icon_animscript)
        animation = append_animations( calibrator, animation)
/* if there is a selection argument do cel overlays for each frame of the animation */
        if selection_arg is not NULL
            merge_selection_arg(animation, selection_arg)
        return animation
end procedure make_animation:
make_anim_loop
/* Computes the number of iterations in an animation loop and fills the loop
variables in the animation script. In some cases, particularly for character motion
animations, a number of frames are repeatedly played in a loop. The number of
iterations for the loop is determined by the duration argument. The animation
frame rate and number of frames in the predefined loop is used to compute the
number of iterations that the loop must execute to satisfy the duration argument.
*/
input:          animation_script
                duration
output:         animation_script
side effects:   none
data stores:    FRAME_RATE
called by:      top_level
begin procedure: make_anim_loop
        playtime = animation_script.n_of_frames / FRAME_RATE
        if duration > playtime
            frames_to_add = (duration - playtime) * FRAME_RATE
            frames_in_loop = animation_script.loop_endframe -
                                animation_script.loop_startframe
            animation_script.loop_#iterations = ceiling(frames_to_add/
                                                frames_in_loop)
        else animation_script.loop_#iterations = 1
```

APPENDIX E-continued

```
        return animation_script
end procedure: make_anim_loop
make_selection_arg
/* Creates a selection_arg data structure and initialize this structure with
information from the icon. It also creates a selection argument bitmap which will
be used to "paste" the selection argument image onto animation frames.
*/
input:          icon
                character_model
output:         pointer to selection_arg
side effects:   none
data stores:    none
called by:      CMset_selection_arg
begin procedure make_selection_arg:
      selection_arg = allocate memory for selection_arg data structure
      selection_arg.icon = icon
      selection_arg.bitmap,
      selection_arg.center,
      selection_arg.size = generate_image(icon.bitmap,
                                        selection_arg_image_transformation_function,
                                        character_model.size /* for scale
determination */                                             )
      return selection_arg
end procedure make_selection_arg:
merge_selection_arg
/* Uses cel overlay technique to place selection argument bitmap into each
frame of the character animation.
The interface should conform to the following rules for overlay of selection
arguments:
      (1) the selection argument center is known and a registration point for
each frame of the animation is available (optionally stored with the animation).
      (2) if necessary, the selection argument will be scaled so that it is size
appropriate for the character, e.g. the size of a book relative to the size of the
character.
      (3) selection argument should be nearly contained within the boundary of
the character's form when registered with the registration point. The acceptable
tolerance for containment is determined by the boundaries of the animation
frames or can be defined in a threshold variable.
      (This may be used to modify scale and/or placement.)
      (4) selection argument is by default overlaid "above" the character. If a
bitmask for masking out the overlay is included in the selection arg info stored with
the animation script this can be used to place portions of the character "above"
masked portions of the selection argument. This allows for more sophisticated
overlays in which, for example, the selection arg can be shown partly obscured
inside the character's pocket.
The following implementation assumes that information for the registration and
display of the overlay is stored in the char_animscript. It assumes that the
selection_arg includes a bitmap that has been scaled appropriately for overlay.
In this implementation we assume that the selection_arg bitmap fits entirely within
the boundary of each frame in the animation when registered correctly. To relax
this assumption, the animation frame boundaries should be extended by the
containment tolerance prior to pasting the cel.
*/
input:          char_animscript
                selection_arg
output:         none
side effects:   char animscript altered by overlay of selection arg in each frame
data stores:    none
called by:      make_animation
begin procedure merge_selection_arg:
      for frame in char_animscript.frames()
      /* use selection_arg.center and animscript info for registration of selection arg */
            location =
compute_translation(char_animscript.frame.selection_arg.center,
                                        selection_arg.center)
      /* assume bitmaps are same size */
            if frame.selection_arg.bitmask
                  /* make a copy of the bitmap */
                  bitstoblit = copy selection_arg.bitmap
                  bitblit(bitstoblit,     /* and change it */
                        origin,
                        selection_arg.size,
                        frame.selection_arg.bitmask,
                        SRCAND
                        )
            end if
/* paste in the selection_arg - copy of the animation was made by read_animation_file so we
can mess it up */
            bitblit(script.frame.bitmap,
```

APPENDIX E-continued

```
                location,
                selection_arg.size
                if bitstoblit else selection_arg.bitmap,
                MERGECOPY        /* similar operations provided on most
platforms */
                )
        end for
end procedure merge_selection_arg:
merge_animations
/* Merge a character animation with an icon animation. For example, we take
an animation of an icon turning into a frog and merge this with the animation of
the character kissing the icon. Animations are merged by overlaying icon
animation frames with frames of character animation using source/pattern mask
blit ROPs. As in make_animation, the animation frames are assumed to be overlaid on
a background of infinite extent. (Clipping will be handled by play_animation.)
The size and anchor coordinates of each frame of the merged animation are
determined by the bounding rectangle of the two animation's frames. If
necessary, a mask value is used to fill the bounding rectangle to the required size.
Assumes input animations have the same frame rate.
It is assumed that the two input animations have already been calibrated in
space (via registration of centers on the background image) and they share a
common coordinate system, i.e. the background image coordinate system.
Merge_animations is responsible for creating a single sequence of frames by
overlaying one of the animations onto the other (e.g. the character animation is
overlaid on the icon animation). The character animation's merge_frame
variable will indicate the first frame number in the character animation to overlay
with the start frame of the icon animation.
Each frame of the merged animation is generated by creating a new frame filled
with the mask value (transparent) with a size sufficient to contain both the
character and icon animation frames. First the icon animation is overlaid on the
mask frame, and then the character animation frame is overlaid on the result.
Each subsequent frame of the merged animation is created the same way.
For simplicity it is assumed that memory is sufficient to hold all three animations in
their entirety.
*/
input:      char_anim       /* assume anims are registered to bkgrnd */
            icon_anim
output:     pointer to merged animation
side effects:
data stores:
begin procedure merge_animations:
    new_anim = make_anim()
    copy_anim_info(char_anim, new_anim) /* including loop info, if any */
    i = 0
    do while i < char_anim.merge_frame
    new_anim.frame(i) = copy char_anim.frame(i) /* copies whole frame ds */
    i =i+ 1
    end while
    do while i < char_anim.n_of_frames and i < icon_anim.n_of_frames
        (new_anchor, new_size) =
compute_merged_size(char_anim.frame(i), icon_anim.frame(i))
        new_anim.frame(i) = make_mask_frame(new_anchor, new_size)
    /* assume overlay_image works as long as anims have same coordinate system */
        new_anim.frame(i).bitmap
=overlay_bitmap(new_anim.frame(i).butmap, icon_anim.frame(i).bitmap,
                                        icon_anim.frame(i).anchor,
                                        icon_anim.frame(i).size )
        new_anim.frame(i).bitmap
=overlay_bitmap(new_anim.frame(i).bitmap, char_anim.frame(i).bitmap,
                                        char_anim.frame(i).anchor,
                                        char_anim.frame(i).size )
        new_anim.frame(i).center = char_anim.frame(i).center
        new_anim.frame(i).selection_arg_center =
                        char_anim.frame(i).selection_arg_center
        new_anim.frame(i).selection_arg_bitmask =
                        char_anim.frame(i).selection_arg_bitmask
        i = i+ 1
    end while
    /* continue with icon anim, last frame char image is copied to each frame in new
anim */
    do while i < icon_anim.n_of_frames
        (new_anchor, new_size) =
                        compute_merged_size(char_anim.frame(last_f-
rame), icon_anim.frame(i))
        new_anim.frame(i) = make_mask_frame(new_anchor, new_size)
    /* assume overlay_image works as long as anims have same coordinate system */
        new_anim.frame(i).bitmap =
overlay_image(new_anim.frame(i).bitmap, new_anchor
                                        icon_anim.frame(i).bitmap,
```

APPENDIX E-continued

```
                                       icon_anim.frame(i).anchor,
                                       icon_anim.frame(i).size )
        new_anim.frame(i).bitmap
=overlay_image(new_anim.frame(i).bitmap,
                                       new_anchor,
                                       char_anim.frame(last_frame).bitmap,
                                       char_anim.frame(last_frame).anchor,
                                       char_anim.frame(last_frame).size )
        new_anim.frame(i).center = char_anim.frame(last_frame).center
        new_anim.frame(i).selection_arg_center =
                char_anim.frame(last_frame).selection_arg_center
        new_anim.frame(i).selection_arg_bitmap =
                char_anim.frame(last_frame).selection_arg_bitmap
        i =i+ 1
    end while
    /* continue with char anim */
    do while i < char_anim.n_of_frames
        new_anim.frame(i) = copy char_anim.frame(i)
        i =i+ 1
    end while
    new_anim.n_of_frames = i
    new_anim.cursor_in_last_frame.location =
char_anim.cursor_in_last_frame.location
    new_anim.cursor_in_last_frame.size = char_anim.cursor_in_last_frame.size
    compute_anchor_increments(new_anim)   /* fills to_next values */
    return new_anim
end procedure merge_animations:
overlay_bitmap/
*/ Overlays an image on top of another image in memory at the specified
location.
*/
input:       base_bitmap
             overlay_bitmap
             overlay_location   /* assumed to be contained in base image */
             overlay_size
output:      ptr to altered base image
side effects: base image is altered
data stores:
begin procedure overlay_bitmap:
    Uses a bitblit operation to paste the overlay into the base bitmap. Portions
of the overlay may be transparent as identified with a mask value.
end procedure overlay_bitmap:
generate_calibration_animation
/* Creates an animation that shows the character move from the current
location and position to the specified location and position. This can be
accomplished by using stored animation segments as described below, or if
performance requirements allow, realtime animation techniques (e.g. Hodgkins
et. al.). If realtime animation techniques cannot be used, positional transitions can
be generated using a graph of animation positions and location transitions can
be generated by tweening a standard motion animation segment. The resulting
segments can be appended to one another.
For positional transformations, a graph can be created that has an animation
segment associated with each link. Nodes in this graph are associated with
specific positions of a specific character. Animations along a path from any
node to any other node can be appended to one another to generate an
animation that displays a smooth motion from the initial position to the position
associated with the end node. Using a completely connected graph, smooth
motion transitions can be generated for any finite set of positions.
For simplicity, throughout this pseudocode assume that the character can only
be pointed in one of four directions - looking left, looking right, facing viewer, or
with back to viewer. Animation of a full 360 degree turn clockwise can be
created by appending each of the segments in turn. Consistent motion in this
implementation requires that each character animation begin and end in one of
the positions defined for the calibration animations. Any finite number of positions
can be defined for calibration animations but it should be possible to generate an
animation that moves the character from any position to any other defined
position. Much greater flexibility in the calibration capabilities can be obtained by
using realtime animation generation techniques such as found in Hodgins et al.
*/
input:       move_vector                /* assumes (0,0) is starting point */
             current_position
             required_position          /* to simplify, direction is the only positional var */
output:      pointer to animation
side effects: none
data stores: calibration_animations     /* graph of positional transition animations */
begin procedure generate_calibration_animation:
    animation = generate_motion_animation(move_vector,
standard_motion_animation)
    position_anim = generate_position_animation(current_position,
```

APPENDIX E-continued

```
required_position, calibration_animations)
    animation = append_animation(animation, position_animation)
    return animation
end procedure generate_calibration_animation:
execute_command
/* Executes the function stored in command_script. Each executable function
(user-level command) must accept a context_argument, a selection_argument,
and an options argument. These arguments can be ignored if they are not
needed. The options argument is a character string that follows a protocol
specific to each function. When a function makes use of the options argument, it
must be able to handle situations in which the string is erroneous, i.e. does not
follow the correct protocol.
*/
input:          command_script
                context_arg
                selection_arg
output:         execution_result
side effects    depends upon the command executed
data stores:
begin procedure execute_command:
    result = apply command_script.function to context_arg, selection_arg,
        and command_script.options_arg
    return result
end procedure execute_command:
compute_translation
/* Takes a registration (point or vector) from two coordinate systems as input and
determines how to translate each point (or vector) in the first coordinate system
into the second coordinate system.
*/
input:          location_target_system   /* point or vector */
                location_source_system   /* point or vector */
output:         translation              /* point or vector */
side effects:   none
data stores:    none
translate_coordinate
/* Translates a point or vector from one coordinate system to another.
Implementation may include scaling or rotation.
*/
input:          location_source_system   /* point or vector */
                translation              /* point or vector */
output:         location_target_system   /* point or vector */
side effects:   none
data stores:    none
play_animation
/* This function has five main tasks: (1) to display animation video frames on the
video viewport by means of cel overlay on the background image, (2) convert
animation video from the background coordinate system to the video viewport
coordinate system, scrolling the background image where necessary, (3) handles
clipping if the width or height of a frame exceeds the dimensions of the video
viewport, (4) interlacing of animation video with a sequence of audio segments,
sending data to sound devices as specified, and (5) updating the
character_model, and the VDtoBK coordinate system translation in terms of the
video viewport coordinate system.
Optionally, when audio tracks overlap one another the sounds can be mixed so
all tracks play. Alternatively, the last sound specified is the one heard.}
For simplicity and clarity of the pseudocode, in this description play_animation
copies the entire background image before overlaying an animation frame and
then refreshes the full view in the video viewport. There are a number of well
known optimization that can be used to improve performance of animation
playback in a practical implementation.
Play animation always begins by redrawing the background image on the video
viewport.
*/
input:          animation
output:         display video frames synchronized with audio on sound device
side effects:   none
data stores:    character_model
                background_image
                video_viewport
returns:        character_model
                view_anchor
                selection_arg
begin procedure play_animation
/* reduce background image - this is necessary partly because a previously executed
command may have changed the background image, e.g. change_directory. */
    display_image(background_image, scale= 1, video_viewport,
              wallpaper=NULL)
    i = iters = 0
    anchor = animation.frame(0).anchor
```

APPENDIX E-continued

```
        last_inc = origin          /* (0,0) in 2-D system */
    while i < animation.n_of_frames
            waitfortimer()
            if animation.frame(i).audio
                play_audio( animation.frame(i).audio )
/* make copy of the background image to overlay frame on - this simplify's having to refresh
portions of image if previous frames are only partially overlapped */
            working_image = copy background_image
            overlay_bitmap(working_image,
                            animation.frame(i).bitmap,
                            anchor,
                            animation.frame(i).size )
/* scroll background by distance frame is moved and display image on video viewport. this
keeps frame at constant location in viewport while background is scrolled */
            video_viewport.anchor = scroll_bitmap(working_image,
                            video_viewport,
                            last_inc           /* scroll distance, direction vector */
                            SCROLL_TORUS = 1 )
/* update loop variables handling animation loops as necessary */
            if i = animation.loop_endframe and iters < animation.loop_#iterations
                i = animation.loop_startframe
                iters = iters + 1
                /* do not update anchor - convention is start frame of loop overlays
endframe */
            end if
            else
                anchor = anchor + animation.frame(i).to_next
                last_inc = animation.frame(i).to_next
                i = i + 1
            end else
/* if time to display frame is significant, set the new timer just after the timer signal is received at
top of loop */
            settimer(1/FRAME_RATE)
        end while
/* update global system state variables */
/* centers are specified relative to anchor - translate to background image coord syatem */
    character_model.center = animation.frame(last_frame).center + anchor
    character_model.position = animation.char_final_position
    character_model.cursor.hotspot = animation.cursor_in_last_frame.location
+ anchor
    character_model.cursor.size = animation.cursor_in_last_frame.size
    selection_arg.center = animation.frame(last_frame).selection_arg.center
    selection_arg.bitmask = animation.frame(last_frame).selection_arg.bitmask
    return (character_model, video_viewport, selection_arg)
end procedure play_animation
make_icon_bitmask
/* Generates a bitmap from a rectangular region of the background image. The
bitmap has one set of values that define the areas in which the background
image should appear and another value that defines regions that are masked
out. In the simplest implementation the icon image is a rectangular region of the
background image and there is no masked region. In the preferred
implementation, image processing algorithms are used to extract significant
pictorial regions from the background in order to create a bitmap in which only
the picture objects appear while background regions are masked out. For
example, an edge detection algorithm can be used to find the(an) outermost
connected edge within the rectangular region.
*/
input:      rectangle.location/* two points from background image coord
            system */
            rectangle.size
            background_image
output:     bitmap
side effects:
data stores:
make_icon_copy
/* Create an overlay icon which is a copy of the source_icon. Normally this is
used for temporary placement of an icon in a directory different from the source
icon's home directory, e.g. when selection arguments are dropped along the
way.
*/
input:      source_icon
output:     target
side effects:  none
data stores:   none
begin procedure make_icon_copy:
    target = make_icon()    /* creates uninitialized data structure */
/* make it into an overlay icon by defining the image as separate from the background */
    target.image = copy_image_region(source_icon.background_image,
                            source_icon.location, source_icon.size)
```

APPENDIX E-continued

```
     target.overlay? = TRUE
     target.size = source_icon.size
     target.bitmask = source_icon.bitmask
     target.fileobject = source_icon.fileobject
     target.fileobject_type = source_icon.fileobject_type
     target.default_program = source_icon.default_program
     target.animation = source_icon.animation
     target.deleted? = FALSE
     /**note icon location not copied . . . and should be set separately when this function is
called ***/
     /* note crosslink is not copied and should be set separately whenever this function is
called. */
     /* temp? is not copied and should also be set separately */
     return target
end procedure: make_icon_copy:
make_temp_icon_in_current_directory
/* used to insert a temporary icon in the current directory by (1) inserting the icon
into the icon_list and overlay_icons list and (2) altering the copy of the background
image in memory to paste in the overlay icon's image.
*/
input:          overlay_icon
                approximate_location
output:         none
side effects:   copy of background image in memory altered
                temporary icon added to icon_list
                temporary icon added to overlay_icons
data stores:    current_directory
                background_image
begin procedure make_temp_icon_in_current_dir:
     location =
find_empty_location(directory_image_map(current_directory).icon_list,
                                        approximate_location,
                                        background_image.size)
     overlay_icon.location = location
     overlay_icon.temp? = TRUE
     if overlay_icon.fileobject is in current_directory
          overlay_icon.crosslink? = FALSE
     else overlay_icon.crosslink? = TRUE
     insert_icon(overlay_icon, directory_image_map(current_directory).icon_list)
     insert_icon(overlay_icon,
directory_image_map(current_directory).overlay_icons)
     background_image = overlay_bitmap(background_image,
overlay_icon.image,
                                        overlay_icon.location,
                                        overlay_icon.size)
end procedure make_temp_icon_in_current_dir:
display_image
/* Uses a Blit ROP to scale and display an image bitmap in a video viewport (e.g.
full screen or window) on a video device. The image need not fit the video
viewport. The part of the image that is displayed is determined by the anchor
coordinate (in image coordinate system) which will be placed at a given point in
the device coordinate system (e.g. top left). If the anchored image does not fill
the video viewport, the image is expanded by the wallpaper image in all
dimensions that are smaller than the viewport, e.g. using source pattern blit. If
the wallpaper image argument is NULL the original image is treated as a torus.
*/
input:          pointer to an image
                scale_parameter
                video_viewport
                SCROLL_TORUS          /* 1 if image is used as a torus */
                pointer to wallpaper image   /* NULL if background image is torus */
output:         scaled image extended with wallpaper where necessary and
                displayed in video viewport
returns:        none
scroll_bitmap
/* Updates anchor coordinate and redraws correct portion of bitmap (normally
background image) on the video viewport. Many standard methods for doing
this.
The main issue is the handling of clipping . . . When the boundary of the
background image is reached there are three choices, signal error and stop
motion, wrap around, or continue on an extended background. We assume the
function provides at least two of these options including wrap around, i.e.. the
viewport is treated as a torus. */
input:          bitmap
                video_viewport
                scroll_vector/* vector expresses the distance & direction to be scrolled */
                SCROLL_TORUS     /* 1 if image is used as torus */
                pointer to wallpaper image   /* NULL if image is used as a torus */
output:
```

APPENDIX E-continued

```
side effects:   portion of image visible in video viewport changed by scroll direction
                and distance and the updated view is displayed
returns:        modified view_anchor
play_audio
/* Plays audio data on sound device. For example, using WAV files under
Windows this can be easily accomplished using the MMSYSTEM.DLL and the API's
contained therein.
*/
input:          pointer to an audio file
output:         none
side effects:   audio plays on audio device
data stores:    none
recursive_delete_fo
/* Places file objects and icons on a list of deleted objects. In the preferred
implementation, icons and file objects on the deleted lists are not actually
deleted until the expunge command is invoked.
File objects are only deleted if they are ancestors in the hierarchical file system
maintained by the OS. Files accessible by non-hierarchical crosslinks that are
maintained by the pictorial user interface are not deleted, however, the crosslinks
from deleted directories are deleted.
/*
input:          icon_list
output:         none
side effects:   icons are marked for deletion
data stores:    none
begin procedure: recursive_delete_fo
    for icon on icon_list
        if icon.fileobject_type = FILE
            /* don't do anything yet */
        else    /* icon refers to a directory - mark each pf it's descendants */
            recursive_delete_fo(directory_image_map(icon.fileobject).
icon_list)
        /* now mark it for deletion */
            icon.deleted? = TRUE
    end for
    return /* nothing */
end procedure recursive_delete_fo
recursive_expunge
/* Expunges file objects and icons that have been marked for deletion by
deleting the file object from the underlying operating system file system and
deleting the icons and all references to them in the interface. The only exception
to this is for icons that are crosslinks in the interface and which do not reflect the
underlying structure of the file system. These icons are deleted but the fileobjects
they refer to are not deleted.
File objects are only deleted if they are ancestors in the hierarchical file system
maintained by the OS. Files accessible by non-hierarchical crosslinks that are
maintained by the pictorial user interface are not deleted, however, the icon
crosslinks from deleted directories are deleted.
/*
input:          icon_list
output:         none
side effects:   fileobjects are deleted from the OS file system
                icons and references are removed from the interface
data stores:    none
begin procedure: recursive_expunge
    for icon on icon_list
        if icon.fileobject_type = FILE
        /* don't do anything yet */
        end if
        else    /* icon refers to a directory - expunge each of it's descendants */
            recursive_expunge(directory_image_map(icon.fileobject).
icon_list)
        end else
        if icon.deleted = TRUE and icon.fileobject_type = DIR
        /* now delete it - if it was a directory all it's descendants have already been
deleted */
            expunge_directory(icon)
        end if
        else if icon_deleted = TRUE     /* icon.fileobject_type = DIR */
            expunge_file(icon)
        end else
    end for
end procedure: recursive_expunge
expunge_directory
/* Expunges a directory file object by removing it and all references to it in the
interface. It is assumed that all descendants of the directory have already been
expunged. If the icon is a crosslink that references a directory in another part of
the file system, the icon and all references to it are deleted but the directory itself
is not deleted.
```

APPENDIX E-continued

```
*/
input:        icon   /* assumed to reference a directory fileobject */
output:       none
side effects:       directory fileobject is deleted from the OS file system
              icon and references are removed from the interface
data stores:  none
begin procedure expunge_directory:
      if icon.crosslink? = FALSE   /* remove the directory and all references to it */
      /* remove references to the directory in the directory_image_map */
      /* all descendants should have been deleted - assume icon_list and overlay_icons are
empty */
            directory_image_map(icon.fileobject).icon_list = NULL
            directory_image_map(icon.fileobject).overlay_icons = NULL
      /* expunge any remaining files, e.g. files not visible to the interface - if files are found
confirmation should be required. */
            remaining_files = system_call(get handles for all files in directory)
            for each file in remaining_files
                  system_call(delete file)
      /* remove reference to the directory */
            directory_image_map(icon.fileobject) = NULL
      end if
      /* remove the icon */
      free_icon(icon)
end procedure expunge_directory:
expunge_file
/* Expunges a file by removing it and all references to it in the interface. If the
icon is a crosslink that references a file in another part of the file system, the icon
and all references to it are deleted but the directory itself is not deleted.
*/
input:        icon
output:       none
side effects:       fileobject referenced by icon is deleted from the OS file system
              icon and references to it are removed from the interface
data stores:  none
begin procedure expunge_file:
      if icon.crosslink? = FALSE   /* remove the file and all references to it */
            system_call(delete icon.fileobject)
      end if
      /* remove the icon */
      free_icon(icon)
end procedure expunge_file:
```

I claim:

1. A pictorial interface for accessing information in an electronic file system having a display screen and an input device, said interface comprising:
   a) at least one pictorial image displayable on the display screen, said pictorial image containing a plurality of sub-images;
   b) means for associating said at least one pictorial image with a first group of files;
   c) means for associating at least some of the files in the first group of files with individual sub-images of said plurality of sub-images;
   d) an animated character image displayable on the display screen, said animated character image being overlaid on said pictorial image and being capable of a plurality of animated actions; and
   e) means for moving said animated character image relative to said pictorial image in response to user input.

2. A pictorial interface according to claim 1, wherein: said means for associating said at least one pictorial image with a first group of files is responsive to user input.

3. A pictorial interface according to claim 1, wherein: means for associating at least some of the files in the first group of files with individual sub-images of said plurality of sub-images is responsive to user input.

4. A pictorial interface according to claim 1, further comprising:
   f) means for scrolling said at least one pictorial image in response to movement of said animated character image.

5. A pictorial interface according to claim 1, wherein: said plurality of animated actions are metaphorical of associated file system commands.

6. A pictorial interface according to claim 1, further comprising:
   f) means for associating said plurality of animated actions with a plurality of file system commands; and
   g) means for displaying each of said animate actions and executing an associated file system command in response to user input.

7. A pictorial interface according to claim 6, wherein: said means for associating said plurality of animated actions with a plurality of file system commands is responsive to user input.

8. A pictorial interface according to claim 6, wherein: at least some of said animated actions include a prologue animation and an epilogue animation, said prologue animation being metaphorical of the associated file system command, and said epilogue animation being metaphorical of the result of the associated file system command.

9. A pictorial interface according to claim 6, further comprising:
   h) means for associating a plurality of sounds with the plurality of file system commands; and
   i) means for generating an associated sound when an associated file system command is executed.

10. A pictorial interface according to claim 1, further comprising:

f) means for generating a transition animation of said animated character image, said transition animation starting with a last frame of one of said plurality of animated actions and ending with a first frame of another of said plurality of animated actions.

11. A pictorial interface for accessing information in an electronic file system having a display screen and an input device, said interface comprising:
   a) at least one pictorial image displayable on the display screen;
   b) means for associating said at least one pictorial image with a first group of files;
   c) means for defining a region of said pictorial image as a sub-image; and
   d) means for associating at least one of the files in the first group of files with said sub-image, wherein
      said means for defining a region includes means for automatically generating and compiling program code containing a subimage definition and association, said program code providing access to said at least one of the files when said program code is run.

12. A pictorial interface for accessing information in an electronic file system having a display screen and an input device, said interface comprising:
   a) at least one pictorial image displayable on the display screen, said pictorial image containing a plurality of sub-images;
   b) means for associating at least one of said sub-images with a file or a group of files;
   c) an animated character image displayable on the display screen, said animated character image being overlaid on said pictorial image and being capable of a plurality of animated actions; and
   d) means for moving said animated character image relative to said pictorial image in response to user input.

13. A pictorial interface according to claim 12, wherein:
   said at least one sub-image is movable by said animated character in response to user input.

14. A pictorial interface according to claim 12, wherein:
   said at least one sub-image is animated and exhibits animation in response to user input when said animated character is located in proximity to said at least one sub-image.

15. A pictorial interface according to claim 14, wherein:
   said animated subimage and said animated character appear to interact in response to user input.

* * * * *